United States Patent
Ahmann

(10) Patent No.: US 12,091,254 B2
(45) Date of Patent: Sep. 17, 2024

(54) MULTI-LEVEL TOTE CACHE STORAGE AND SEQUENCING FOR IMPROVED PICKER PERFORMANCE

(71) Applicant: Robert D. Ahmann, Rochester, MN (US)

(72) Inventor: Robert D. Ahmann, Rochester, MN (US)

(73) Assignee: Robert Ahmann, Rochester, MN (US)

( * ) Notice: Subject to any disclaimer, the term of this patent is extended or adjusted under 35 U.S.C. 154(b) by 0 days.

(21) Appl. No.: 18/269,002

(22) PCT Filed: Dec. 23, 2021

(86) PCT No.: PCT/US2021/065135
§ 371 (c)(1),
(2) Date: Jun. 22, 2023

(87) PCT Pub. No.: WO2022/140694
PCT Pub. Date: Jun. 30, 2022

(65) Prior Publication Data
US 2024/0043215 A1    Feb. 8, 2024

(51) Int. Cl.
*B65G 1/137*    (2006.01)
*B25J 5/00*    (2006.01)
(Continued)

(52) U.S. Cl.
CPC ............ *B65G 1/1375* (2013.01); *B25J 5/007* (2013.01); *B25J 5/02* (2013.01); *B65G 1/0485* (2013.01);
(Continued)

(58) Field of Classification Search
CPC .. B65G 1/1375; B65G 1/0485; B65G 1/0492; B65G 1/06; B65G 1/1376; B65G 1/1378;
(Continued)

(56) References Cited

U.S. PATENT DOCUMENTS 3,880,299 A * 4/1975 Zollinger ............... G06Q 10/08
414/273
4,007,843 A * 2/1977 Lubbers ............... B65G 1/0414
414/273
(Continued)

*Primary Examiner* — Thomas Randazzo
(74) *Attorney, Agent, or Firm* — Buckert Patent & Trademark Law Firm PC; John F. Buckert

(57) ABSTRACT

Apparatus and methods for fulfilling orders by a picker utilizing multiple different levels of container-storage devices (tote-storage devices in some embodiments), all interconnected by at least one different type of conveyance device. The use of more than one level of tote-storage device is referred to as multi-level tote storage. The storage is utilized to hold containers and to sequence the containers in a preferred order that enhances the pick rate/performance. The performance and location of the container storage on the conveyance device(s) relative to the picker is determined by the required pick rate/performance of the system. The conveyance devices recirculate the containers between different levels of container storage at specific times based on a multi-level tote storage simulation control algorithm that provides the optimum pick rate/performance until such time the picker completes all the pick requests assigned to the picker.

23 Claims, 28 Drawing Sheets

(51) Int. Cl.
*B25J 5/02* (2006.01)
*B65G 1/04* (2006.01)
*B65G 1/06* (2006.01)
*B66F 9/06* (2006.01)
*B66F 11/04* (2006.01)
*G05B 19/418* (2006.01)
*G06Q 10/08* (2024.01)
*G06Q 10/087* (2023.01)

(52) U.S. Cl.
CPC ............ *B65G 1/0492* (2013.01); *B65G 1/06* (2013.01); *B65G 1/1376* (2013.01); *B65G 1/1378* (2013.01); *B66F 9/063* (2013.01); *B66F 11/04* (2013.01); *B66F 11/042* (2013.01); *G05B 19/41895* (2013.01); *G06Q 10/08* (2013.01); *G06Q 10/087* (2013.01)

(58) Field of Classification Search
CPC ... B25J 5/007; B25J 5/02; B66F 9/063; B66F 11/04; B66F 11/042; G05B 19/41895; G06Q 10/08; G06Q 10/087; Y02P 90/02
See application file for complete search history.

(56) References Cited

U.S. PATENT DOCUMENTS

| | | | | |
|---|---|---|---|---|
| 4,043,463 | A * | 8/1977 | Hansen | B66F 9/06 414/283 |
| 4,618,031 | A * | 10/1986 | Belloche | B65G 1/02 414/281 |
| 4,690,606 | A * | 9/1987 | Ross | B66F 7/0658 187/214 |
| 9,120,622 | B1 * | 9/2015 | Elazary | B66F 9/07 |
| 9,550,624 | B2 * | 1/2017 | Khodl | B25J 5/007 |
| 11,142,399 | B2 * | 10/2021 | Ahmann | G05D 1/0225 |
| 2008/0181753 | A1 * | 7/2008 | Bastian | B65G 1/1376 414/277 |
| 2011/0238207 | A1 * | 9/2011 | Bastian, II | B65G 61/00 700/217 |
| 2014/0288696 | A1 * | 9/2014 | Lert | B65G 1/1378 700/216 |
| 2015/0032252 | A1 * | 1/2015 | Galluzzo | B25J 9/162 700/218 |
| 2015/0060199 | A1 * | 3/2015 | Overfield | B66F 11/04 182/69.4 |
| 2017/0129133 | A1 * | 5/2017 | Bolivar | B28B 1/00 |
| 2017/0137271 | A1 * | 5/2017 | Shugen | B65G 1/0492 |
| 2020/0039747 | A1 * | 2/2020 | Ahmann | B65G 1/1375 |
| 2020/0207546 | A1 * | 7/2020 | Borders | B65G 67/02 |
| 2021/0269244 | A1 * | 9/2021 | Ahmann | B65G 1/0492 |

* cited by examiner

| # | PW | Tote | Elapsed | UTRdy | DTRdy | -UDif | -DDif | Move | Pick | Rep |
|---|----|------|---------|-------|-------|-------|-------|------|------|-----|
| 1 | L5 | 9.3 | 3629.8 | | | | | | 3 | 1 |
| 2 | L5 | 9.3 | 3635.8 | | 3644.9 | | -9.16 | | 6 | |
| 3 | L5 | 13.3 | 3638.8 | | | | | | 3 | |
| 4 | L5 | 13.3 | 3644.8 | 3626.7 | | | | | 6 | |
| 5 | L5 | 14.2 | 3650.8 | | | | | | 6 | |
| 6 | L5 | 12.3 | 3654.8 | | 3663.4 | | -8.64 | | 3 | 1 |
| 7 | L5 | 12.3 | 3657.8 | | | | | | 3 | |
| 8 | L5 | 12.3 | 3663.8 | | | | | | 6 | |
| 9 | L5 | 11.2 | 3669.8 | | | | | | 6 | |
| 10 | L5 | 3.3 | 3673.8 | | 3684.3 | | -10.6 | | 3 | 1 |
| 11 | L5 | 3.3 | 3676.8 | | | | | | 3 | |
| 12 | L5 | 3.3 | 3679.8 | | | | | | 3 | |
| 13 | L5 | 3.3 | 3685.8 | 3696 | | -10.2 | | | 6 | |
| 14 | L5 | 7.3 | 3691.8 | | | | | | 6 | |
| 15 | L5 | 5.3 | 3695.8 | | 3708.1 | | -12.4 | | 3 | 1 |
| 16 | L5 | 5.3 | 3701.8 | 3716.8 | | -15.1 | | | 6 | |
| 17 | L5 | 12.2 | 3707.8 | | | | | | 6 | |
| 18 | L5 | 2.3 | 3710.8 | | | | | | 3 | |
| 19 | L5 | 2.3 | 3723.5 | 3730.5 | | -7.05 | | 5.71 | 6 | 1 |
| 20 | M5 | 11.2 | 3726.5 | | | | | | 3 | |
| 21 | M5 | 11.2 | 3729.5 | | | | | | 3 | |
| 22 | M5 | 11.2 | 3741.4 | | 3733.5 | | | 5.96 | 6 | |
| 23 | M4 | 12.3 | 3744.4 | | | | | | 3 | |
| 24 | M4 | 12.3 | 3751.4 | 3761.8 | | -10.3 | | | 6 | 1 |
| 25 | M4 | 3.3 | 3757.4 | | | | | | 6 | |
| 26 | M4 | 7.3 | 3760.4 | | | | | | 3 | |
| 27 | M4 | 7.3 | 3772.4 | 3774 | | -1.62 | | 5.96 | 6 | |
| 28 | M3 | 3.3 | 3778.4 | | | | | | 6 | |
| 29 | M3 | 4.3 | 3785.4 | 3784.7 | 3788 | | -2.61 | | 6 | 1 |
| 30 | M3 | 12.3 | 3797.4 | 3800.4 | | | -3.07 | 5.96 | 6 | |
| 31 | M2 | 1.3 | 3803.4 | | | | | | 6 | |
| 32 | M2 | 6.3 | 3809.4 | | 3818.7 | | -9.35 | | 6 | |
| 33 | M2 | 9.3 | 3815.4 | 3815.6 | | -0.22 | | | 6 | |
| 34 | M2 | 3.3 | 3828.3 | | 3835.4 | | -7.11 | 5.96 | 6 | 1 |
| 35 | M1 | 1.3 | 3831.3 | | | | | | 3 | |
| 36 | M1 | 1.3 | 3834.3 | | | | | | 3 | |
| 37 | M1 | 1.3 | 3840.3 | | | | | | 6 | |
| 38 | M1 | 8.1 | 3843.3 | | | | | | 3 | |
| 39 | M1 | 8.1 | 3850.3 | 3823.6 | | | | | 6 | 1 |
| 40 | M1 | 11.2 | 3856.3 | | 3872.1 | | -15.8 | | 6 | |
| 41 | M1 | 6.3 | 3867.1 | 3873.2 | | -6.1 | | 4.76 | 6 | |

| # | ToteCyc | NextUse | Ucrit | Dcrit | VUTime | VUBuf | VDTime | VDBuf |
|---|---|---|---|---|---|---|---|---|
| 1 | 10 | 0 | | | | | | |
| 2 | 10 | 173.601 | | 14.2 | | | 18.48 | 2.16 |
| 3 | 9 | 0 | | | | | | |
| 4 | 9 | 265.253 | 12.3 | | 17.25 | -0.70 | | |
| 5 | 6 | Done | | | | | | |
| 6 | 13 | 0 | | 11.2 | | | 20.93 | 0.20 |
| 7 | 13 | 0 | | | | | | |
| 8 | 13 | 77.676 | | | | | | |
| 9 | 6 | 53.7135 | | | | | | |
| 10 | 16 | 0 | | 7.3 | | | 14.29 | 3.38 |
| 11 | 16 | 0 | | | | | | |
| 12 | 16 | 0 | | | | | | |
| 13 | 16 | 65.676 | 5.3 | | 15.54 | -10.92 | | |
| 14 | 6 | 65.676 | | | | | | |
| 15 | 10 | 0 | | 12.2 | | | 18.16 | -13.06 |
| 16 | 10 | 177.291 | R193 | | 12.19 | -5.36 | | |
| 17 | 6 | Done | | | | | | |
| 18 | 15.7135 | 0 | | | | | | |
| 19 | 15.7135 | 149.328 | 12.3 | | 13.78 | 4.22 | | |
| 20 | 17.9625 | 0 | | | | | | |
| 21 | 17.9625 | 0 | | | | | | |
| 22 | 17.9625 | 114.85 | | 3.3 | | | 22.81 | 4.03 |
| 23 | 10 | 0 | | | | | | |
| 24 | 10 | 33.9625 | 7.3 | | 12.26 | -4.37 | | |
| 25 | 6 | 14.9625 | | | | | | |
| 26 | 14.9625 | 0 | | | | | | |
| 27 | 14.9625 | Done | R195 | | 10.68 | 2.65 | | |
| 28 | 6 | 36.9625 | | | | | | |
| 29 | 7 | 155.54 | 1.3 | 6.3 | 10.67 | 8.61 | 19.87 | 12.00 |
| 30 | 11.9625 | 112.615 | 9.3 | | 15.15 | 4.73 | | |
| 31 | 6 | 24.9625 | | | | | | |
| 32 | 6 | 46.9625 | | R196 | | | 15.21 | -6.70 |
| 33 | 6 | 159.682 | 8.1 | | 7.99 | 21.39 | | |
| 34 | 12.9625 | 124.577 | | R197 | | | 13.45 | 2.77 |
| 35 | 12 | 0 | | | | | | |
| 36 | 12 | 0 | | | | | | |
| 37 | 12 | 44.7272 | | | | | | |
| 38 | 10 | 0 | | | | | | |
| 39 | 10 | 108.328 | 6.3 | | 16.56 | -0.70 | | |
| 40 | 6 | 65.6521 | | 2.3 | | | 11.41 | -10.13 |
| 41 | 10.7647 | Done | R198 | | 12.95 | 12.84 | | |

FIG. 16B

| # | Tote1 | Tote2 | Tote3 | Tote4 | TopPlat | BotPlat |
|---|---|---|---|---|---|---|
| 1 | 13.3 | R189 | 7.2 | 9.3 | 7.3 12.2 11.2 R188 14.2 R190 R191 | 2.3 1.3 |
| 2 | 13.3 | R189 | 7.2 | 9.3 | 7.3 12.2 11.2 R191 | 2.3 1.3 |
| 3 | 13.3 | 14.2 | 7.2 | R190 | 7.3 12.2 11.2 R191 | 2.3 1.3 9.3 |
| 4 | 13.3 | 14.2 | 7.2 | R190 | 7.3 12.2 11.2 R191 | 2.3 1.3 9.3 |
| 5 | 3.3 | 14.2 | 12.3 | R190 | 7.3 12.2 11.2 13.3 7.2 R191 R192 | 2.3 1.3 9.3 |
| 6 | 3.3 | 14.2 | 12.3 | R190 | 7.3 12.2 R192 | 2.3 1.3 9.3 |
| 7 | 3.3 | R191 | 12.3 | 11.2 | 7.3 12.2 R192 | 2.3 1.3 9.3 |
| 8 | 3.3 | R191 | 12.3 | 11.2 | 7.3 12.2 R192 | 2.3 1.3 9.3 |
| 9 | 3.3 | R191 | 12.3 | 11.2 | 7.3 12.2 R192 | 2.3 1.3 9.3 |
| 10 | 3.3 | R191 | 12.3 | 11.2 | 12.2 | 2.3 1.3 9.3 |
| 11 | 3.3 | 7.3 | 12.3 | R192 | 12.2 | 2.3 1.3 9.3 11.2 |
| 12 | 3.3 | 7.3 | 12.3 | R192 | 12.2 | 2.3 1.3 9.3 11.2 |
| 13 | 3.3 | 7.3 | 12.3 | R192 | 12.2 | 1.3 9.3 |
| 14 | 2.3 | 7.3 | 5.3 | R192 | 12.3 3.3 12.2 11.2 | 1.3 9.3 |
| 15 | 2.3 | 7.3 | 5.3 | R192 | 3.3 | 1.3 9.3 |
| 16 | 2.3 | 11.2 | 5.3 | 12.2 | 3.3 | 1.3 9.3 7.3 12.3 |
| 17 | 2.3 | 11.2 | R193 | 12.2 | 3.3 5.3 4.3 | 1.3 9.3 7.3 12.3 |
| 18 | 2.3 | 11.2 | R193 | 12.2 | 3.3 5.3 4.3 | 1.3 9.3 7.3 12.3 |
| 19 | 2.3 | 11.2 | R193 | 12.2 | 3.3 5.3 4.3 | 1.3 9.3 7.3 |
| 20 | R194 | 11.2 | 12.3 | 12.2 | 3.3 5.3 2.3 R193 4.3 | 1.3 9.3 7.3 |
| 21 | R194 | 11.2 | 12.3 | 12.2 | 3.3 5.3 2.3 R193 4.3 | 1.3 9.3 7.3 |
| 22 | R194 | 11.2 | 12.3 | 12.2 | 2.3 | 1.3 9.3 7.3 |
| 23 | R194 | 4.3 | 12.3 | 3.3 | 2.3 | 1.3 9.3 7.3 11.2 5.3 |
| 24 | R194 | 4.3 | 12.3 | 3.3 | 2.3 | 1.3 9.3 5.3 |
| 25 | 7.3 | 4.3 | 12.3 | 3.3 | 2.3 11.2 R194 6.3 | 1.3 9.3 5.3 |
| 26 | 7.3 | 4.3 | 12.3 | 3.3 | 2.3 11.2 R194 6.3 | 1.3 9.3 5.3 |
| 27 | 7.3 | 4.3 | 12.3 | 3.3 | 2.3 11.2 R194 6.3 | 1.3 9.3 5.3 |
| 28 | R195 | 4.3 | 12.3 | 3.3 | 2.3 11.2 R194 7.3 6.3 | 1.3 9.3 5.3 |
| 29 | R195 | 4.3 | 12.3 | 3.3 | 2.3 11.2 | 9.3 5.3 |
| 30 | 1.3 | 6.3 | 12.3 | 3.3 | 2.3 11.2 R195 R196 | 5.3 |
| 31 | 1.3 | 6.3 | 9.3 | 3.3 | 2.3 12.3 11.2 4.3 R195 R196 R197 | 5.3 |
| 32 | 1.3 | 6.3 | 9.3 | 3.3 | 2.3 11.2 4.3 R197 | 5.3 |
| 33 | 1.3 | R196 | 9.3 | 3.3 | 2.3 11.2 4.3 R197 | 6.3 5.3 12.3 |
| 34 | 1.3 | R196 | 8.1 | 3.3 | 2.3 4.3 | 6.3 5.3 12.3 |
| 35 | 1.3 | R197 | 8.1 | 11.2 | 2.3 4.3 | 6.3 3.3 5.3 12.3 9.3 |
| 36 | 1.3 | R197 | 8.1 | 11.2 | 2.3 4.3 | 6.3 3.3 5.3 12.3 9.3 |
| 37 | 1.3 | R197 | 8.1 | 11.2 | 2.3 4.3 | 6.3 3.3 5.3 12.3 9.3 |
| 38 | 1.3 | R197 | 8.1 | 11.2 | 2.3 4.3 | 6.3 3.3 5.3 12.3 9.3 |
| 39 | 1.3 | R197 | 8.1 | 11.2 | 2.3 4.3 | 3.3 12.3 9.3 |
| 40 | 6.3 | R197 | 5.3 | 11.2 | 8.1 4.3 13.3 | 3.3 12.3 9.3 |
| 41 | 6.3 | 2.3 | 5.3 | 1.3 | 8.1 4.3 13.3 | 3.3 11.2 12.3 9.3 |

*FIG. 16C*

| # | PW | Tote | Elapsed | UTRdy | DTRdy | -UDif | -DDif | Move | Pick | Rep |
|---|---|---|---|---|---|---|---|---|---|---|
| 1 | L5 | 9.3 | 3629.8 | | | | | | 3 | 1 |
| 2 | L5 | 9.3 | 3635.8 | | 3633.8 | | | | 6 | |
| 3 | L5 | 13.3 | 3638.8 | | | | | | 3 | |
| 4 | L5 | 13.3 | 3644.8 | 3638.1 | | | | | 6 | |
| 5 | L5 | 14.2 | 3650.8 | | | | | | 6 | |
| 6 | L5 | 12.3 | 3654.8 | | 3655.8 | | -1.08 | | 3 | 1 |
| 7 | L5 | 12.3 | 3657.8 | | | | | | 3 | |
| 8 | L5 | 12.3 | 3663.8 | 3656.3 | | | | | 6 | |
| 9 | L5 | 11.2 | 3669.8 | | | | | | 6 | |
| 10 | L5 | 3.3 | 3673.8 | | 3670.1 | | | | 3 | 1 |
| 11 | L5 | 3.3 | 3676.8 | | | | | | 3 | |
| 12 | L5 | 3.3 | 3679.8 | | | | | | 3 | |
| 13 | L5 | 3.3 | 3685.8 | 3674.9 | | | | | 6 | |
| 14 | L5 | 7.3 | 3691.8 | 3690.4 | | | | | 6 | |
| 15 | L5 | 5.3 | 3695.8 | | 3688.1 | | | | 3 | 1 |
| 16 | L5 | 5.3 | 3701.8 | 3701 | 3708.5 | | -6.69 | | 6 | |
| 17 | L5 | 12.2 | 3707.8 | | | | | | 6 | |
| 18 | L5 | 2.3 | 3710.8 | | | | | | 3 | |
| 19 | L5 | 2.3 | 3723.5 | 3714 | | | | 5.71 | 6 | 1 |
| 20 | M5 | 11.2 | 3726.5 | | | | | | 3 | |
| 21 | M5 | 11.2 | 3729.5 | | | | | | 3 | |
| 22 | M5 | 11.2 | 3741.4 | | 3741.1 | | | 5.96 | 6 | |
| 23 | M4 | 12.3 | 3744.4 | | | | | | 3 | |
| 24 | M4 | 12.3 | 3751.4 | 3737.3 | | | | | 6 | 1 |
| 25 | M4 | 3.3 | 3757.4 | | | | | | 6 | |
| 26 | M4 | 7.3 | 3760.4 | | | | | | 3 | |
| 27 | M4 | 7.3 | 3772.4 | 3762.5 | | | | 5.96 | 6 | |
| 28 | M3 | 3.3 | 3778.4 | | | | | | 6 | |
| 29 | M3 | 4.3 | 3785.4 | 3784.3 | 3749.3 | | | | 6 | 1 |
| 30 | M3 | 12.3 | 3797.4 | 3796.1 | | | | 5.96 | 6 | |
| 31 | M2 | 1.3 | 3803.4 | | | | | | 6 | |
| 32 | M2 | 6.3 | 3809.4 | | 3801.1 | | | | 6 | |
| 33 | M2 | 9.3 | 3815.4 | 3810.6 | | | | | 6 | |
| 34 | M2 | 3.3 | 3828.3 | | 3824.6 | | | 5.96 | 6 | 1 |
| 35 | M1 | 1.3 | 3831.3 | | | | | | 3 | |
| 36 | M1 | 1.3 | 3834.3 | | | | | | 3 | |
| 37 | M1 | 1.3 | 3840.3 | 3826.5 | | | | | 6 | |
| 38 | M1 | 8.1 | 3843.3 | | | | | | 3 | |
| 39 | M1 | 8.1 | 3850.3 | 3853.2 | | -2.87 | | | 6 | 1 |
| 40 | M1 | 11.2 | 3856.3 | | 3833.4 | | | | 6 | |
| 41 | M1 | 6.3 | 3867.1 | 3863.5 | | | | 4.76 | 6 | |

FIG. 17A

| # | ToteCyc | NextUse | Ucrit | Dcrit | VUTime | VUBuf | VDTime | VDBuf |
|---|---|---|---|---|---|---|---|---|
| 1 | 10 | 0 | | | | | | |
| 2 | 10 | 173.601 | | 14.2 | | | 20.08 | 0.20 |
| 3 | 9 | 0 | | | | | | |
| 4 | 9 | 265.253 | 3.3 | | 11.50 | 20.40 | | |
| 5 | 6 | Done | | | | | | |
| 6 | 13 | 0 | | 11.2 | | | 14.29 | 1.23 |
| 7 | 13 | 0 | | | | | | |
| 8 | 13 | 77.676 | 5.3 | | 11.10 | 23.40 | | |
| 9 | 6 | 53.7135 | | | | | | |
| 10 | 16 | 0 | | 7.3 | | | 14.29 | 5.30 |
| 11 | 16 | 0 | | | | | | |
| 12 | 16 | 0 | | | | | | |
| 13 | 16 | 65.676 | 2.3 | | 4.60 | 17.40 | | |
| 14 | 6 | 65.676 | 11.2 | | 10.60 | 22.52 | | |
| 15 | 10 | 0 | | 12.2 | | | 12.69 | 1.40 |
| 16 | 10 | 177.291 | R193 | 11.2 | 12.19 | 4.40 | 18.14 | 8.32 |
| 17 | 6 | Done | | | | | | |
| 18 | 15.7135 | 0 | | | | | | |
| 19 | 15.7135 | 149.328 | 12.3 | | 13.78 | 11.27 | | |
| 20 | 17.9625 | 0 | | | | | | |
| 21 | 17.9625 | 0 | | | | | | |
| 22 | 17.9625 | 114.85 | | 3.3 | | | 19.36 | 4.03 |
| 23 | 10 | 0 | | | | | | |
| 24 | 10 | 33.9625 | 7.3 | | 11.01 | 2.65 | | |
| 25 | 6 | 14.9625 | | | | | | |
| 26 | 14.9625 | 0 | | | | | | |
| 27 | 14.9625 | Done | R195 | | 11.93 | 2.65 | | |
| 28 | 6 | 36.9625 | | | | | | |
| 29 | 7 | 155.54 | 1.3 | 6.3 | 10.67 | 8.61 | 15.72 | 14.61 |
| 30 | 11.9625 | 112.615 | 9.3 | | 13.23 | 8.65 | | |
| 31 | 6 | 24.9625 | | | | | | |
| 32 | 6 | 46.9625 | | R196 | | | 15.21 | 2.65 |
| 33 | 6 | 159.682 | 8.1 | | 11.12 | 21.61 | | |
| 34 | 12.9625 | 124.577 | | R197 | | | 13.45 | 9.88 |
| 35 | 12 | 0 | | | | | | |
| 36 | 12 | 0 | | | | | | |
| 37 | 12 | 44.7272 | 6.3 | | 12.87 | 11.40 | | |
| 38 | 10 | 0 | | | | | | |
| 39 | 10 | 108.328 | 5.3 | | 10.25 | 21.26 | | |
| 40 | 6 | 65.6521 | | 2.3 | | | 11.41 | 5.65 |
| 41 | 10.7647 | Done | R198 | | 12.95 | 12.84 | | |

FIG. 17B

| # | Tote1 | Tote2 | Tote3 | Tote4 | TopPlat | BotPlat |
|---|---|---|---|---|---|---|
| 1 | 13.3 | R189 | 12.3 | 9.3 | 7.3 12.2 11.2 R188 14.2 R190 R191 6.3 7.2 R192 R185 | 2.3 1.3 |
| 2 | 13.3 | R189 | 12.3 | 9.3 | 7.3 12.2 11.2 R191 7.2 R192 R185 | 2.3 1.3 |
| 3 | 13.3 | 14.2 | 12.3 | R190 | 7.3 12.2 11.2 R191 7.2 R192 R185 | 2.3 1.3 9.3 6.3 |
| 4 | 13.3 | 14.2 | 12.3 | R190 | 7.3 12.2 11.2 R191 7.2 R192 R185 | 2.3 1.3 9.3 6.3 |
| 5 | 3.3 | 14.2 | 12.3 | R190 | 7.3 12.2 11.2 13.3 7.2 R191 R192 R185 | 2.3 1.3 9.3 6.3 |
| 6 | 3.3 | 14.2 | 12.3 | R190 | 7.3 12.2 R192 R185 7.2 13.3 | 2.3 1.3 9.3 6.3 |
| 7 | 3.3 | R191 | 12.3 | 11.2 | 7.3 12.2 R192 R185 7.2 13.3 | 2.3 1.3 9.3 6.3 |
| 8 | 3.3 | R191 | 12.3 | 11.2 | 7.3 12.2 R192 R185 7.2 13.3 | 2.3 1.3 9.3 6.3 |
| 9 | 3.3 | R191 | 5.3 | 11.2 | 7.3 12.2 R192 12.3 R185 7.2 13.3 | 2.3 1.3 9.3 6.3 |
| 10 | 3.3 | R191 | 5.3 | 11.2 | 12.2 12.3 R185 7.2 13.3 | 2.3 1.3 9.3 6.3 |
| 11 | 3.3 | 7.3 | 5.3 | R192 | 12.2 12.3 R185 7.2 13.3 | 2.3 1.3 9.3 11.2 6.3 |
| 12 | 3.3 | 7.3 | 5.3 | R192 | 12.2 12.3 R185 7.2 13.3 | 2.3 1.3 9.3 11.2 6.3 |
| 13 | 3.3 | 7.3 | 5.3 | R192 | 12.2 12.3 R185 7.2 13.3 | 1.3 9.3 11.2 6.3 |
| 14 | 2.3 | 7.3 | 5.3 | R192 | 12.3 3.3 12.2 R185 7.2 13.3 | 1.3 9.3 6.3 |
| 15 | 2.3 | 7.3 | 5.3 | R192 | 3.3 R185 7.2 13.3 11.2 | 1.3 9.3 6.3 |
| 16 | 2.3 | 7.3 | 5.3 | 12.2 | 3.3 R185 | 1.3 9.3 12.3 6.3 |
| 17 | 2.3 | 11.2 | R193 | 12.2 | 3.3 5.3 4.3 R185 | 1.3 9.3 7.3 12.3 6.3 |
| 18 | 2.3 | 11.2 | R193 | 12.2 | 3.3 5.3 4.3 R185 | 1.3 9.3 7.3 12.3 6.3 |
| 19 | 2.3 | 11.2 | R193 | 12.2 | 3.3 5.3 4.3 R185 | 1.3 9.3 7.3 6.3 |
| 20 | R194 | 11.2 | 12.3 | 12.2 | 3.3 5.3 2.3 R193 4.3 R185 | 1.3 9.3 7.3 6.3 |
| 21 | R194 | 11.2 | 12.3 | 12.2 | 3.3 5.3 2.3 R193 4.3 R185 | 1.3 9.3 7.3 6.3 |
| 22 | R194 | 11.2 | 12.3 | 12.2 | 2.3 R185 | 1.3 9.3 7.3 6.3 |
| 23 | R194 | 4.3 | 12.3 | 3.3 | 2.3 R185 | 1.3 9.3 7.3 11.2 5.3 6.3 |
| 24 | R194 | 4.3 | 12.3 | 3.3 | 2.3 R185 | 1.3 9.3 5.3 11.2 |
| 25 | 7.3 | 4.3 | 12.3 | 3.3 | 2.3 R194 6.3 R185 | 1.3 9.3 5.3 11.2 |
| 26 | 7.3 | 4.3 | 12.3 | 3.3 | 2.3 R194 6.3 R185 | 1.3 9.3 5.3 11.2 |
| 27 | 7.3 | 4.3 | 12.3 | 3.3 | 2.3 R194 6.3 R185 | 1.3 9.3 5.3 |
| 28 | R195 | 4.3 | 12.3 | 3.3 | 2.3 11.2 R194 7.3 6.3 R185 | 1.3 9.3 5.3 |
| 29 | R195 | 4.3 | 12.3 | 3.3 | 2.3 11.2 7.3 | 9.3 5.3 |
| 30 | 1.3 | 6.3 | 12.3 | 3.3 | 2.3 11.2 R195 R196 7.3 | 5.3 4.3 |
| 31 | 1.3 | 6.3 | 9.3 | 3.3 | 2.3 12.3 11.2 R195 R196 R197 7.3 | 5.3 4.3 |
| 32 | 1.3 | 6.3 | 9.3 | 3.3 | 2.3 11.2 R197 12.3 | 5.3 4.3 |
| 33 | 1.3 | R196 | 9.3 | 3.3 | 2.3 11.2 R197 12.3 | 6.3 5.3 |
| 34 | 1.3 | R196 | 8.1 | 3.3 | 2.3 4.3 9.3 | 6.3 5.3 |
| 35 | 1.3 | R197 | 8.1 | 11.2 | 2.3 4.3 9.3 | 6.3 3.3 5.3 12.3 |
| 36 | 1.3 | R197 | 8.1 | 11.2 | 2.3 4.3 9.3 | 6.3 3.3 5.3 12.3 |
| 37 | 1.3 | R197 | 8.1 | 11.2 | 2.3 4.3 9.3 | 3.3 5.3 12.3 |
| 38 | 6.3 | R197 | 8.1 | 11.2 | 2.3 4.3 9.3 1.3 13.3 | 3.3 5.3 12.3 |
| 39 | 6.3 | R197 | 8.1 | 11.2 | 2.3 4.3 9.3 1.3 13.3 | 3.3 12.3 |
| 40 | 6.3 | R197 | 5.3 | 11.2 | 8.1 4.3 13.3 | 3.3 12.3 |
| 41 | 6.3 | 2.3 | 5.3 | 1.3 | 8.1 4.3 13.3 | 3.3 11.2 12.3 9.3 |

*FIG. 17C*

| # | ConIn | VICU NT | VICU Pas | VICD NT | VICD Pas | ConOut |
|---|---|---|---|---|---|---|
| 1 | | | | | | |
| 2 | | | | R190 14.2 | R188 6.3 | |
| 3 | | | | | | R189 R188 |
| 4 | 5.3 | 3.3 | | | | |
| 5 | | | | | | |
| 6 | | | | 11.2 R191 | | |
| 7 | | | | | | 14.2 R190 |
| 8 | | 5.3 | | | | |
| 9 | | | | | | |
| 10 | | | | R192 7.3 | | |
| 11 | | | | | | R191 |
| 12 | | | | | | |
| 13 | | 2.3 | | | | |
| 14 | R193 4.3 | | 11.2 | | | |
| 15 | | | | 12.2 | 12.3 | |
| 16 | R194 | R193 | 4.3 | 11.2 | 7.2 13.3 | R192 |
| 17 | | | | | | 7.2 13.3 |
| 18 | | | | | | |
| 19 | | R194 12.3 | | | | |
| 20 | | | | | | |
| 21 | | | | | | |
| 22 | | | | 3.3 4.3 | 5.3 R193 | |
| 23 | | | | | | 12.2 R193 |
| 24 | R195 | 7.3 | 6.3 | | | |
| 25 | | | | | | |
| 26 | | | | | | |
| 27 | R196 | R195 | 11.2 | | | |
| 28 | | | | | | |
| 29 | R197 | 1.3 | R196 | 6.3 | R194 R185 | |
| 30 | 8.1 | 9.3 | R197 | | | R194 R185 |
| 31 | | | | | | |
| 32 | | | | R196 | R195 7.3 | |
| 33 | 13.3 | 8.1 | 4.3 | | | R195 7.3 |
| 34 | | | | 11.2 R197 | 12.3 | |
| 35 | | | | | | R196 |
| 36 | | | | | | |
| 37 | | 6.3 | 13.3 | | | |
| 38 | | | | | | |
| 39 | R198 | 5.3 | | | | |
| 40 | | | | 1.3 2.3 | 9.3 | |
| 41 | R199 | R198 | | | | R197 |

FIG. 17D

FCA Conveyor/Vertical Elevator Embodiment #1

FCA Conveyor/Vertical Elevator Embodiment #2

Conveyor Embodiment

MULTI-LEVEL TOTE CACHE STORAGE AND SEQUENCING FOR IMPROVED PICKER PERFORMANCE

CROSS-REFERENCE TO RELATED APPLICATIONS

This application claims priority benefit, including under 35 U.S.C. § 119(e), of U.S. Provisional Patent Application No. 63/130,603, filed Dec. 24, 2020 by Robert D. Ahmann and titled "Multi-level tote cache storage and sequencing for improved picker performance," which is incorporated herein by reference in its entirety.

This application is related to:
U.S. Provisional Patent Application No. 62/405,219, filed Oct. 6, 2016 by Robert D. Ahmann and titled "Automated warehouse fulfillment operations and system,"
U.S. Provisional Patent Application No. 62/689,829, filed Jun. 25, 2018 by Robert D. Ahmann titled "Optimized Batch Picking for Automated Warehouse Systems,"
U.S. Provisional Patent Application No. 62/812,250, filed Feb. 28, 2019 by Robert D. Ahmann titled "Extension of Optimized Batch Picking for Automated Warehouse Systems",
PCT Patent Application No. PCT/US2017/055664, filed Oct. 6, 2017 by Robert D. Ahmann et al. and titled "Automated warehouse fulfillment operations and system" (published Apr. 12, 2018 as PCT Publication No. WO 2018/068024A1),
U.S. Pat. No. 11,136,192, issued Oct. 5, 2021 to Robert D. Ahmann et al. and titled "Automated warehouse fulfillment operations and system,"
PCT Patent Application No. PCT/US2017/055667, filed Oct. 6, 2017 by Robert D. Ahmann et al. and titled "Automated warehouse fulfillment system and method of operation" (published Apr. 12, 2018 as PCT Publication No. WO 2018/068026A1),
U.S. Pat. No. 11,142,399, issued Oct. 12, 2021 to Robert D. Ahmann et al. and titled "Automated warehouse fulfillment system and method of operation," and
PCT Patent Application No. PCT/US2019/039087, filed Jun. 25, 2019 by Robert D. Ahmann and titled "Automated Warehouse System and Method for Optimized Batch Picking" (published Jan. 2, 2020 as PCT Publication WO 2020/006010A1),
each of which is each incorporated herein by reference in its entirety.

FIELD OF THE INVENTION

The present invention relates to the field of automated fulfillment of Orders for goods (each good or item also referred to as a stock-keeping unit (SKU)), and more specifically to a method and apparatus of storing and sequencing the storage containers (also referred to as Totes) used to aggregate the (SKUs) that are included in those Orders in an effort to provide a Picker the ability to achieve maximum Pick Rate/Performance and throughput of picked SKUs.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings attached hereto: Copyright® 2016-2021, Robert D. Ahmann, All Rights Reserved.

BACKGROUND OF THE INVENTION

Fulfillment of Orders for goods by customers using the internet has become a very important and cost-competitive business threatening the traditional retail space. This dramatic shift was initiated with the formation of Amazon Inc. in the 1990's. eCommerce, as it has come to be known, appears to be establishing itself as the primary mechanism for selling goods.

As a result, the cost associated with fulfilling an Order has become a primary focus of companies practicing eCommerce from their Fulfillment Centers. The largest cost associated with these Fulfillment Centers is generally the cost of Order picking—essentially, gathering the goods that are specified in an Order. Historically, that cost can exceed 50% of the operational costs of the Fulfillment Centers. The reason for these costs is a manual picker typically spends up to 75% of the picker's time in non-value-added activities, primarily walking, which is wasted movement.

That caused Amazon in 2012 to acquire the company Kiva for a sum of $775M, likely a price exceeding 20 times revenue. Their solution was a plurality of small robots that retrieve/present/return small storage towers to the Picker (i.e., a human who picks an item from the storage tower and places the item into a container that holds one or more items for a customer's Order). This intellectual-property acquisition excluded that technology from all of Amazon's other competitors.

This caused the remainder of the growing industry to pursue other Automated Warehouse Systems (AWS's) in their efforts to reduce costs. Most current commercialized automated solutions (including Kiva) focus on automating the presentation of goods to a stationary Picker. Exceptions include the Fulfillment Center Automation (FCA) system, which automates taking the Picker to the goods (so-called "Picker-to-Goods" systems).

The reason no automated "Picker-to-Goods" system is widely used today is the belief that moving a Picker in an automated manner to locations (generally on an Aisle Pick Face) where they can perform a Pick Action will still result in excessive motion of the Picker, essentially the same wasted movement that occurs with manual picking. The inventions in the cross-referenced patent applications (U.S. Provisional Patent Application 62/405,219, PCT application US 2020/0198892A1, PCT publication WO 2018/068026A1, U.S. Provisional Patent Application 62/689,829, U.S. Provisional Patent Application 62/812,250, and PCT publication WO 2020/006010A1) partially circumvented this issue through novel methods of moving the Picker (combinatorial optimization to minimize travel distance) and/or batching multiple Orders into one or more Totes. These novel methods provided Pick Rate performance equivalent to, or better than, the other automated "Goods-to-Picker" systems that currently exist.

A key to these significant improvements is maximizing the Picker's immediate access to as many SKU Storage Bins as possible. This is accomplished by creating a Picker Platform for the Picker that can move vertically and horizontally within an Aisle where the Picker has access to Pick Faces on either side of the Picker Platform. The size of the Picker Platform determines the size of the Pick Window, which determines how many SKU Storage Bins the Picker has access to. This specifically creates the possibility for Chain Picks.

The FCA system employing a Batch Optimization algorithm as described in the cross-referenced patent applications utilizes Tote Storage and Sequencing for the Totes holding the Order SKUs, but is still prone to significant Picker delay without employing the associated system architecture, hardware, and associated algorithms provided in the present invention description. Together, the associated system architecture, hardware, and associated algorithms covered in this invention description set a new level of potential performance in the industry. Today, the accepted prolonged level of performance for the current generation of conventional AWS's is between 400 and 600 Picks per Hour (PPH). This document demonstrates the improved performance achieved with the present invention description combined with the inventions from the cross-referenced patent applications.

Besides PCT Publication No. WO 2018/068026A1 by Ahmann et al. listed above, other patents which describe background technology related to by the present invention include the following:

U.S. Pat. No. 3,351,219 to Ruderfer issued with the title "WAREHOUSING ORDER SELECTION SYSTEM" and is incorporated herein by reference. U.S. Pat. No. 3,351,219 describes a selective order selection system for removing individual articles from a pallet-type unit load, in which the actual condition of articles remaining at the desired unit load is sensed and a picker means is actuated to individually remove the next article. A warehousing system employing this system is described.

U.S. Pat. No. 6,602,037 to Winkler issued Aug. 5, 2003 with the title "System for picking articles situated in rack storage units" and is incorporated herein by reference. U.S. Pat. No. 6,602,037 describes a system for picking articles situated in a rack storage unit, which includes a plurality of parallel rack rows for the storage of articles situated on retrieval pallets and/or in containers, storage aisles and picking aisles formed alternately between the rack row, at least one storage vehicle in each storage aisle, which vehicle is designed to accommodate at least one retrieval pallet and/or container and is capable of travelling along each storage aisle to place the retrieval pallets and/or containers into storage in the pallet racks, at least one picker vehicle in each picking aisle for picking the articles to be picked, which is capable of travelling along in each case one of the two mutually opposing picking fronts forming the picking aisle, buffer locations, which are disposed in the picking aisles between the routes of the picker vehicles travelling along the two opposing picking fronts, for the intermediate storage and/or transfer of the pick articles from a picker vehicle at one side of the picking aisle to a picker vehicle at the other side of the picking aisle, and a system controller comprising a control computer. Besides the storage and retrieval of pallets, the system according to the invention according to a preferred embodiment also allows the storage and retrieval of containers for smaller articles.

U.S. Pat. No. 8,718,815 to Shimamura issued on May 6, 2014 with the title "Automated warehouse system," and is incorporated herein by reference. U.S. Pat. No. 8,718,815 describes an automated warehouse system asserted to have an improved cycle efficiency of storing and retrieving articles to and from the automated warehouse system includes a storage station, a retrieval station, a plurality of article storage shelves, a stacker crane, and a system controller. An article is brought to the storage station to be stored and retrieved from the retrieval station. The article storage shelves store articles. The stacker crane can move an article between the storage station, the retrieval station, and the article storage shelves. The system controller keeps track of the amount of storage time articles have been stored and, when it determines that an article has been stored on an article storage shelf in a buffer area for a first predetermined amount of time or longer, the system controller controls the stacker crane such that the stacker crane carries the article from an article storage shelf in the buffer area to an article storage shelf in the first storage area.

There remains a need for further-improved systems for inventory management and movement.

Definitions Used in this Application

Aisle—The space between two storage racks in which the Picker operates. Two Aisle faces are exposed to the picker when the Picker is within an Aisle.

Automated Guided Vehicles (AGV's)—Robotic driverless vehicles that can follow prescribed paths within a warehouse carrying goods from one point to another.

Automated Warehouse Systems (AWS's)—Mechanized systems used to increase the Pick Rate and the accuracy with which orders are fulfilled within a Fulfillment Center above and beyond what manual operation can provide. These AWS's are currently in general Goods-to-Picker systems.

Batch—A group of Orders collected into one or more Totes and sent to Shipping where the individual SKUs specified in the Orders are segregated back into individual Orders.

Batch Optimization—The assignment of the right Orders to the right Batches and the Orders' SKUs to the right Tote within the Batch to maximize Multi-Picks and Chain Picks.

Batch Window—The period of time Orders are aggregated to provide the plurality of Orders used to populate the optimized Batches described in the cross-referenced patent applications.

Bin—Container that resides on the shelves within a warehouse Aisle. A Bin contains individual SKU's available to be utilized by the Picker to fulfill individual Orders. Some Bins contain only one SKU type while others may contain numerous types. The Bins, in some embodiments, are open faced to allow picking without withdrawing the container from the shelf.

Bin Wall—A collection of small cubicles (compartments or bins (unrelated to those Bins in an Aisle Wall)) where a Bin Wall operator segregates Orders which are presented to the Bin Wall operator combined in a Tote or Totes. The segregation is generally accomplished with a bar code scanner and the associated software that directs the Bin Wall operator which cubicles Items should be placed in to ultimately constitute individual Orders, ready to ship. Bin Walls are also referred to as "Put Walls" commercially.

Chain Pick—When multiple picks are performed one after another with no interruption to place the ensuing Items into the Tote accumulating the current Batch. A Chain Pick results from SKU's located in a common Pick Window being assigned to the same Tote.

Combinatorial Optimization (CO)—A Combinatorial Optimization problem is an optimization problem, where an optimal solution is identified from a finite set of solutions. The solutions are normally discrete or can be formed into discrete. Combinatorial Optimization is an important topic studied in operations research, software engineering, artificial intelligence, machine learning, and so on.

Conveyance Device—A mechanism that transports material, potentially contained in Totes, in a linear direction, either vertically or horizontally or a combination of both. Examples are a Conveyor, a Vertical Elevator, an AGV, or a combination of a plurality of them to provide multi-dimensional movement.

Conveyor—A common piece of mechanical material-handling equipment that moves materials from one location to another in an automated manner, generally along some type of track.

Cross-Lift—A mechanical mechanism on a Conveyor that allows the perpendicular transfer of items or material from one Conveyor to another parallel Conveyor.

Delay-Load Tote Storage (Generally Level-2 Tote Storage)—Tote Storage which the Picker does not have immediate access to and is typically located at a remote location away from the Picker. Level-2 Delay-Load Tote Storage experiences delays, in some embodiments, between retrieving the required Totes and placing then on the Conveyance Device (i.e., Conveyor, Vertical Elevator, etc.) leading to the Picker and thus is accomplished one at a time in some embodiments.

Dynamic Slotting—The periodic planned movement of SKU placement locations in the Shelving Units to keep the overall placement optimized where SKUs with the highest Velocity are placed near one another. The Velocity of the SKUs is monitored real time and the results of the monitoring are used to rearrange SKU placements in the bins in order to achieve this optimal placement.

FCA (Fulfillment Center Automation (FCA) system)—The term FCA is used to refer to the Fulfillment Center Automation in its entirety (i.e., including all physical hardware) which is an automated Picker-to-Goods Automated Warehouse System described in the cross-referenced patent applications.

FCA Control Software—Refers to the system that downloads Orders from the WMS (described below), schedules fulfillment, tracks local Bin data and Tote data, keeps the WMS updated, and performs the optimization described in the cross-referenced patent applications.

Fulfillment Center—A distribution warehouse where orders are prepared for shipping to a customer.

Item—A single unit/piece of a given SKU.

Level-0 Tote Storage—Mechanisms that are stationary to the Level-0 Spatial Reference Point and can either store a Tote in a static position or transport a Tote relative to that Level-0 Spatial Reference Point. In the FCA, the Level-0 Spatial Reference Point is on the Picker Platform. In some embodiments, Level-0 Tote Storage has the ability to move its Spatial Reference Point relative to the Spatial Reference Point of the associated Pick Faces of the Aisle in a plurality of spatial dimensions, such as (in some embodiments) moving both horizontally and vertically relative to the pick face. In some embodiments, this moves the picker, picker platform, and Level-0 Tote Storage to the computer-selected horizontal and vertical location (of the Spatial Reference Point of the associated Pick Face(s) of the Aisle) for the picker to pick SKUs from bins on the Pick Face(s) and place the SKUs in selected Totes in the Level-0 Tote Storage. In some embodiments, Level-0 Tote Storage provides complete access to a plurality of Totes by the Picker at "all" times (i.e., whenever the Picker is at the computer-selected Spatial Reference Point of the associated Pick Faces of the Aisle and has SKUs ready to place into the Totes). In the FCA, due to the generally limited space near the Picker, these Totes are constantly Recirculated between Level-1 Tote Storage (generally Quick-Load Storage) and Level-2 Tote Storage (generally Delay-Load Storage).

Level-1 Tote Storage—Mechanisms that are stationary to the Level-1 Spatial Reference Point and can either store a Tote in a static position or transport a Tote relative to that Level-1 Spatial Reference Point. In the FCA, the Level-1 Spatial Reference Point is located in the Aisle between the associated Pick Faces. In some embodiments, Level-1 Tote Storage has the ability to move its Spatial Reference Point relative to the Spatial Reference Point of the associated Pick Faces of the Aisle in at least one dimension, such as (in some embodiments) moving at least horizontally relative to the pick face. The reduction in mobility is generally used to provide additional space between the Pick Faces of the Aisle for the mechanisms constituting Level-1 Tote Storage.

Level-2 Tote Storage—Mechanisms that are stationary to the Level-2 Spatial Reference Point and can either store a Tote in a static position or transport a Tote relative to that Level-2 Spatial Reference Point. In some embodiments of the FCA, the Level-2 Spatial Reference Point is located out of the Aisle and is static relative to the Spatial Reference Point of the associated Pick Faces of the Aisle. In other embodiments, the Level-2 Spatial Reference Point is located in the Aisle and is static relative to the Spatial Reference Point of the associated Pick Faces of the Aisle. In some embodiments, Level-2 Tote Storage does not have a need to move its Spatial Reference Point relative to the Spatial Reference Point of the associated Pick Faces of the Aisle during a period of time while the Level-1 Tote Storage moves in one dimension (e.g., in some embodiments, horizontally along with the PAV) and/or while the Level-0 Tote Storage moves in two dimensions (e.g., in some embodiments, both horizontally and vertically) relative to the Spatial Reference Point of the associated Pick Faces of the Aisle. Not having the need to move its Spatial Reference Point nor be constrained by the Pick Faces of the Aisle permits Level-2 Tote Storage to be much larger in capacity and more economical.

Level-M Tote Storage—Mechanisms that are stationary to the Level-M Spatial Reference Point and can either store a Tote in a static position or transport a Tote relative to that Level-M Spatial Reference Point. Level-M Tote Storage does not exist in the FCA but can exist hypothetically, in which case the Level-M Spatial Reference Point has the ability for relative movement between itself and the Spatial Reference Point of the Level of Tote Storage just below it.

Lift Truck—A power-driven industrial type of truck used for horizontal and/or vertical transportation that is equipped with a power-operated lifting device usually in the form of a fork or platform. A Lift Truck, in some embodiments, is modified for automated movement between two fixed points such that the operator is free to perform other valuable tasks at the same time that the Lift Truck automatically moves horizontally and/or vertically.

Line Item—Every product on the order is referenced by a record that includes a SKU Identifier, a quantity, and a reference to which Order the product belongs. This record is known as a Line Item.

Linear Actuator—A mechanical device that converts energy (power from air, electricity, or liquid) to create motion in a straight line.

Memory Storage Cache—Memory Storage Caches are pools of memory in a computer that store information the central-processing unit (CPU) is most likely to need next. In some embodiments, Memory Storage Cache includes different levels (i.e., Level 0 through Level 3), with Level 0 being the smallest and fastest and Level 3 being the largest and slowest. Which information is stored in which level in the Cache depends on sophisticated algorithms and certain assumptions about programming code. The goal of the Memory Storage Cache system is to ensure the CPU has immediate use of the next bit of data the CPU will need (Level 0) without having to use the longer time needed to retrieve the data from higher-level storage.

Mini-ASRS (Automated Storage and Retrieval System)—Tote Storage device that utilizes a gantry crane and load handling device to be able to automatically store and retrieve Totes from shelves.

Multi-Level Tote Storage—A system where more than one type of Tote Storage (Levels 0, 1, 2, . . . ) mechanisms are interconnected by one or more Conveyance Devices and are utilized to permit fulfillment of Orders by a Picker.

Multi-Level Tote Storage Simulation—An algorithm that is required to control how and when Totes flow between the different levels of Tote Storage to ensure the Picker has the Totes required to fulfill all Pick Requests on a Pick List without any delays.

Multi-Pick—When multiple Line Items of the same SKU from different Orders are picked at the same time to improve the Pick Rate.

Order—A Fulfillment Center customer generally creates an Order online for a purchaser to purchase Items from that company in exchange for payment. The WMS (Warehouse Management System) then breaks the Order into one or more Shipments. Either Orders or Shipments can be downloaded to the FCA, dependent on the WMS.

Order-Consolidation System—a system configured to remove selected SKUs from completed Totes for each respective Order of the plurality of Orders and place the selected SKUs into a respective order tote associated with the respective Order, where all SKUs associated with the respective Order are then in an Order Tote.

PAV—Picker Automated Vehicle—Picker Platform and its associated drive mechanism that transports and positions the Picker horizontally and/or vertically within an Aisle.

Pick Action—All the various movements required to successfully perform a pick. In a manual system that could entail the time required to walk from one pick location to another. In more-automated systems, that time is reduced. The reduction of the time associated with a Pick Action is the goal of all Fulfillment Centers.

Pick Cycle—The time required by a Picker to perform all the actions associated with retrieving a SKU to fulfill a Pick Request on a Pick List. The Pick Cycle also includes any required movements by the PAV.

Pick Face—All the Shelving Units and their Bins constituting one side of a warehouse Aisle.

Pick List—A plurality of Pick Requests that constitute all the picks a Picker must perform to fulfill the orders aggregated over a Batch Window.

Pick Rate/Performance—The average time required for a Picker to complete a single pick in a sequential series of continuous picks. This sequential series needs to be able to be replicated over a given time period such that the Pick Rate can be sustained. The Pick Rate then establishes the overall Pick Performance in Picks Per Hour (PPH).

Pick Request—A request that specifies a number of Items of a particular SKU that are to be picked and placed in the correct container (Tote) holding those Items for a given shipment.

Pick Window—Segmentation of a Pick Face into smaller individual areas, each containing its own respective Bins. The size of a Pick Window corresponds to an area of the Pick Face serviceable by the Picker Platform in a static position.

Picker—The entity that removes a SKU from a Bin to fulfill a Pick Request for the Orders contained in a Pick List. The entity can be a human, an autonomous picking robot, or a combination of the two.

Picker Platform—Platform on the PAV where the Picker resides. The Picker Platform can be extended vertically or moved horizontally by the PAV to give the Picker access to any storage location in a warehouse Aisle.

Prime Area—The central part of the Pick Face that contains the SKU's that account for approximately 90% of the Line Items in all Orders (in some embodiments, 24 of 108 Pick Windows).

Quick-Load Tote Storage (Generally Level-1 Tote Storage)—Tote Storage which the Picker does not have immediate access to and is typically located at a location near the Picker. In some embodiments, Level-1 Quick-Load Tote Storage can load all the required Totes onto the Conveyance Device (i.e., Conveyor, Vertical Elevator, etc.) leading to the Picker at a speed that does not cause the Conveyance Device to wait.

Replenishment—The act of moving stock to the pick areas upon request from the WMS to restore the SKU reserves within the Shelving Units.

Sequence—The process of placing Totes in the correct order for presentation to the Picker such that the Pick List can be performed accurately.

Shelving Unit—An assembly consisting of framework and shelves extending from the floor to the full rack height. Shelving units are placed side by side to form an Aisle face.

Shipment—One or more Pick Items that are intended to be placed into a single shipping box.

Shuttle Cart—The cart which contains Vertical Elevators and is towed by the PAV in the FCA system. The Shuttle Cart carries Totes to/from the Aisle Conveyors to/from the Picker Platform in the correct sequence to facilitate Order picking in an optimized manner.

SKU—An industry-standard acronym for Stock Keeping Unit which is a distinct type of item for sale, such as a product or service, and optionally some or all attributes associated with the Item type that distinguish the SKU from other Item types.

SKU Identifier—A unique identifier or code that refers to the particular Stock Keeping Unit (SKU).

Spatial Reference Point—A point within a mechanical system relative to which all the associated components' position and movement are referenced from a three-dimensional spatial perspective (i.e., X, Y, and Z). Each respective mechanical system as a whole can then be moved so that respective mechanical system's Spatial Reference Point moves relative to some other system's Spatial Reference Point in an effort to provide some mechanical, timing and/or functional benefit.

Tote Storage—A device/mechanism having a plurality of Locations where Totes can be stored while awaiting processing by an Automated Warehouse System or awaiting transfer to a Bin Wall by Conveyors. The Tote Storage can be short-term (Level-0 Tote Storage or Level-1 Tote Storage), when specific Totes will be required within a short time frame, or long-term (Level-2 Tote Storage) when the cycle time is longer. In some embodiments, separating Tote Storage into different level types defines where the storage is located and how much is used at each level, subsequently allowing a lower overall amount of storage. While Totes are in Storage, Totes can be stationary with respect to one Level of tote Storage, or the Totes can be moving on conveyance mechanisms that move them to different locations within that particular Level of Storage. A Tote is contained within a particular Level of Storage until such time the Tote is either placed on a Conveyance Device capable of transporting that Tote to a different Level of Tote Storage, or the Tote is moved directly into a different Level of Tote Storage, all with the ability to reuse that Tote in Level-0 Tote Storage at any time in the future. In some embodiments, any mechanism or set of mechanisms that has the independent ability to Sequence Totes is acting as a Level of Tote Storage. While Totes are in storage (either static, moving within storage, or in use by the picker), in some embodiments, the system is configured to continue to simultaneously move Totes on a plurality of its Conveyance Devices to optimize their storage-location placement and/or location on the plurality of Conveyance Devices for future use (e.g., such use is: being at Level-0 Tote Storage to receive SKUs or being transported between the available levels of Tote Storage), or being sent to the Order-Consolidation System once all SKUs for a particular Tote are in that Tote.

Tote—A moveable storage container, that, in some embodiments, is a plastic Tote that is 600 mm long×400 mm wide×323 mm tall at the rim, with a 505 mm long×335 mm wide footprint, which is used as a storage container to hold the SKUs specified in an Order. Tote capacity can be 35 kg and Totes can typically be nested.

Tote Cycle—The time required to perform a series of non-stop Tote-movement actions identified by the Multi-Level Tote Storage Simulation algorithm on the Tote Conveyance Devices (i.e., Conveyors, Vertical Elevators, etc.) connecting the different mechanisms of the Tote Storage Levels. There is typically idle time between consecutive Tote Cycles.

Tote Recirculation—The iteratively repeated movement of at least a subset of the Totes between the available Levels of Tote Storage (in some embodiments, such that a selected plurality of the plurality of Totes is presented at all times to the picker at Level-0 Tote Storage to receive one or more SKUs, then temporarily moved to Level-1 and/or Level-2 Tote Storage, then one or more of the selected plurality is/are later returned to Level-0 Tote Storage after the PAV has moved the Picker to a different selected location on the Pick Face, for additional SKUs at that different selected location are to be added into the Totes), which allows the Picker to gradually and/or incrementally add SKUs to a Tote (using Multi-Picks and Chain Picks when possible) from each of a plurality of different locations on the Pick Face until such time all the SKUs assigned to that Tote and other Totes associated with any given Batch to fulfill the Orders of that given Batch are complete, and Totes exit (are moved from) the Pick Aisle and go to the Order-Consolidation System, which is configured to receive completed Totes of the plurality of Totes.

Velocity—The frequency with which any individual SKU is ordered.

Vertical Elevator—A mechanical device that can transport a load from one vertical position to another vertical position along a single vertical axis.

VIC (Vertical Indexed Conveyor)—One type of a vertical elevator which includes discrete indexed locations and moves Totes from one indexed location to the next indexed location.

WMS (Warehouse Management System)—Refers to the system that manages shipments, maintains SKU definitions, handles restock and replenishment, and provides problem-solving functionality.

SUMMARY OF THE INVENTION

The present invention is used as part of a Fulfillment Center Automation (FCA)-type Automated Warehouse System (AWS), wherein a picker, on a movable picker platform, picks goods from a plurality of bins located on a pick face of an aisle, and places each picked good into a selected tote that is automatically moved to and from the picker. The FCA AWS is combined with a Batch Optimization controller that controls timing and movement of totes to and from the picker.

The present invention adds a plurality of at least three levels of tote storage that each cache a plurality of totes at different spatial and temporal distances from the picker. A tote-movement controller controls movement and sequence order of totes among the various tote-caching storage levels such that each tote is moved into a selected position and at a selected time at the picker location in order to minimize time waiting for each tote, and thus maximize throughput of picked items.

With the addition of the present invention for Tote Storage, Tote Sequencing, and Tote-Delivery-Timing optimization, improved pick performance, inventory management and movement is achieved by utilizing the Fulfillment Center Automation (FCA)-type Automated Warehouse System (AWS) combined with Batch Optimization, which are the subjects of the cross-referenced patent applications. In some embodiments, the previous improved FCA-type AWS of the cross-referenced patent applications minimizes excess Picker movement in a Picker-to-Goods system, and the Batch Optimization groups Items from many Orders into Batches in order to combine picks into grouped Multi-Picks and Chain Picks. The present invention addresses the mechanism and method relative to Tote Storage and Tote Sequencing that is followed to attain maximum Pick Rate/Performance for some embodiments. The cross-referenced patent applications addressed a type of Automated Warehouse System (AWS) known as Fulfillment Center Automation (FCA) and an associated method for optimizing Batches to achieve significantly improved Pick Rate/Performance. However, the cross-referenced patent applications failed to fully address how the Totes used by the Picker are to be stored and moved within the AWS and subsequently sequenced for their use to receive an item picked by the Picker, in order to reduce or eliminate potential Picker delays due to unavailability of a specific Tote when that specific Tote is needed to receive a picked item, and thus maximize Pick Rate/Performance.

It was discovered there is a need to store or hold a plurality of Totes alongside the Picker for their immediate use based on the Pick List developed by the Batch-Optimization algorithm. In some embodiments of the present invention in the FCA system, those immediate-use Totes are stored or held within reach of the Picker on the Picker Platform. While the Picker utilizes these Totes that are nonmoving relative to the Picker Platform, the system works to position other Totes to be prepared to immediately replace the Tote(s) the Picker has completed (where here "completed" means that all items that were to be picked and placed in a particular Tote from within a Pick Window have been picked and placed into that particular Tote at Level-0 Tote Storage, and that particular Tote is moved to a higher level of Storage (i.e., Level-1, Level-2, . . . Level-M Tote Storage) for later recirculation back to Level-0 Tote Storage when that particular Tote is again needed to receive picked items). This need for replacement Totes requires some Totes in some embodiments to be stored at a location near the Picker and immediately available to the system such that the Totes can be positioned in the right sequence to either replace those Totes stored near the Picker or to move the Totes into a position where the Totes can be used for subsequent replacement.

While it would be ideal to have a maximum number of Totes alongside the Picker for immediate availability (Level-0 Tote Storage), there is generally not sufficient space (or described in another way, the number of Totes that can be placed within easy reach of the Picker is limited by how far the Picker can reach, how many different destination Totes for a just-picked Item can be readily distinguished by the Picker, and/or space available on the Picker Platform). Likewise, the room to store Totes that can be positioned to immediately replace those Level-0 Totes alongside the Picker (i.e., room in the Level-1 Tote Storage) is also limited in conventional embodiments. In some embodiments, this requires another group of Totes to be stored somewhat remotely (at a Level-2 Tote-Storage device) that can then be recalled (moved by a Conveyance Device from Level-2 Tote Storage) in the correct sequence when required to either replace those Level-0 Totes alongside the Picker or place the moved Totes in Level-1 Tote Storage for nearly immediate use by the system to replace those Level-0 Totes alongside the Picker at a shortly upcoming time. This remote Storage subsequently takes considerably longer time to access.

The coordination of all this Tote movement and Storage requires a control algorithm in some embodiments that cannot easily be performed strictly with real-time consideration. In some embodiments, the control algorithm requires simulating the movement of all the Totes ahead of time, using a variety of different Tote-movement sequences to take into consideration what effect the movement of any one Tote might have on other Totes relative to being in a position alongside the Picker when the Tote is required. If a Tote is not in a Level-0 position at the right time when the Picker is to make the pick, the Picker experiences unplanned delays. To the extent delays happen with any frequency, the Pick Rate/Performance can be severely negatively impacted.

The present invention provides a system (including the system's control method) that utilizes a plurality of different levels of Tote Storage (and sequencing) with a dependency on the time required to access any given Tote through interconnected Conveyance devices in an effort to significantly improve Pick Rate/Performance. It will be shown this Multi-Level approach of Tote Storage is analogous to how a computer utilizes different levels of memory storage to improve performance of the CPU, which is known as Multi-Level Cache Memory.

BRIEF DESCRIPTION OF THE DRAWINGS

FIG. 2 shows memory storage in the Cache from the lowest level 205 (Level 0) which is the fastest, but also the smallest due to its cost and physical-space limitations nearest the CPU, to the highest level 239 (Level 4) which is the largest and slowest, but costs the least.

FIG. 4 identifies the same components identified in FIG. 1 but specifically shows the paths (401-408) a Tote might follow from the Tote's entry point into the FCA on the incoming Conveyor 110 to the Tote's exit on the outgoing Conveyor 111.

FIG. 12 is an isometric view of an embodiment of a picker-platform system 1200 including a Level-0 Tote Storage mechanism 104 that can hold a plurality of Totes 107 that the Picker 106 has immediate access to.

FIGS. 16A-16D show representative results 1600A-1600D (together forming results referred to as 1600) for the initial assignments of the Multi-Level Tote Storage Simulation control algorithm for the Vertical Elevators. Following the initial assignments, in some embodiments the algorithm then iterates through various possible Tote movements and timings, to eliminate delays.

FIGS. 17A-17D show representative results 1700A-1700D (together forming results referred to as 1700) following the iterative corrections of the Multi-Level Tote Storage Simulation control algorithm for the Vertical Elevators. The iterative corrections eliminated the delays present following the initial assignments.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized, and structural changes may be made without departing from the scope of the present invention. The embodiments shown in the Figures and described here may include features that are not included in all specific embodiments. A particular embodiment may include only a subset of all the features described, or a particular embodiment may include all the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

Figure 12:
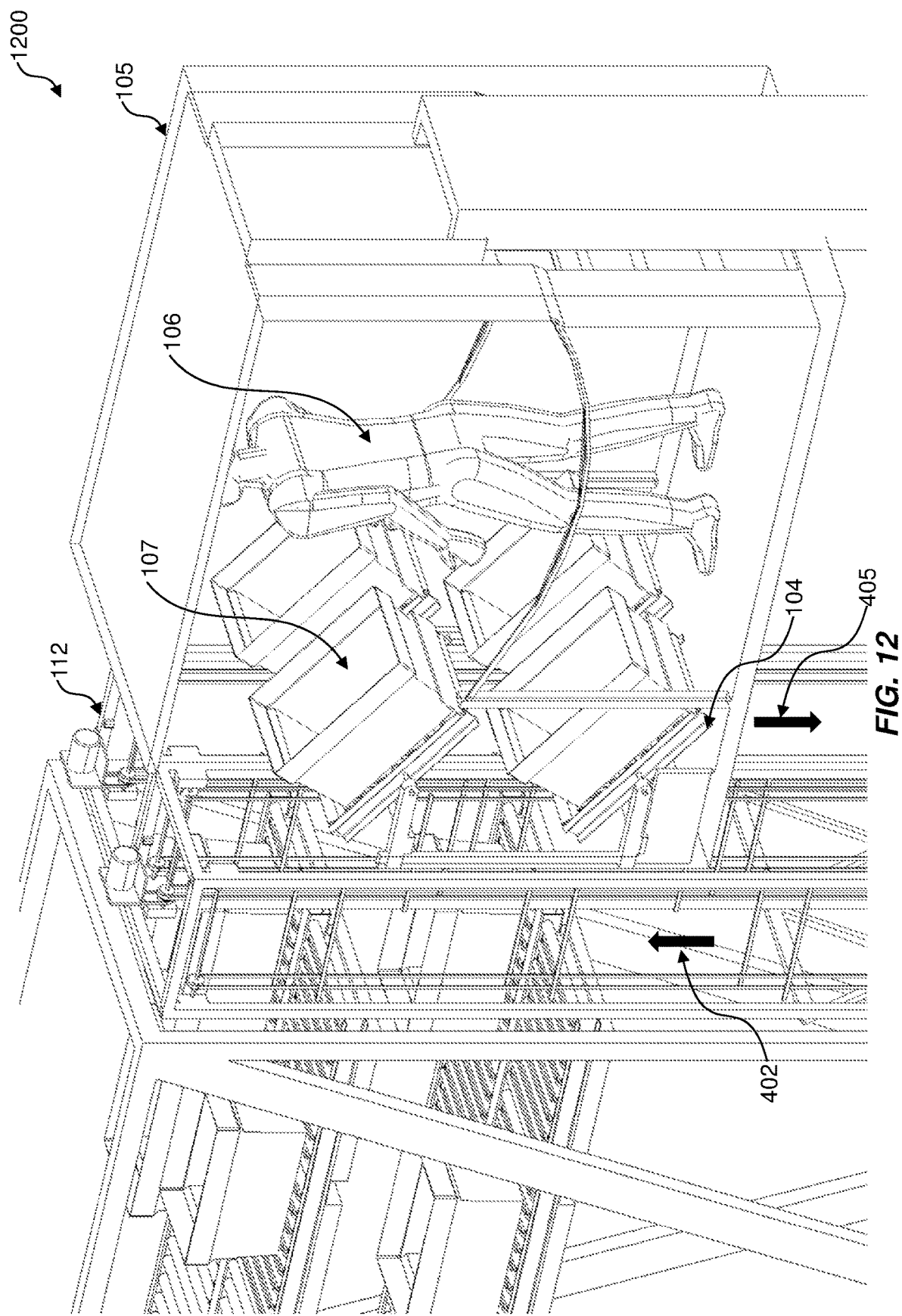

The preferred embodiments will also address concepts employed in the cross-referenced patent applications, the primary ones being the FCA AWS and Batch Optimization. In short, the FCA is an automated Picker-to-Goods concept employing conventional commercial automation modules such as a Lift Truck, Conveyors, and Vertical Elevators to perform Order fulfillment. The Pick Rate/Performance of the FCA is then substantially enhanced by employing a Batch Optimization algorithm which assigns the right Orders to the right Batches and the Orders' SKUs to the right Tote within the Batch to maximize the picks per hour (PPH) of the Picker. The output of the Batch Optimization algorithm is then an optimized Pick List. Having the optimized Pick List, the challenge then becomes ensuring all the containers (implemented as Totes in the forthcoming embodiments) identified in that Pick List are immediately available to the Picker when the Pick Request tied to a specific Tote is performed. In some embodiments, Level-0 Tote Storage provides complete access to a plurality of Totes (in some embodiments, arranged in a two-by-two array as shown in FIG. 12, which allows excellent throughput in narrow Aisles); while in other embodiments, an even larger array of Totes (such as 2×3, 2×4, 2×5, 3×2, 3×3, 3×4, 3×5 or other array size), is used in Level-0 Tote Storage) by the Picker at all times in which Pick Requests tied to that plurality of specific Totes is being performed. The hardware and control algorithm to ensure that Tote availability are the subject of the present invention.

Figure 1:
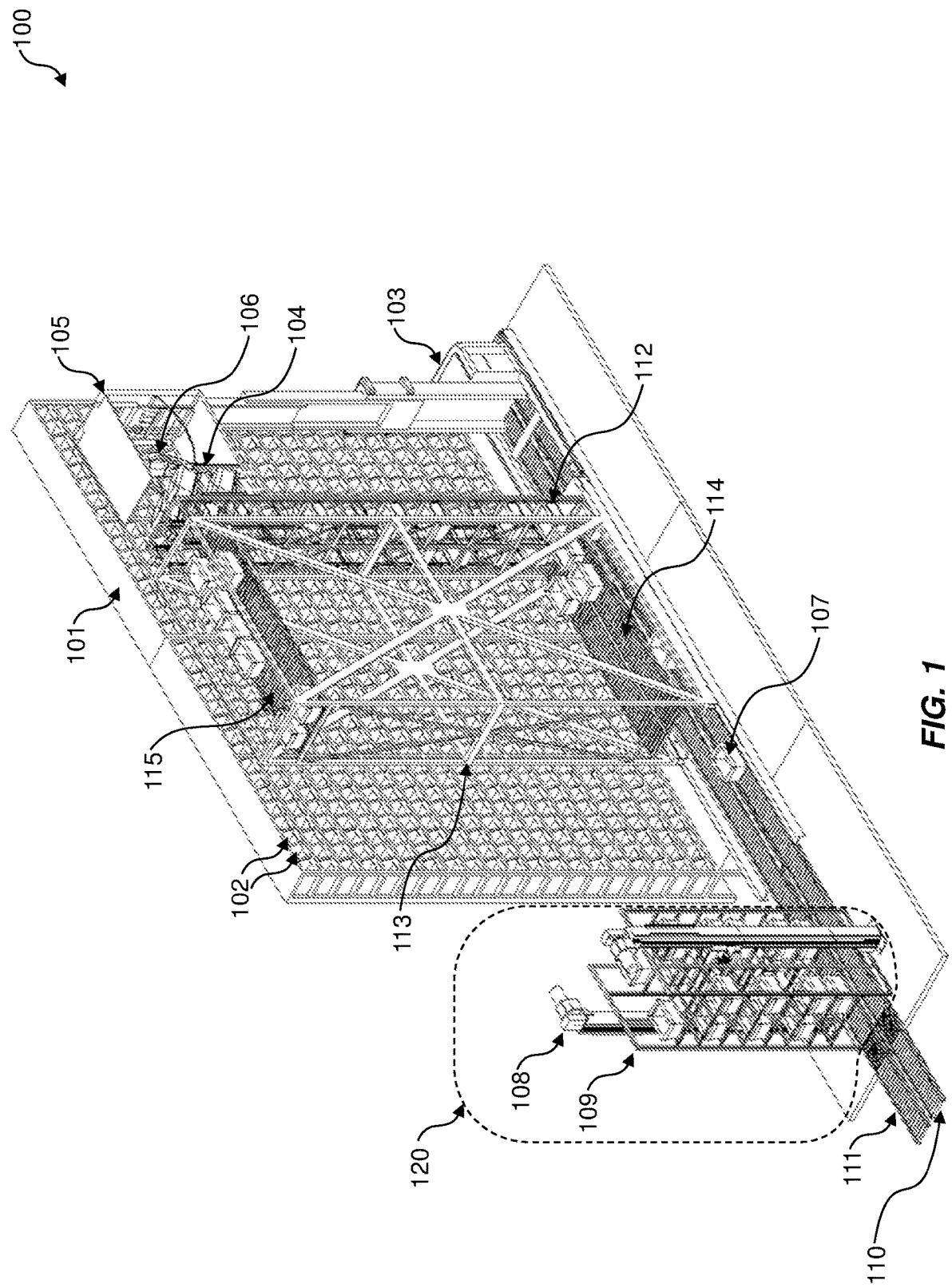
FIG. 1 is an isometric view of an FCA AWS 100. An FCA system 100 typically includes a PAV 103, a Picker Platform 105, Level-0 Tote Storage 104, a Shuttle Cart 113 which houses Vertical Elevators 112 containing one or more Quick-Load Storage (Level-1 Tote Storage) units 114 and 115, one or more Conveyors 110 and 111 (Conveyance Devices), and one or more remote Delay-Load Storage (Level-2 Tote Storage) towers 120, according to some embodiments of the present invention. Also shown is a representative Pick Face 101 having a plurality of SKU Storage Bins 102. There are typically two Pick Faces in an FCA.

FIG. 1 is an isometric view of an FCA system 100 that is usable with some embodiments of the present invention and is referred to as the "basic embodiment". In some embodiments, the picked Items are located in Bins 102 located across the Pick Face of the Shelving Unit 101 (the Pick Face being the aggregate of all the exposed end of the Bins 102 located on the Shelving Unit 101) along the side of a warehouse Aisle (the Aisle being the lengthwise space between two Shelving Units 101 that have Pick Faces facing one another). A Picker 106 (e.g., in some embodiments, a human Picker, but, in other embodiments, a robotic picker mechanism) is supported on Picker Platform 105 that is moved horizontally and vertically (at fixed indexed locations) by a mobile Lift Truck (PAV) 103. In some embodiments, horizontal Conveyors 110 and 111 move Totes 107 to and from a Delay-Load Storage tower 120 that includes Storage racks 109 and one or more Vertical Elevators 108 that lift Totes 107 off horizontal Conveyors 110 and 111 and then return the appropriate Totes 107 back to horizontal Conveyors 110 and 111 in the appropriate Sequence order, which then move Totes 107 to and from Vertical Elevators 112 mounted on the Shuttle Cart 113 that then convey Totes 107 to and from the Picker 106 and/or Quick-Load Storage platforms 114 and 115. As those Totes are moved to/from the Picker 106, the Totes are stored in a Tote Storage mechanism 104 that provides immediate availability to the Picker 106.

In this description of the functionality of the FCA 100, there are three different Tote Storage mechanisms identified. The three different Tote Storage mechanisms are the Level-2 Delay-Load Tote Storage tower 120 (Storage racks 109 and one or more Vertical Elevators 108), the Level-1 Quick-Load Tote Storage platforms 114 and 115, and the Level-0 Tote Storage 104 immediately available to the Picker 106 on the Picker Platform 105.

Figure 2:
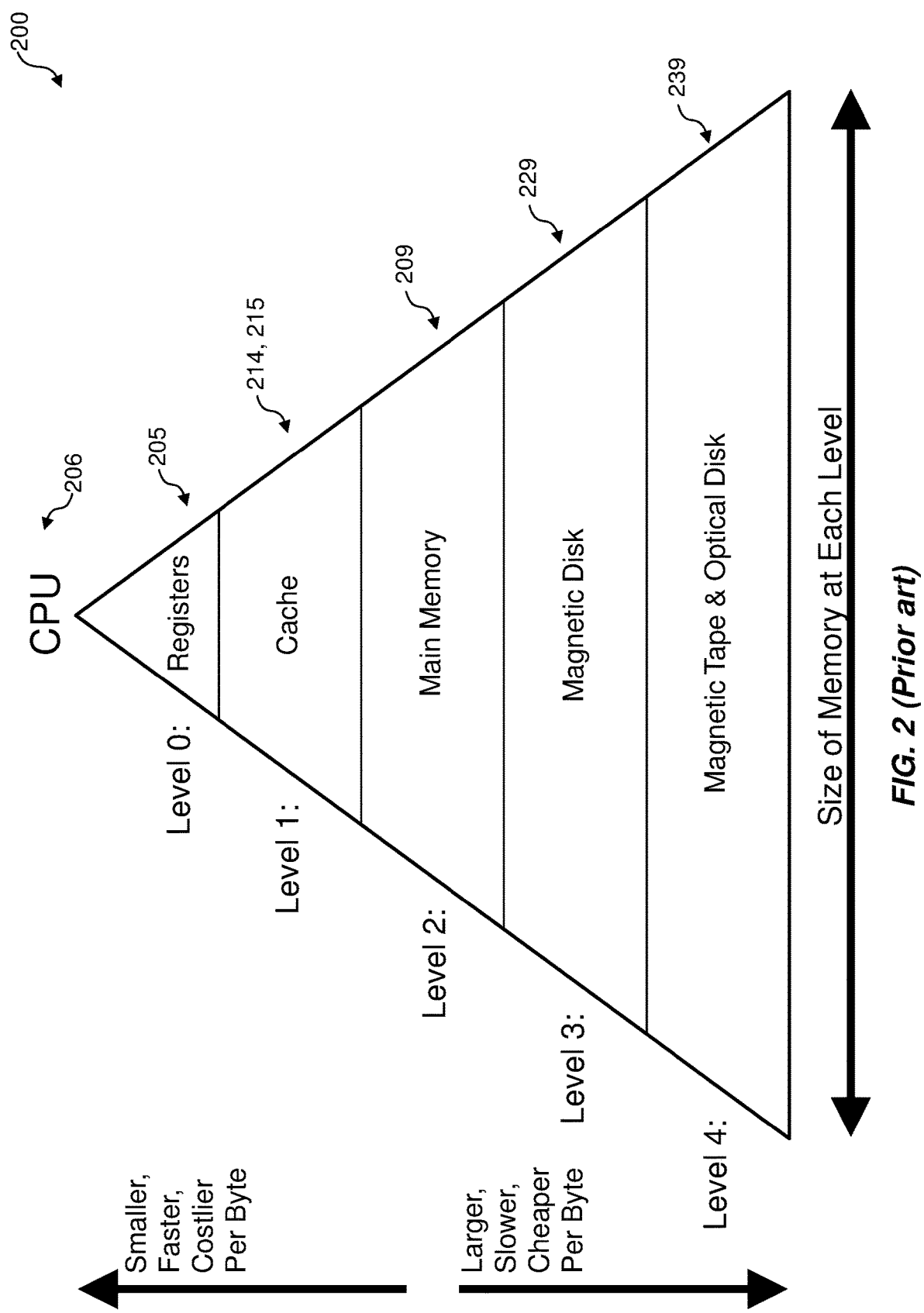
FIG. 2 is a block diagram of the different levels of a prior-art Memory Storage Cache 200 typically used by a CPU 206 in a computer.

FIG. 2 is a block diagram of the different levels of Memory Storage Cache 200 typically used by a CPU in a computer. FIG. 2 shows memory storage in the computer's Cache from the lowest level of Registers 205 (Level 0) which is the fastest, but also the smallest due to its cost and physical-space limitations nearest the CPU, then the Cache 214 and 215 (e.g., data cache and instruction cache) of Level 1, then Main Memory 209 of Level 2, magnetic disk 229 of Level 3, and then to the highest level of Magnetic Tape and/or Optical Disk 239 of Level 4, which is the largest and slowest, but costs the least.

Figure 3:
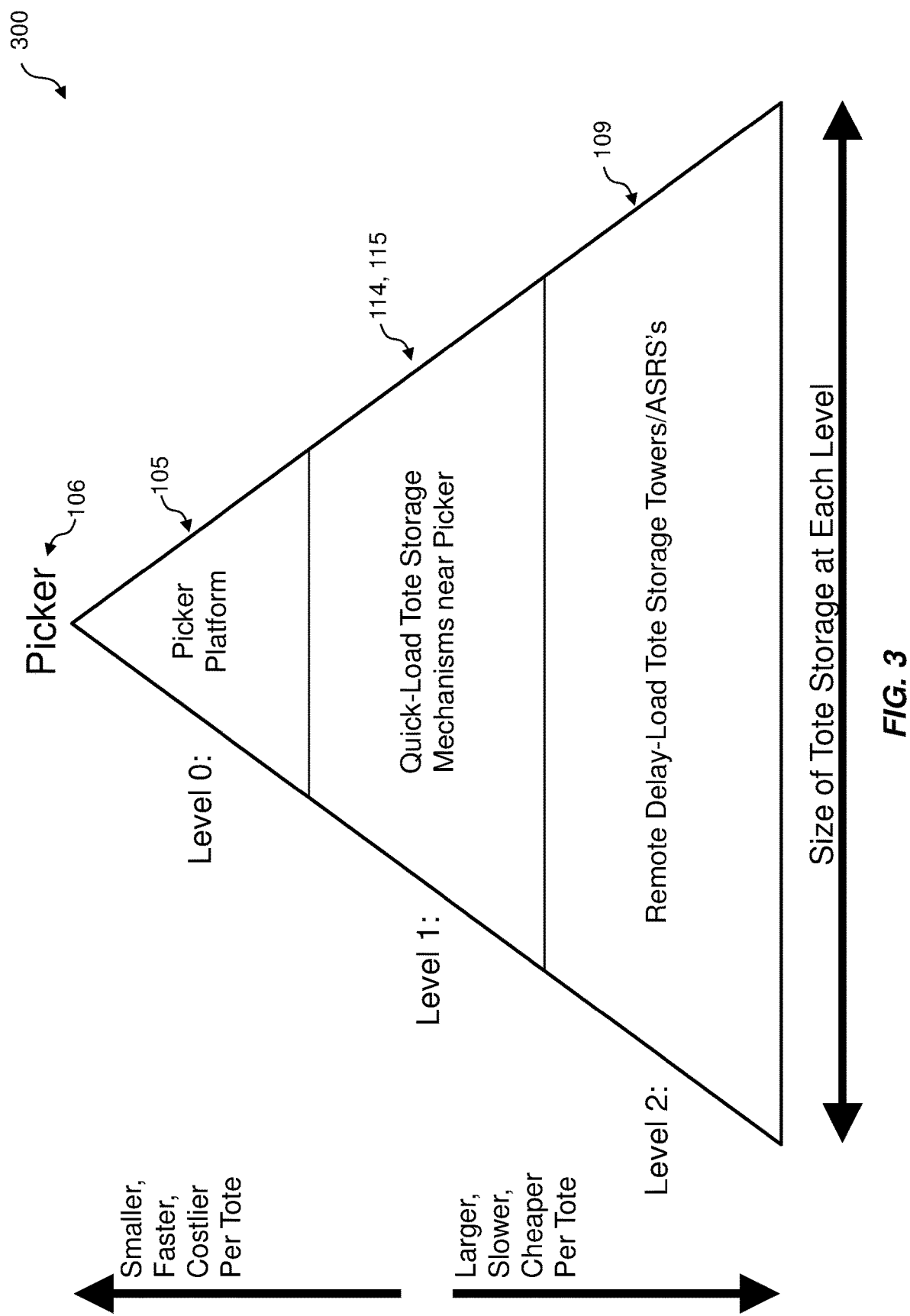
FIG. 3 is a block diagram of the different levels of Tote Storage Cache 300 in an AWS, most notably, FCA AWS 100 shown in FIG. 1, according to some embodiments. Level-0 Tote Storage 105 resides where Tote Storage is immediately available to the Picker 106, whereas Level-1 Tote Storage 114 and/or 115 resides as close to the Picker as space and cost allow, according to some embodiments of the present invention. Level-2 Tote Storage 120 is generally located somewhat remotely and available to hold any required amount of totes.

FIG. 3 is a block diagram of the different levels of Tote Storage Cache 300 in an AWS. The relationship between those three types or Levels of Tote Storage and the Picker is shown in FIG. 3 identifies the attributes of each Storage type and their respective connotation as Level-0 Tote Storage (on the Picker Platform 105), Level-1 Tote Storage (Quick-Load Tote Storage platforms 114 and 115), and Level-2 Tote Storage (one or more remote Delay-Load Tote Storage towers 120).

To fully understand the benefits of these multiple levels of Tote Storage it is necessary to understand the background, the constraints, and the requirements of the system that is employing the multiple levels of Tote Storage. In the case of the basic embodiment and other embodiments described in the above-cited references and/or in the other embodiments described herein, that is the FCA. For the FCA system to work optimally, the number of SKU Storage Bins the Picker has immediate access to needs to be maximized. In the FCA, this is accomplished by placing the Picker Platform between the two Pick Faces within an Aisle of the warehouse. To maximize the volumetric efficiency of the warehouse, it is then best to make the width of the Aisles as narrow as possible. In the FCA, that width is slightly more than the width of the Picker Platform.

At the same time an Aisle is being made narrow, the Batch Optimization algorithm can generate a Pick List which requires the Picker to have access to any specific Tote at any specific time within potentially hundreds of Totes that are required to complete all the Pick Actions on a Pick List. That need to have access to any specific Tote at any specific time poses a daunting problem of storing and manipulating all the other associated Totes in order to achieve that and to minimize or not create any associated Picker delays. This would be a challenge even having unlimited space with which to store and manipulate Totes, let alone only having the narrow space available between the two Pick Faces of an Aisle. This present invention will show how the use of multiple levels of Tote Storage can overcome that challenge.

Since the Picker is located at the same Spatial Reference Point as the Level-0 Tote Storage, the requirement for that spatial area (i.e., the Picker Platform) is to provide access to the maximum number of SKU Storage Bins. That can be done two ways. The first way is to maximize the number of dimensions the Spatial Reference Point of the Level-0 Tote Storage can be moved. In the case of the FCA with the constraints of the two Pick Faces, this is to present the receiving Totes to the Picker in two dimensions (horizontally and vertically). The second way is to maximize the number of SKU Storage Bins the Picker has access to when the Picker Platform is not moving. That is done by maximizing the number of SKU Storage Bins in a Pick Window and giving the Picker physical access to those Bins, which leaves little space for the Level-0 Tote Storage mechanisms other than the areas just outside the Pick Window. However, since the Level-0 Tote Storage area is moving vertically, even that space is reduced, resulting in minimal available remaining space for the mechanisms (e.g., see FIG. 12 and FIGS. 13A-13D used in some embodiments) constituting Level-0 Tote Storage. Therefore, the number of Totes that can be stored and/or manipulated in Level-0 Tote Storage has to be at an absolute minimum, just sufficient to ensure no Picker delays. This restriction then forces other Totes to be stored and manipulated (e.g., temporally sequenced) as close to Level-0 Tote Storage as possible. That is in Level-1 Tote Storage.

To increase the available space to store and manipulate Totes in Level-1 Tote Storage, in some embodiments it is then desirable to constrain the ability to move the Spatial Reference Point of the Picker Platform along one dimension relative to the Spatial Reference Point of the Pick Faces in the Aisle. This constraint then provides a Tote Storage and manipulation area at least the width of the Aisle and the height of the Pick Face. The goal is then to be able to store and manipulate (i.e., move, Sequence, etc.) as many Totes within the ensuing volume that is large enough and functional enough to ensure no Picker Delays, but small enough to provide cost effectiveness and operational feasibility.

Once the number of Totes stored in Level-0 Tote Storage and Level-1 Tote Storage have been accordingly optimized, all the remaining Totes needed to perform all the Pick Actions on a Pick List are allocated to Level-2 Tote Storage, located either spaced further apart in the Aisle (e.g., Remote Delay-Load Tote Storage tower(s)) and/or outside of the Aisle where space is not an issue and the added complexity/cost of a movable Spatial Reference Point is not required. The remainder of the document will show how this invention can accomplish all these requirements, provide Pick Rates otherwise unachievable with current AWS's, and not incur any Picker delays.

A primary differentiator of this basic embodiment and other embodiments described in the above-cited references and/or in the other embodiments described herein, is the use of a plurality of Conveyance Devices moving Totes within a given Level of Tote Storage, and a plurality of Conveyance Devices that connect the different levels of Tote Storage. While that coordination adds additional complexity to the Multi-Level Tote Storage Simulation control algorithm, it provides a means to eliminate significant wasted motion for the Picker and to allow the capacities of Tote Storage at any particular Tote Storage level to remain small enough to be practical, affordable, and efficient. Minimizing the size of Tote Storage needed for a desired number of Totes, particularly for Level-0 and Level-1 Tote Storage, is particularly important given the limited amount of space generally available in warehouse Aisles. At the same time, the Conveyance Devices allow Tote Storage to exist further down the Aisle and/or outside of the warehouse Aisle where any amount of low-cost required Tote Storage space is readily available. With the Conveyance Devices allowing the Tote Storage to exist in locations remote from the Picker, they still grant the Multi-Level Tote Storage Simulation control algorithm the ability to deliver any Tote the Picker might require for a Pick Action to be delivered to the Picker and returned to Tote Storage without the need for the Picker and/or the Picker Platform to move in an effort to retrieve and/or store that Tote. If it were required to transfer Totes directly between different Tote Storage levels, wasted Picker motion would inevitably result and/or the Tote Storage mechanisms themselves would be become too large and/or expensive to be practical. This marriage of multiple Tote Storage levels and Conveyance Devices is a core of this invention.

This relationship between the different levels of Tote Storage is completely analogous to the concept of computer Memory Storage Cache levels as shown in FIG. 2 and the diagram 200 that identifies the attributes of each Memory Storage Cache type, their denoted levels, and their respective relationship to the CPU. In this analogy, the Picker 106 of FIG. 3 corresponds to the CPU 206 of FIG. 2, and the different levels of Tote Storage in FIG. 3 have the analogous attributes as the different levels of Memory Storage Cache in FIG. 2. Both types of storage tend to be smaller in capacity the smaller the level number, and both types of storage can be more quickly accessed the smaller the level number. In the case of a CPU 206, the amount of Memory Storage Cache that resides in each level is a balance of cost and performance. That performance depends upon sophisticated algorithms that ensure the data required by the CPU at any point in time is immediately available.

The notion that performance optimization needs a balance of cost and performance is also true in the case of a Picker 106 and the respective amounts of Tote Storage at each level to ensure Totes required by a Picker are in position when needed. While the amount of Tote Storage that can reside at each level is more dependent on available space, there are sophisticated mechanisms that could be provided to increase the available capacity at each level which subsequently would get more expensive the lower the level of Tote Storage. Thus, just as in the CPU's Memory Storage Cache, in the domain of the present invention, the amount of storage at each level is a balance of cost and performance. That performance subsequently benefits from sophisticated control algorithms of the present invention (e.g., Multi-Level Tote Storage Simulation control algorithm) that ensure the Tote required by the Picker at any point in time is immediately available.

Figure 4:
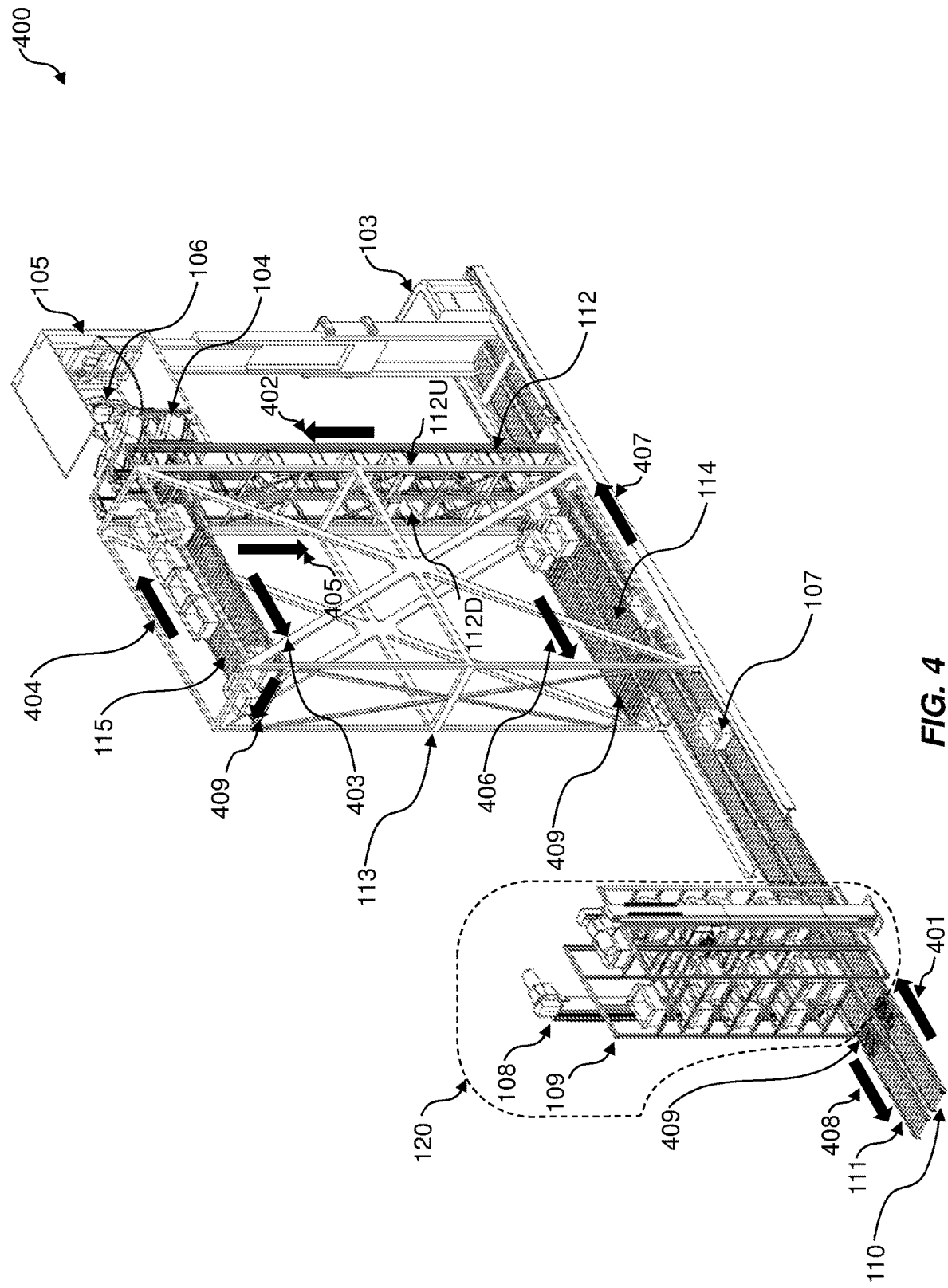
FIG. 4 is an isometric view of an FCA AWS 400 without showing the Pick Face of Shelving Unit 101 in the most basic embodiment, with Quick-Load Storage units (114 and 115) available at the lower and upper ends, respectively of each Vertical Elevator 112 on the Shuttle Cart 113.

FIG. 4 is an isometric view of an FCA AWS 400 without showing the Shelving Unit 101 and Bins 1020, and otherwise shows the same system as shown in FIG. 1 (less Shelving Unit 101 and Bins 102 for clarity). FIG. 4 focuses on the paths a Tote 107 can take as the Tote travels between the different levels of Tote Storage in the basic embodiment of the FCA where there are two Level-1 Tote Storage platforms 114 and 115 on the Shuttle Cart 113. A Tote enters the system on the ingoing Conveyor 110 in direction 401. At that point, the Tote 107 is optionally held temporarily in Level-2 Tote Storage tower 120 (elevator 108 and Storage racks 109) for later use or proceeds directly to the Vertical Elevators 112 on the Shuttle Cart 113. The Vertical Elevators 112 include an upgoing Vertical Elevator 112U shown by the upward direction 402 and a down-going Vertical Elevator 112D shown by direction 405. The Tote then changes from direction 401 to direction 402 to travel upwards on the upgoing Vertical Elevator 112U where the Tote 107 can be sent to Level-0 Tote Storage 104 to be used immediately by the Picker 106 or can be placed on the top Level-1 Tote Storage platform 115 until the Tote is used shortly thereafter by the Picker 106. Level-1 Tote Storage platform 115 includes two parallel segments of Conveyor, one travelling in direction 403 and the other travelling in direction 404.

When a Tote 107 arrives on the top Level-1 Tote Storage platform 115 the Tote generally flows in direction 403 to the back of the top Level-1 Tote Storage platform 115 where the Tote can be transferred to the other side of the platform with a Cross-Lift 409. This transfer with a Cross-Lift 409 allows the Tote 107 to transfer back to the down-going Vertical Elevator 112D in direction 405. In some instances, however, a Tote can transfer immediately from the upgoing Vertical Elevator (denoted by direction 402) to the down-going Vertical Elevator (denoted by direction 405) through the use of a Cross-Lift 409 on the Level-1 Tote Storage platform 115. Otherwise, Totes spend time on the Level-1 Tote Storage platform 115 and through the use of the two parallel Conveyors and the use of Cross-Lifts, the Totes can be positioned in a Sequence defined by the Multi-Level Tote Storage Simulation control algorithm. The sequencing is essential to ensure Totes arrive in Level-0 Tote Storage 104 as needed prior to the Totes being required by the Picker 106. When a Tote 107 departs the top Level-1 Tote Storage platform 115 the Tote can proceed to one of three destinations, either Level-0 Tote Storage 104 just prior to the Tote's use by the Picker 106, to the bottom Level-1 Tote Storage platform 114 for the Tote to be used shortly thereafter by the Picker 106, or directly to the outgoing horizontal Conveyor 111 where the Tote could proceed to Level-2 Tote Storage 120 and be held until the Tote is required for reuse (in some embodiments, crossing between incoming Horizontal Conveyor 110 and outgoing Horizontal Conveyor 111 via a Cross-Lift 409 in the lower right of FIG. 4) or the Tote 107 could exit the system 400 using outgoing Horizontal Conveyor 111. Besides Totes 107 entering the system from either Level-2 Tote Storage 120 or Level-1 Tote Storage 114 and 115, Totes 107 can also enter the system from the Level-0 Tote Storage 104 on the Picker Platform 105. How and when Totes 107 enter, reenter, or exit system 400 are all defined by the Multi-Level Tote Storage Simulation control algorithm, all in the effort to ensure there are no delays for the Picker 106.

While FIG. 4 details the movement of Totes through the basic embodiment of the FCA 400, there are other embodiments of the FCA (certain of which are detailed below, and others not shown), with a wide variety of ways in which the different Levels of Tote Storage are configured within the scope of the present invention. The various embodiments generally impact the overall configuration of the Shuttle Cart 113 holding the Vertical Elevators 112.

Figure 5:
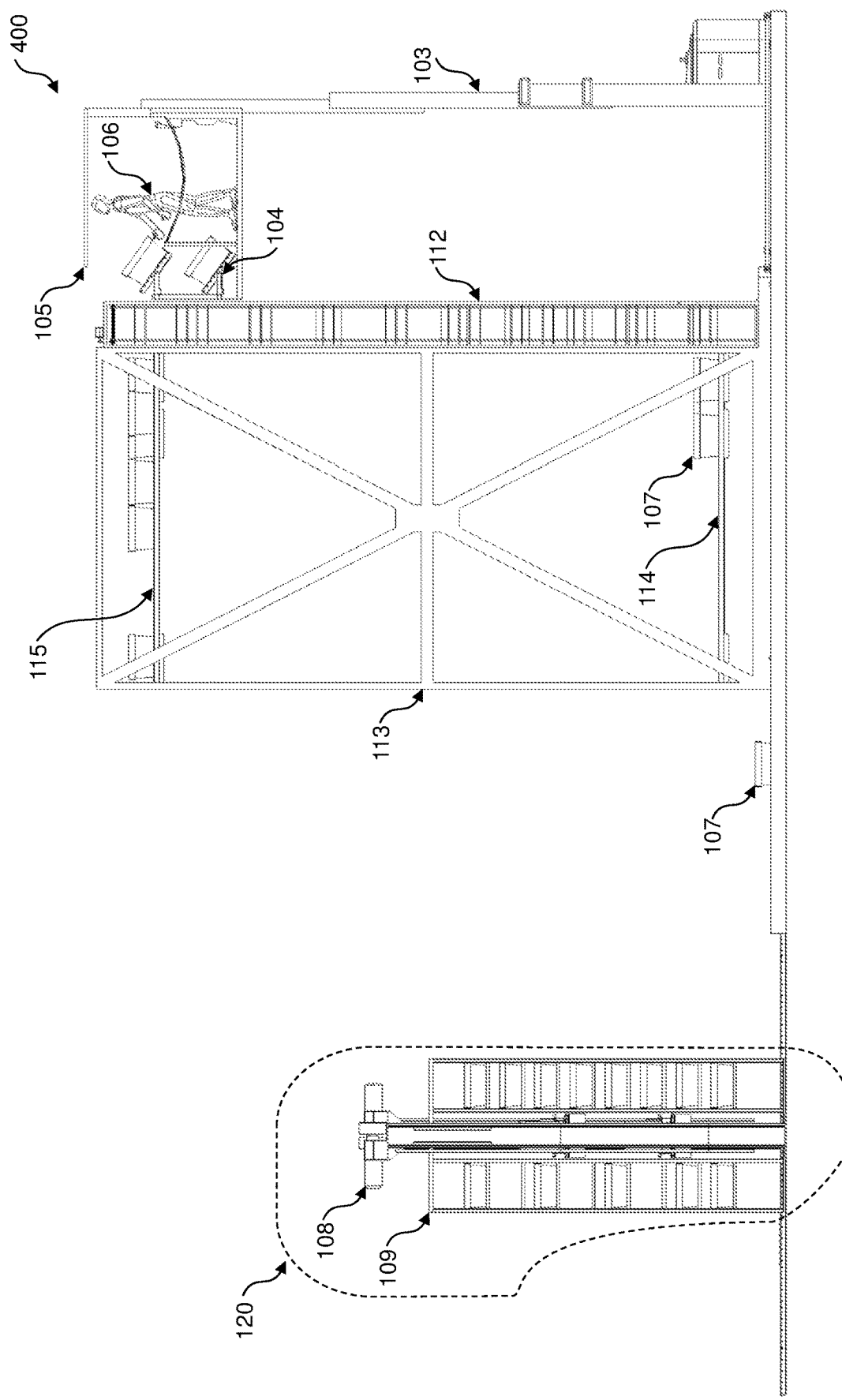
FIG. 5 is a side view of FCA AWS 400 in the most basic embodiment with Quick-Load Storage (114 and 115) available at the lower and upper ends of each Vertical Elevator 112 on the Shuttle Cart 113.

FIG. 5 is a side view of the basic embodiment of the FCA 400, clearly identifying the Level-0 Tote Storage 104, the Level-1 Tote Storage 114 and 115 and the Level-2 Tote Storage 120.

Figure 6:
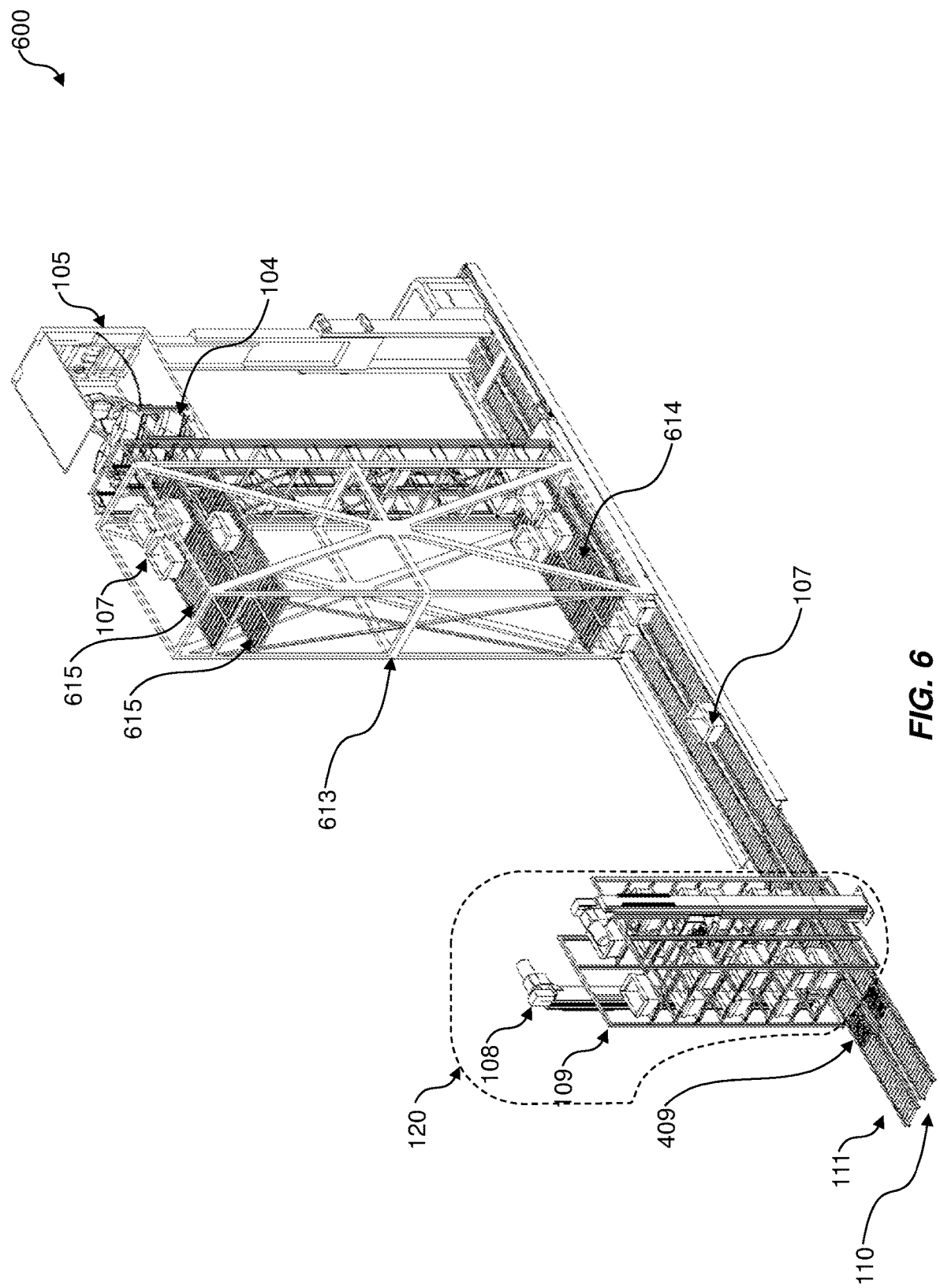
FIG. 6 is an isometric view of an FCA AWS 600 in one preferred embodiment with two Quick-Load Tote Storage 615 units available at the upper end of upgoing Vertical Elevator 112 on the Shuttle Cart 613 and one Quick-Load Tote Storage 614 unit available at the lower end of the down-going Vertical Elevator 112 on the Shuttle Cart 613, according to some embodiments of the present invention. Having two Quick-Load Tote Storage 615 units available at the upper end of upgoing Vertical Elevator 112 allows the Shuttle Cart 613 to be much shorter and provides enhanced performance by allowing parallel loading/unloading of Totes 107 at the top position of the Picker Platform 105.

FIG. 6 is an isometric view of one preferred embodiment of the FCA 600.

Figure 7:
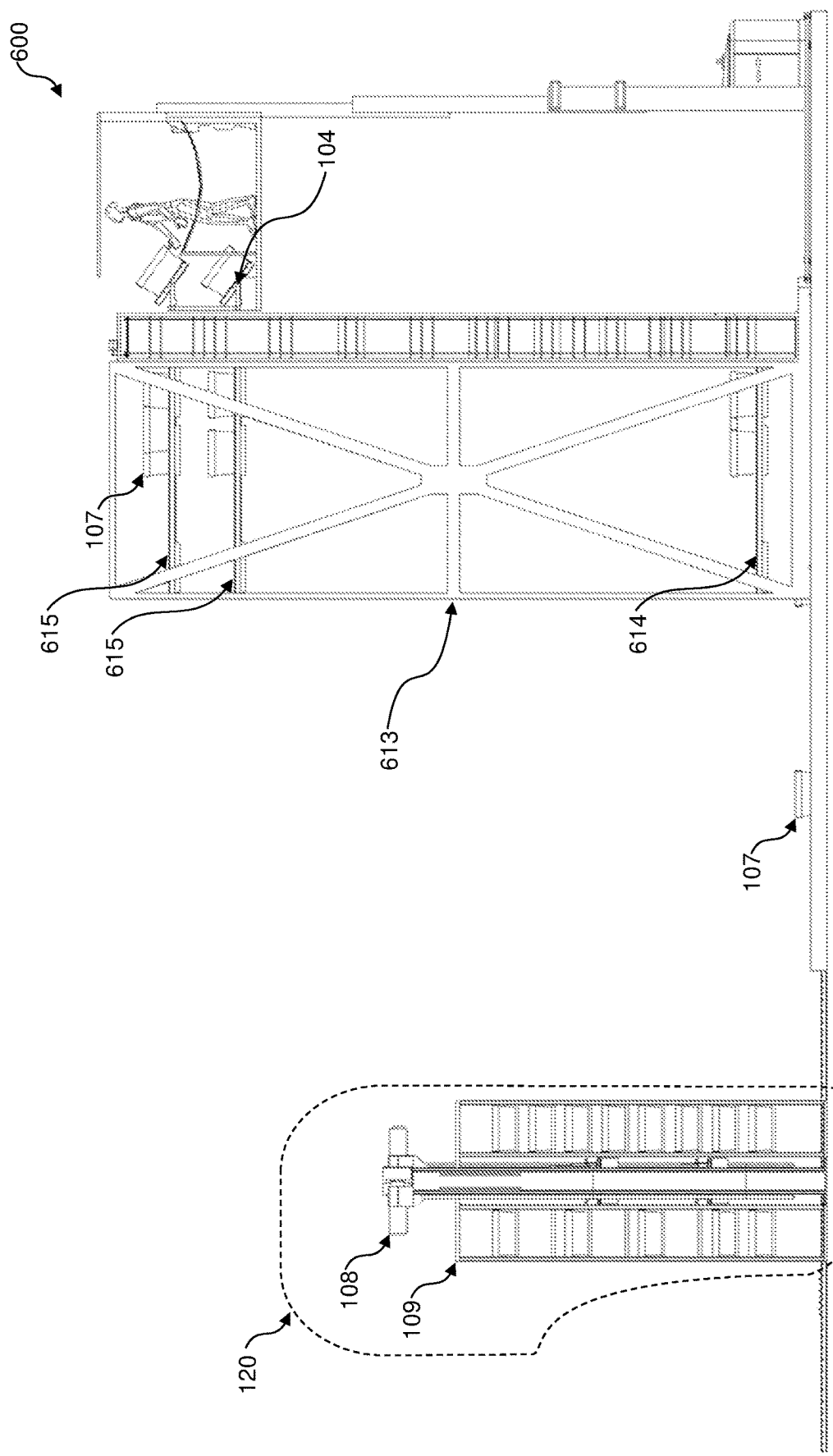
FIG. 7 is a side view of FCA AWS 600 in one preferred embodiment with two Quick-Load Tote Storage 615 units available at the end of upgoing Vertical Elevator 112 on the Shuttle Cart 613 and one Quick-Load Tote Storage 614 unit available at the end of the down-going Vertical Elevator 112 on the Shuttle Cart 613.

FIG. 7 is the side view of that same embodiment of FCA 600 shown in FIG. 6. The Level-0 Tote Storage 104 and the Level-2 Tote Storage 120 remain unchanged from the basic embodiment shown in FIGS. 4 and 5. The change occurs in the Level-1 Tote Storage 614 and 615 located on the Shuttle Cart 613. Instead of the one long Level-1 Tote Storage 115 platform shown at the top of the Shuttle Cart 113 in FIG. 1 and FIG. 4, there are now two shorter Level-1 Tote Storage platforms 615. In some embodiments, the two shorter top Level-1 Tote Storage platforms 615 also make the bottom Level-1 Tote Storage 614 platform correspondingly shorter. In some embodiments, the Multi-Level Tote Storage Simulation control algorithm generally requires more Totes to be stored on the top Level-1 Tote Storage 615 due to the nature of the Tote 107 traffic through the Vertical Elevators 112. At the same time, the more Totes 107 that are stored on a Level-1 Tote Storage platform at one time, the more difficult it can become to correctly Sequence those Totes 107. The preferred embodiment thus splits up the Totes 107 otherwise stored on a single top Level-1 Tote Storage 115, making the sequencing of those Totes 107 easier. The preferred embodiment also allows Totes 107 to be loaded and unloaded in parallel to the two Level-1 Tote Storage 615 platforms as opposed to serially into just one platform, thus saving considerable time in the control algorithm.

Figure 8:
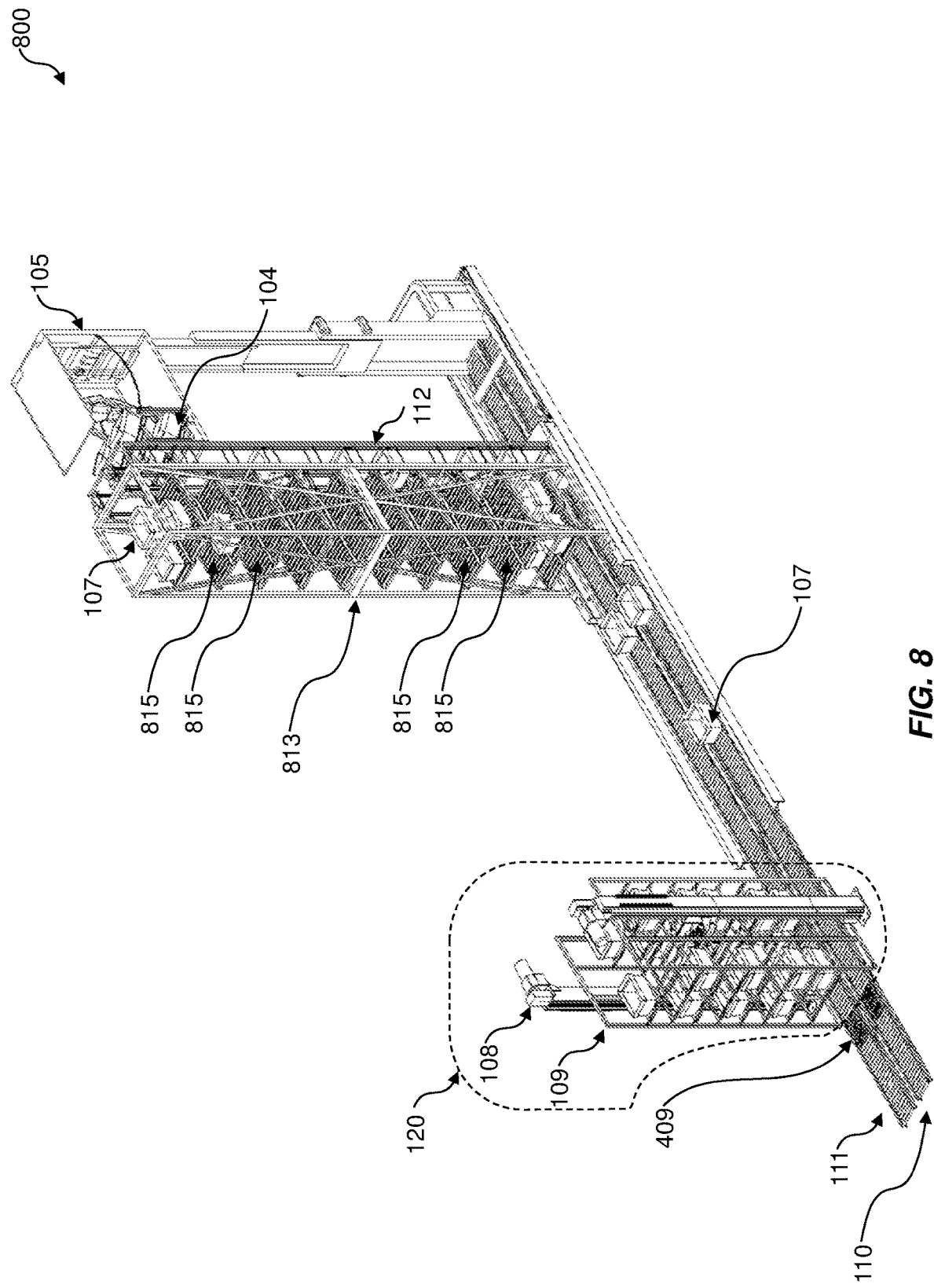
FIG. 8 is an isometric view of an FCA AWS 800 in an alternate embodiment with a Quick-Load Tote Storage 815 unit available at every Tote 107 position on the Vertical Elevators 112, according to some embodiments of the present invention. Having a Quick-Load Tote Storage 815 unit available at every Tote 107 position on the Vertical Elevators 112 allows the Shuttle Cart 813 to be even shorter.

FIG. 8 is an isometric perspective of an alternate embodiment of the FCA.

Figure 9:
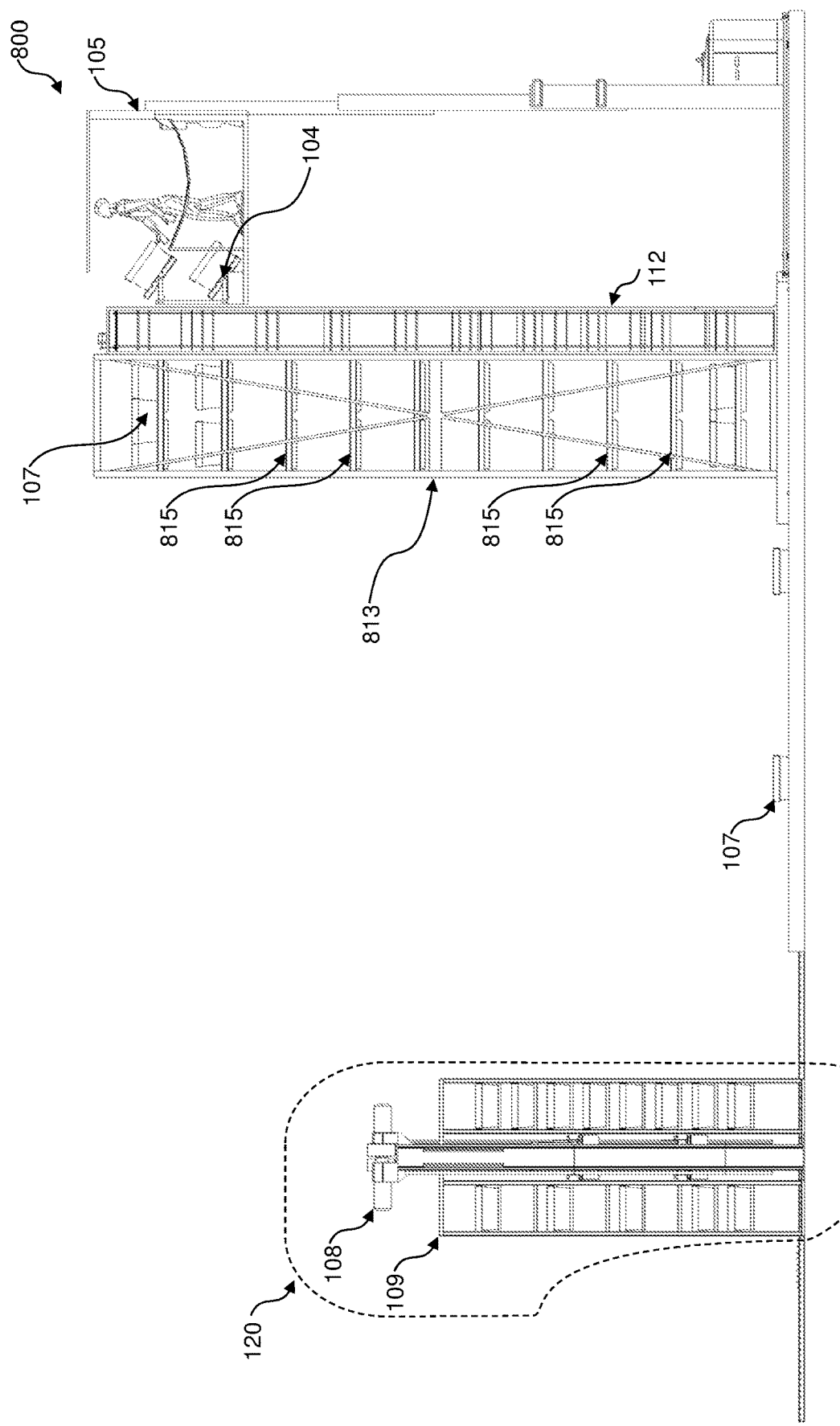
FIG. 9 is a side view of FCA AWS 800 in an alternate embodiment with a Quick-Load Tote Storage 815 unit available at every Tote 107 position on the Vertical Elevators 112.

FIG. 9 is the side view of that same alternate embodiment of FIG. 8. Again, the Level-0 Tote Storage 104 and the Level-2 Tote Storage 120 remain unchanged from the basic embodiment shown in FIGS. 4 and 5. The change occurs in the Level-1 Tote Storage 815 located on the Shuttle Cart 813. In this embodiment, there is a Level-1 Tote Storage 815 platform located at every fixed indexed location the Picker Platform 105 can stop at while the Picker Platform travels vertically. While this embodiment has some advantages, the preferred embodiment identified in FIGS. 6 and 7 have more.

Figure 10A:
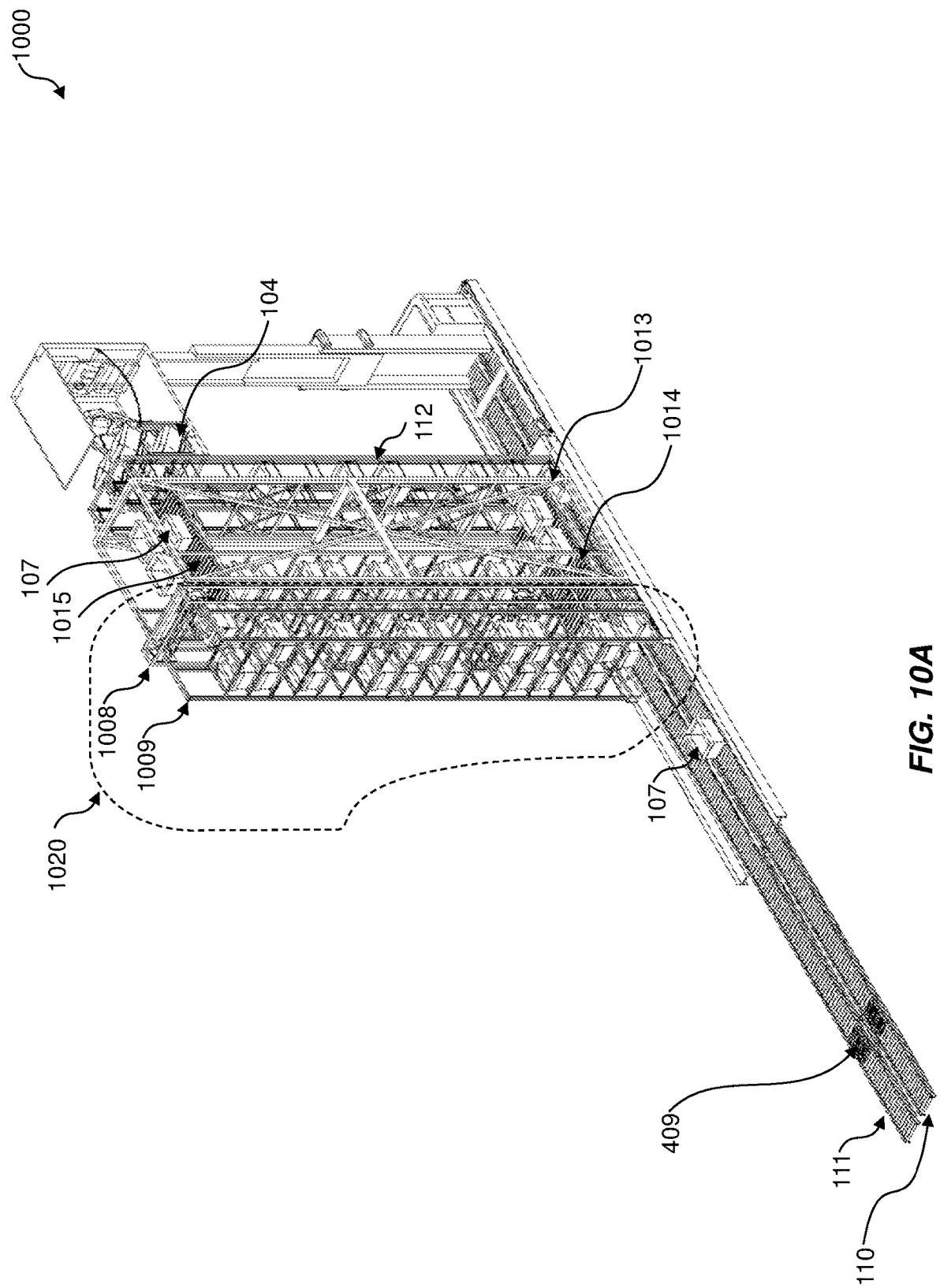
FIG. 10A is an isometric view of an FCA AWS 1000 in an alternate embodiment employing Quick-Load Tote Storage units (1014 and 1015) available at the end of each Vertical Elevator 112 but where the Delay-Load Tote Storage tower 1020 is relocated to the Shuttle Cart 1013, according to some embodiments of the present invention.
Figure 10B:
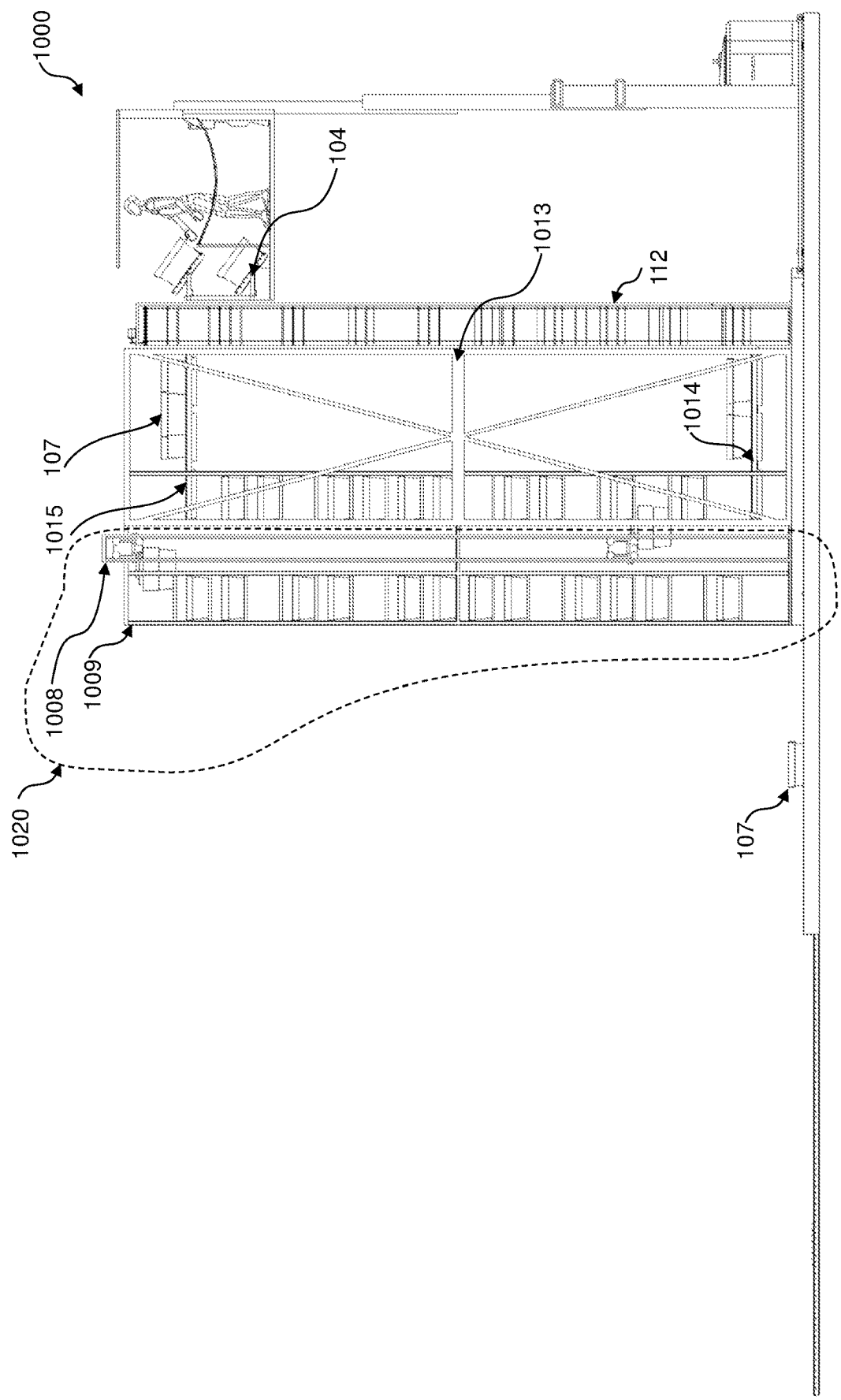
FIG. 10B is a side view of FCA AWS 1000 in an alternate embodiment employing Quick-Load Tote Storage units (1014 and 1015) available at the end of each Vertical Elevator 112 but where the Delay-Load Tote Storage tower 1020 is relocated to the Shuttle Cart 1013.

FIG. 10A is an isometric perspective of an FCA AWS 1000, which is another alternate embodiment of the FCA, and FIG. 10B is the side view of FCA AWS 1000, where the Level-2 Tote Storage 1020, which includes one or more elevators 1008 and one or more storage racks 1009, is essentially relocated to the Shuttle Cart 1013 to increase the Level-1 Tote Storage capacity.

FIG. 10B is the side view of FCA AWS 1000. In this alternate embodiment, the Level-2 Tote Storage tower 120 (Storage racks 109 and one or more Vertical Elevators 108) shown in the previous Figures is replaced by a type of Level-1 Tote Storage 1020 (which includes one or more elevators 1008 and one or more storage racks 1009) that incorporates a similar type of Tote Storage shown as Level-2 Tote Storage in the previous Figures. In the previous embodiments, the Level-2 Tote Storage 120 was implemented with two one-axis Storage rack towers 109 where the Totes 107 were stored and retrieved by the Vertical Elevator 108. In this embodiment shown in FIGS. 10A and 10B, the Level-1 Tote Storage 1020 is implemented as a Mini-ASRS (Automated Storage and Retrieval System) where a two-axis elevator or gantry 1008 is used to store and retrieve Totes 107 in a two-dimensional Storage rack 1009. In this configuration, the Mini-ASRS is then connected directly to the additional Level-1 Tote Storage platforms 1014 and 1015 to allow direct transfer of Totes 107 between the mechanisms.

Figure 11A:
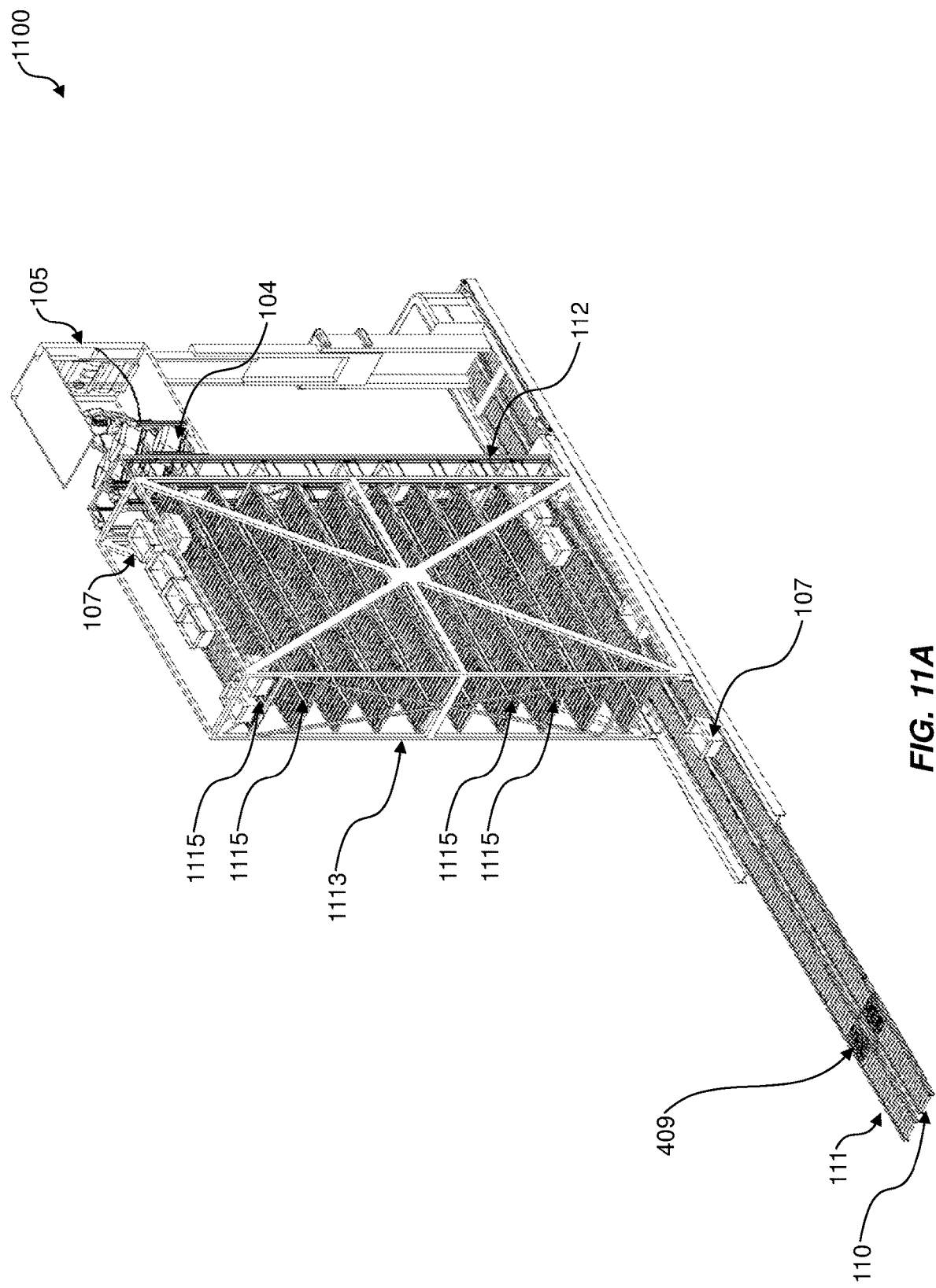
FIG. 11A is an isometric view of an FCA AWS 1100 in an alternate embodiment with a Quick-Load Tote Storage 1115 unit available at every Tote 107 position on the Vertical Elevators 112 and where that Storage capacity is sufficient to eliminate the Delay-Load Tote Storage.
Figure 11B:
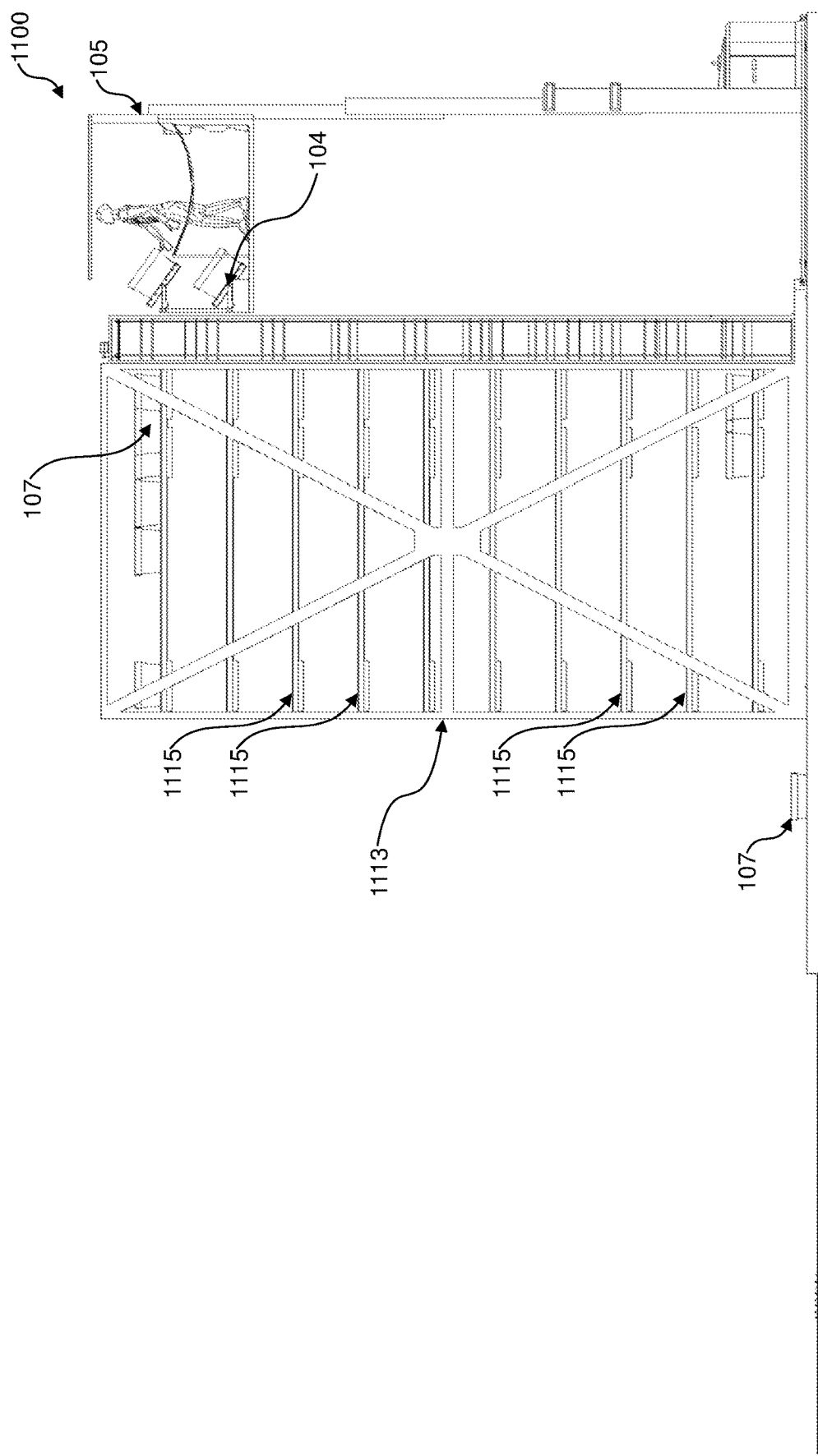
FIG. 11B is a side view of FCA AWS 1100 in an alternate embodiment with a Quick-Load Tote Storage 1115 unit available at every Tote 107 position on the Vertical Elevators 112 and where that Storage capacity is sufficient to eliminate the Delay-Load Tote Storage.

FIG. 11A is an isometric perspective of an FCA AWS 1100, which is another alternate embodiment of the FCA, and FIG. 11B is the side view of FCA AWS 1100 of that same alternate embodiment. While the Level-0 Tote Storage 104 remains unchanged from the basic embodiment shown in FIGS. 4 and 5, the Level-2 Tote Storage is eliminated (or, in some embodiments, the Conveyors 110 and 111 and cross-over 409 act together and are used as a small Level-2 Tote Storage). As in FIGS. 8 and 9, there is a Level-1 Tote Storage 1115 platform located at every fixed indexed location the Picker Platform 105 can stop at while the Picker Platform travels vertically, but it is considerably larger. As such, each Level-1 Tote Storage platform has sufficient Storage capacity to eliminate the need for Level-2 Tote Storage. Besides cost, the issue with this embodiment is the Multi-Level Tote Storage Simulation control algorithm becomes much more complex with the potential of having numerous Picker delays that cannot be eliminated.

All the preceding embodiments depend upon Multi-Level Tote Storage, with the most critical level being Level-0 Tote Storage.

FIG. 12 shows an isometric view of system 1200 of the Picker Platform 105, the Picker 106, the upgoing 402 Vertical Elevator 112, the down-going 405 Vertical Elevator 112, the Level-0 Tote Storage mechanism 104 which holds a plurality of Totes 107, and an associated Tote 107. Unlike the other levels of Tote Storage, there is no requirement for the Level-0 Tote Storage mechanism to be able to Sequence or change an order of the Totes. In this scenario, a Tote 107 is delivered to the Level-0 Tote Storage mechanism 104 by the Vertical Elevator 112 where each Tote 107 waits in the Level-0 storage for the Picker 106 to place at least one SKU identified by the Pick List into the Tote 107. In some embodiments, the system 1200 ensures that two or more Totes 107 are available to the picker at all times when the picker is placing items into the plurality of totes. In some embodiments, at least one Tote 107 is always available for the Picker 106 when the Picker 106 has a SKU to place into a Tote. In some embodiments, at least two, and up to four (in the embodiment shown in FIG. 12), Totes 107 are simultaneously available for the Picker 106 when the Picker 106 has a SKU to place into a Tote. In other embodiments, more than four Totes are simultaneously available for the Picker 106 when the Picker 106 has a SKU to place into a Tote. This process continues until the Pick Requests identified for that respective Tote 107 at a given Picker Platform position are complete. The Tote 107 is then returned to the Vertical Elevator 112 and moved to another level of Tote Storage dependent on when that specific Tote is required to be at the Level-0 Tote Storage on the Picker Platform again. If the specific Tote 107 will be required shortly, the Tote is sent to Level-1 Tote Storage. Otherwise, the Tote is sent to Level-2

Tote Storage or if that Tote has had all Pick Requests fulfilled associated with the Tote, the Tote, will, in some embodiments, exit the system. In some embodiments, the Tote will remain on the Level-0 Tote Storage mechanism 104 in the event there is not sufficient time to send the Tote to Level-1 Tote Storage and return the Tote back to Level-0 Tote Storage before the Tote's needed next use. All these decisions are determined by the Multi-Level Tote Storage Simulation control algorithm.

Figure 13A:
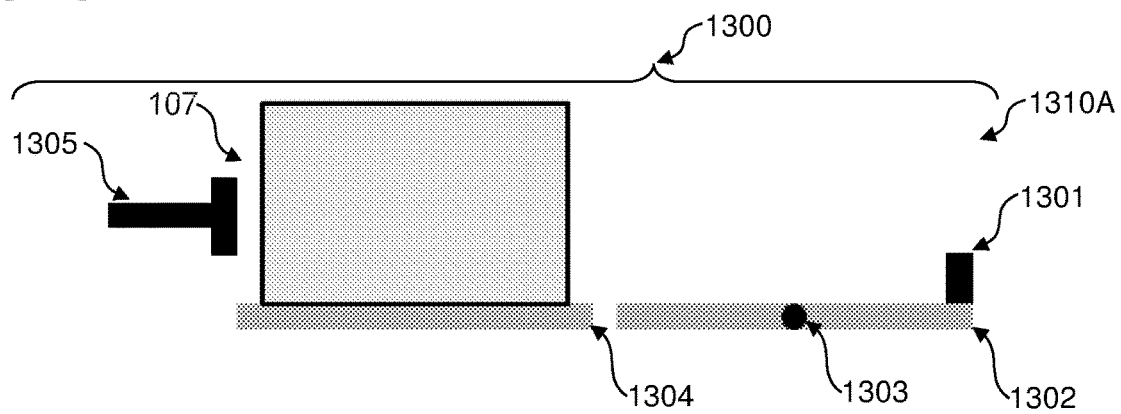
FIG. 13A is a block diagram of a system 1300 having a more detailed embodiment of a Level-0 Tote Storage mechanism, in a first position 1310A demonstrating the embodiment's functionality, and also showing optional components (1301-1305) of such an embodiment.

FIG. 13A shows a functional block diagram 1310A at a first point in time of one embodiment of the Level-0 Tote Storage mechanism 1300. This block diagram shows the rails 1304 that hold the Tote 107 in the Vertical Elevators that service Level-0 Tote Storage, a small segment of Conveyor 1302 which is part of the Level-0 Tote Storage mechanism, a pushing mechanism 1305 that will push the Tote 107 from the Vertical Elevator rails 1304 to the Conveyor segment 1302 which is part of the Level-0 Tote Storage mechanism, a pivot point 1303 which will allow that Conveyor segment 1302 to tilt, and another pushing mechanism 1301 that can push the Tote 107 back onto the Vertical Elevator rails 1304 when required. The pushing mechanism 1301 also acts as a stop mechanism to ensure the Tote 107 remains on the Conveyor segment 1302 when the Tote tilts.

Figure 13B:
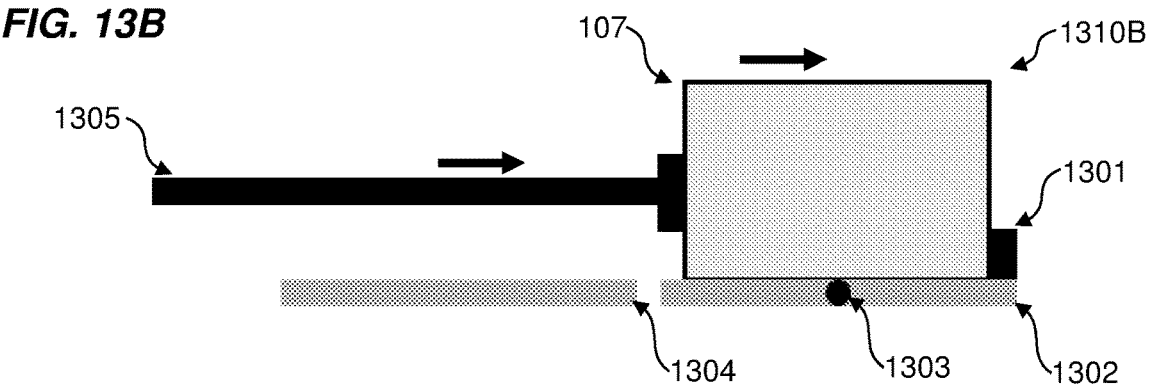
FIG. 13B is a block diagram of system 1300 in a second position 1310B demonstrating the embodiment's functionality.

FIG. 13B shows a functional block diagram 1310B at a second point in time of the Level-0 Tote Storage mechanism 1300. In this scenario when a Tote 107 designated for the Level-0 Tote Storage mechanism on the Picker Platform arrives at the platform, the Tote is pushed off the Vertical Elevator rails 1304 by the pushing mechanism 1305 onto the Conveyor segment 1302 which is part of the Level-0 Tote Storage mechanism. The pushing of the Tote is shown in FIG. 13B. In some other embodiments (not shown), this function is achieved by a puller mechanism rather than a pusher mechanism 1305. Once the Tote 107 is fully on the Conveyor segment 1302, the segment tilts up around the pivot point 1303 and is held in place by the stop mechanism 1301.

Figure 13C:
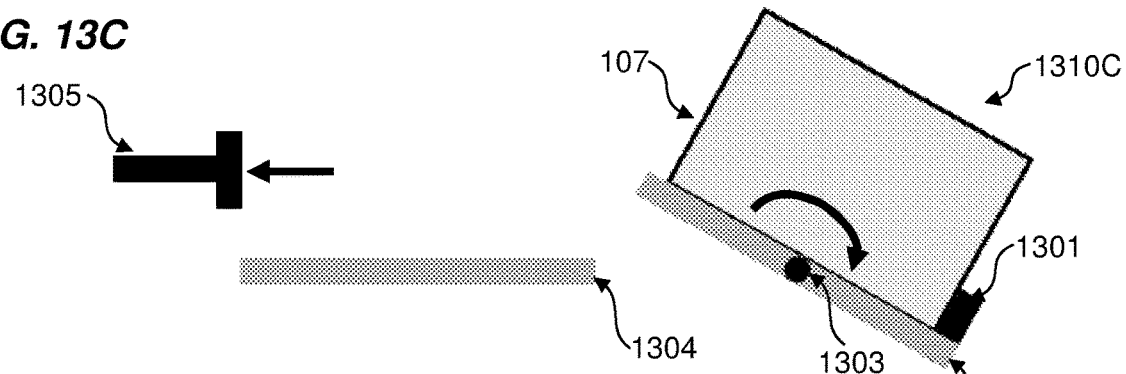
FIG. 13C is a block diagram of system 1300 in a third position 1310C demonstrating the embodiment's functionality.

FIG. 13C shows a functional block diagram 1310C at a third point in time of the Level-0 Tote Storage mechanism 1300. The tilting of the Tote is shown in FIG. 13C. In this embodiment the tilting is done to provide more ergonomic access to the Tote 107 by the Picker 106.

Figure 13D:
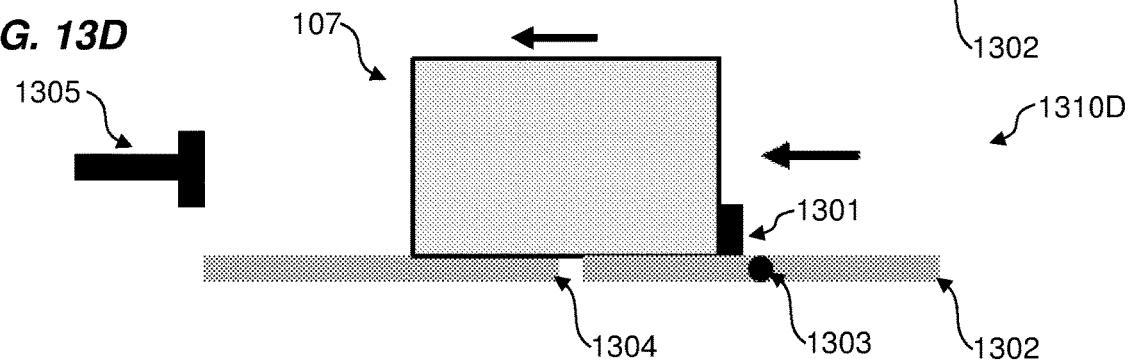
FIG. 13D is a block diagram of system 1300 in a fourth position 1310D demonstrating the embodiment's functionality.

FIG. 13D shows a functional block diagram 1310D at a fourth point in time of the Level-0 Tote Storage mechanism 1300. When the Picker is done with the Tote 107, in this embodiment the stop mechanism 1301 is also a pusher mechanism which is used to push the Tote 107 back onto the Vertical Elevator rails 1304 prior to the Tote's departure to another level of Tote Storage or the system exit. In some embodiments, the push function used to move the Tote 107 back onto the Vertical Elevator rails might be achieved by a puller mechanism.

Figure 14:
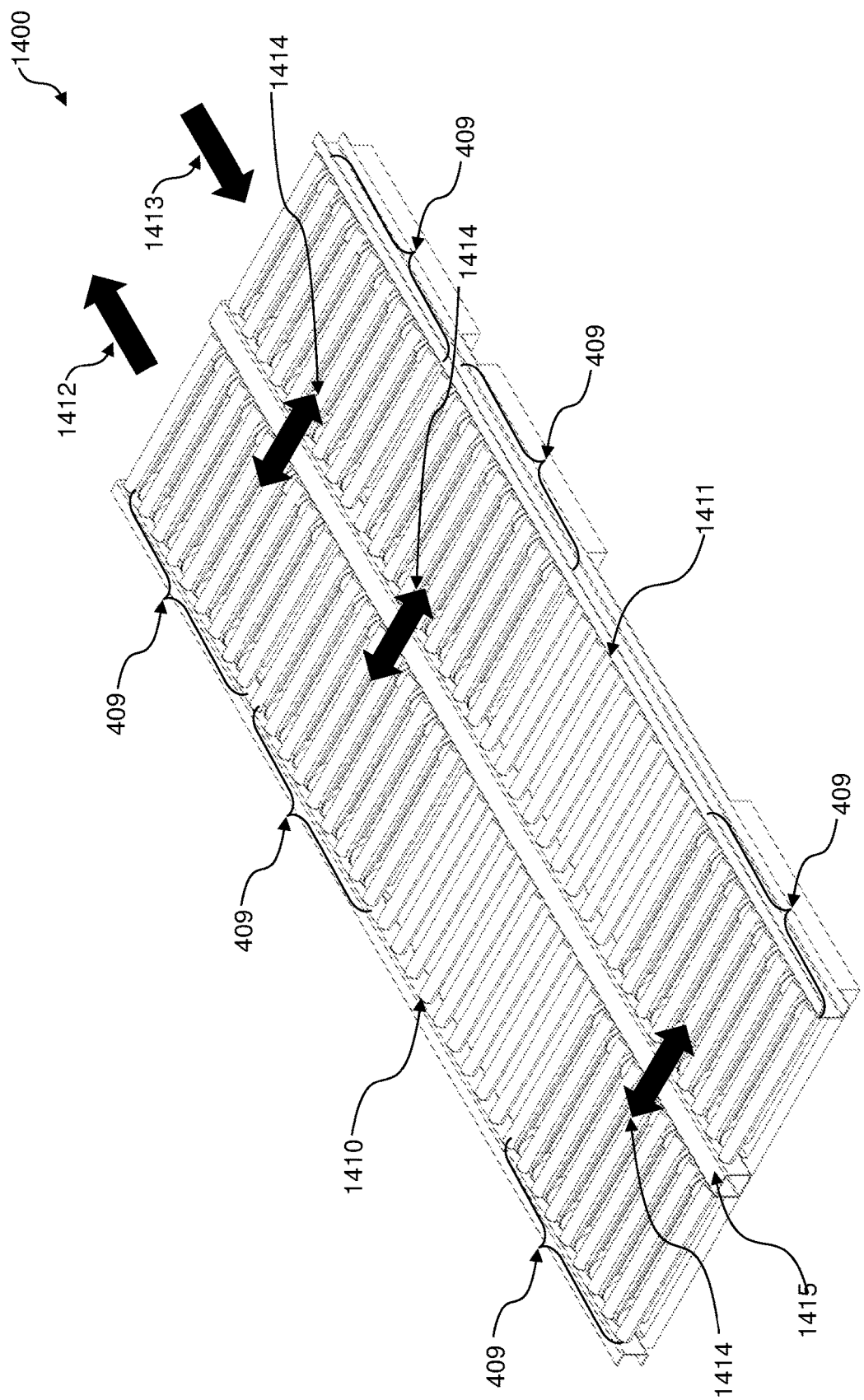
FIG. 14 is an isometric view of an embodiment for a Quick-Load Tote Storage unit 1400. In some embodiments, Quick-Load Tote Storage includes two sections of powered Conveyor (1410 and 1411) and a plurality of Cross-Lifts 409.

FIG. 14 shows an isometric view of motions 1400 of a Level-1 Tote Storage platform 1415 used for some embodiments of Level-1 Tote Storage platform 115 of FIG. 1 and FIG. 4, or 1015 of FIGS. 10A and 10B, or 1115 of FIGS. 11A and 11B. The Level-1 Tote Storage platform 1415 includes two segments of Conveyor 1410 and 1411 and Cross-Lifts 409 which can move a Tote laterally from one Conveyor segment to the other. A Tote enters the platform 1415 from the upgoing Vertical Elevator at the point and direction identified by arrow 1413. The Tote can then proceed in the same direction along Conveyor segment 1411 or cross over to Conveyor segment 1415 using Cross-Lifts 409 as denoted by arrows 1414. Once a Tote crosses over to Conveyor segment 1410, the Tote generally proceeds in the direction identified by arrow 1412, however both Conveyor segments are bidirectional if required. In some embodiments this combination of Conveyor segments 1410 and 1411 and Cross-Lifts 409 then allow Totes to be put in the correct Sequence for exit to the down-going Vertical Conveyor at the point and direction identified by arrow 1412.

The primary characteristic of Level-1 Tote Storage is its ability to load and/or unload Totes from the Conveyance Device the Level-1 Tote Storage is connected to at a rate that is equal to the maximum load/unload rate of that particular Conveyance Device. The ability to load/unload Totes at a maximum rate is used by the Multi-Level Tote Storage Simulation control algorithm to prevent potential Picker delays in some embodiments. The need to prevent delays is also the reason Level-1 Tote Storage is generally mounted as close to the Level-0 Tote Storage as the configuration of a particular embodiment allows. Besides horizontal Conveyors, in some embodiments certain types of Vertical Elevators are used for this function as well as other customized Tote Storage embodiments.

Generally, Level-2 Tote Storage is located at a location where there is sufficient space to house Tote Storage with enough Storage capacity to satisfy the worst-case scenario of the Multi-Level Tote Storage Simulation control algorithm relative to required Storage space. In most embodiments, the Level-2 Tote Storage location would be at the end of the Conveyance Device that leads to the Level-0 and Level-1 Tote Storage. In most embodiments of the FCA, that location is at the end and outside of the Aisle. In most embodiments, Level-2 Tote Storage is characterized by only having the ability to retrieve and/or store one Tote at a time. Handling only one Tote at a time means there would be extensive delays between the times a Tote was either placed on or retrieved from the Conveyance Device to which the Level-2 Tote Storage is connected. Besides the Storage Tower 120 in FIG. 4, other embodiments of Level-2 Tote Storage include Mini-ASRS's, a quite common warehouse automation device, Conveyor Storage Loops, and any other customized Tote Storage embodiments.

In most embodiments, the amount of Level-0 Tote Storage is determined solely by the amount of available space for that function. To avoid Picker delays, in most embodiments a plurality of Level-0 Tote Storage locations are used, and specifically a plurality of Level-0 Tote Storage locations for each Conveyance Device the Level-0 Tote Storage is connected to. While there is generally more space available for Level-1 Tote Storage, cost and/or functionality come into play. As can be seen by the basic embodiment of the FCA in FIG. 4, the length of the Level-1 Tote Storage platforms can get relatively longer to provide additional capacity. However, if the capacity of a single platform gets too high, it becomes more difficult and at times impossible to Sequence the Totes in the required order dictated by the Multi-Level Tote Storage Simulation control algorithm for that embodiment of Level-1 Tote Storage. Likewise, if a larger plurality of shorter Level-1 Tote Storage platforms are utilized as shown in other embodiments of the FCA, the cost of the system increases too much and/or the ability of the Multi-Level Tote Storage Simulation control algorithm becomes too complex or impossible. As such, the function of the Multi-Level Tote Storage Simulation control algorithm becomes one to make do with as little Level-1 Tote Storage capacity as possible and yet prevent any Picker delays.

Multi-Level Tote Storage Simulation Control Algorithm

Figure 15:
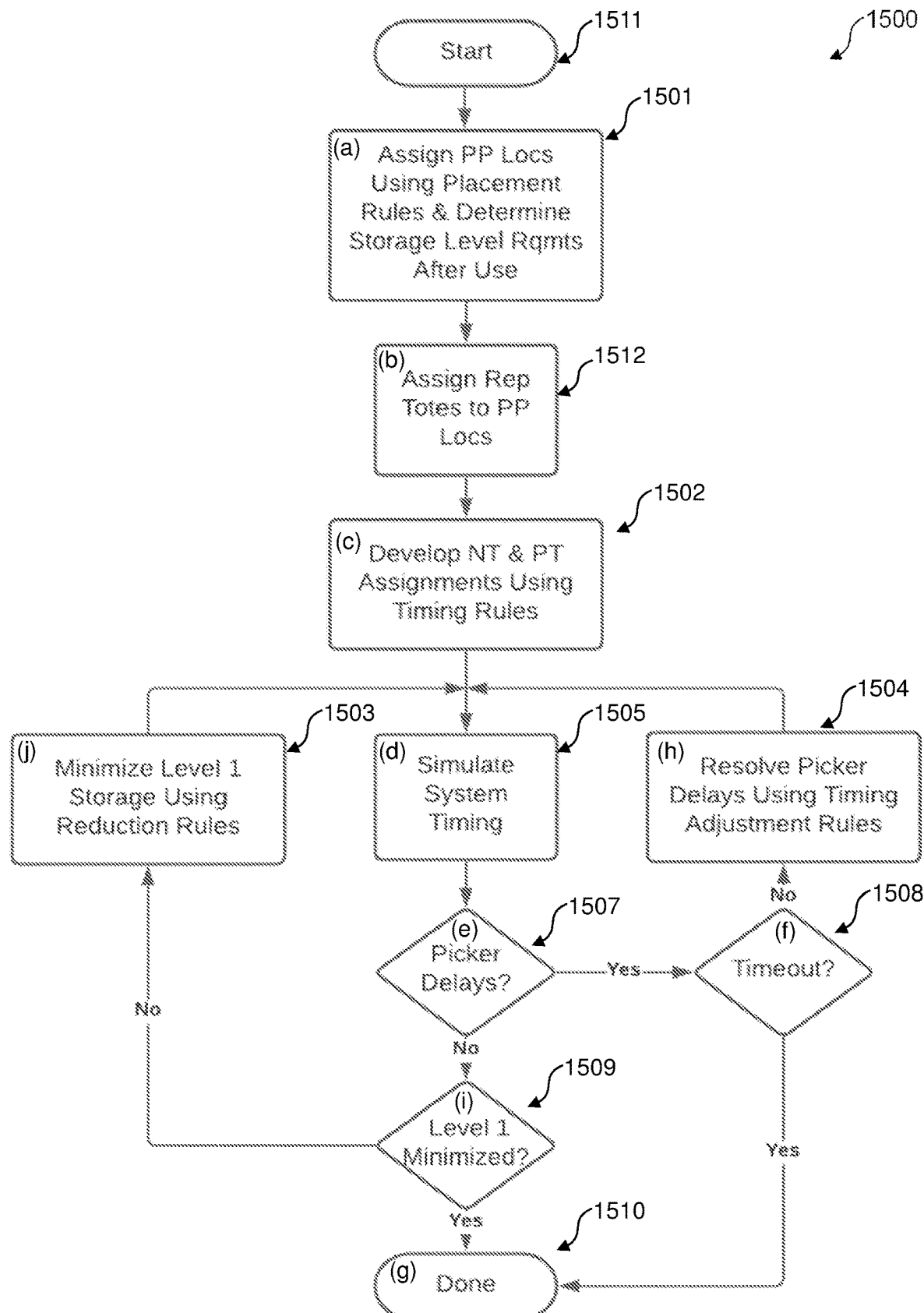
FIG. 15 is a flow chart of a computer-implemented Multi-Level Tote Storage Simulation control method 1500 which is used to control the mechanisms included in an FCA, according to some embodiments of the present invention.
Figure 16D:
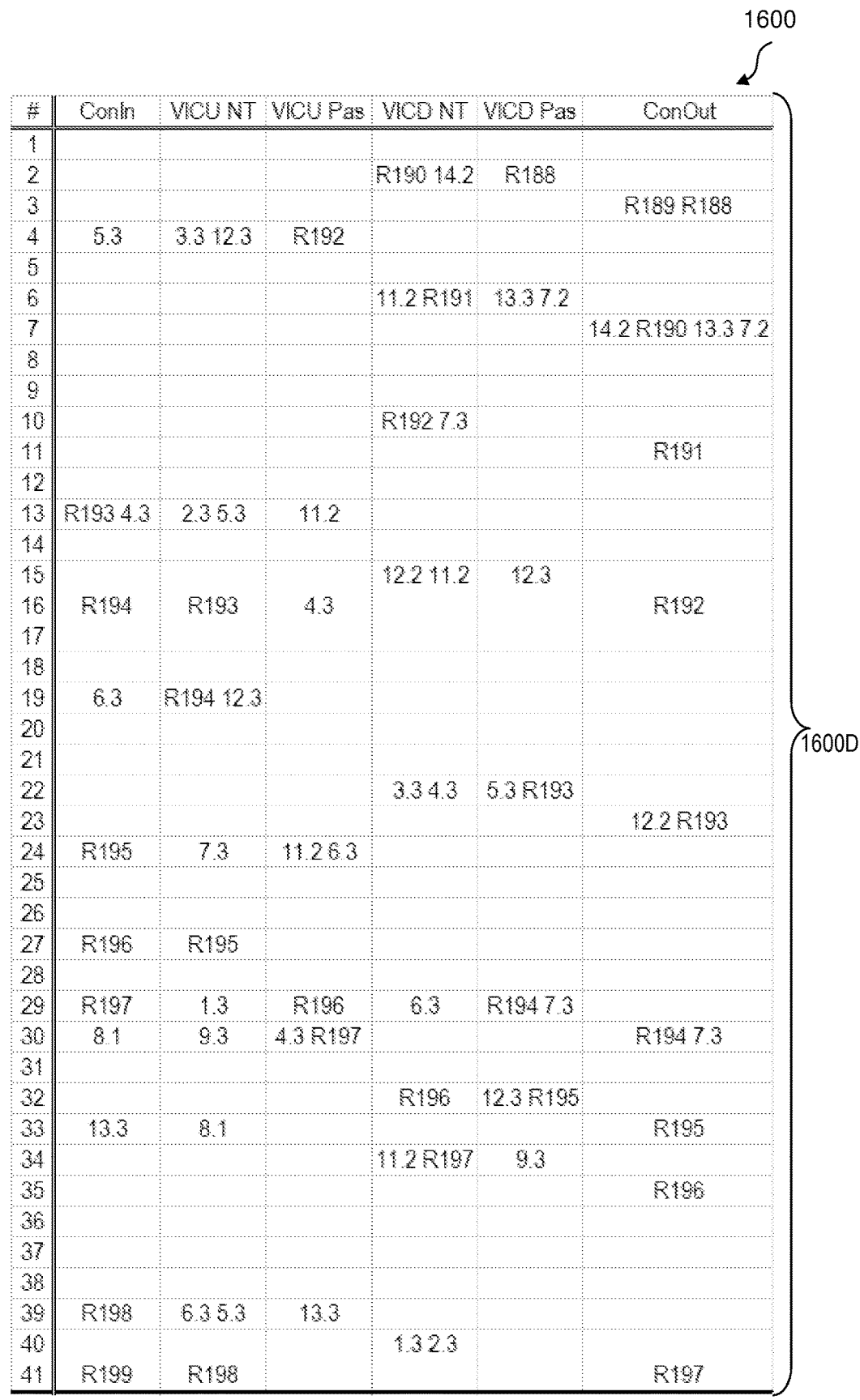

FIG. 15 shows a high-level flow chart of the method 1500 employed in the Multi-Level Tote Storage Simulation control algorithm, while FIGS. 16A-16D and FIGS. 17A-17D show representative results 1600 and 1700 for the Multi-Level Tote Storage Simulation control algorithm used for the basic embodiment of the FCA shown in FIG. 1. Unlike many control algorithms that can simply react to certain existing conditions in a system to make decisions for the next system action, in some embodiments, that is not possible when Totes are moved between the different levels of Tote Storage on Conveyance Devices in the basic embodiment of the FCA shown in FIG. 1.

In some embodiments, method 1500 simulates system timing iteratively until Level 1 is minimized and then uses the minimized solution for controlling the movement and timing of totes moving in the Systems of FIGS. 1-14. In some embodiments, method 1500 operates to minimized the number of Totes in Level 1 (i.e., Level-1 Tote Storage). Because there is finite storage in Level 1, it is necessary to ensure that no Tote lingers too long in Level-1 Tote Storage or else the system will run out of space in Level-1 Tote Storage. Therefore, method 1500 performs a balancing act. In some embodiments, method 1500 holds on to the Totes in Level-1 Tote Storage long enough to ensure no picker delays, but not long enough to run out of storage space in Level-1 Tote Storage. In some embodiments, method 1500 includes starting with block 1511, then going to block 1501 (*a*): assigning picker-platform locations (PP Locs) using placement rules and determining storage level requirements after use, then going to block 1512 (*b*): assigning replacement totes to picker-platform locations (Rep Totes to PP Locs), then going to block 1502 (*c*): developing NextTote and PassThru (NT and PT) assignments using timing rules, then going to block 1505 (*d*): simulating system timing, then going to block 1507 (*e*): determining whether there are picker delays, and if yes at block 1507 then going to block 1508 (*f*): determining whether there is a timeout and if yes then going to block 1510 (*g*): controlling a plurality of conveyance devices using the simulated system timing and stopping iterations since the method is completed (done); else if no picker delays at block 1507 then going to block 1509 (*h*): determining whether Level 1 is minimized and if yes then going to block 1510 (*g*): controlling a plurality of conveyance devices using the simulated system timing and stopping iterations since the method is completed (done); else if no at block 1508 (no timeout) then going to block 1504 (*i*): resolving picker delays using timing adjustment rules and then returning to block 1505; else if no at block 1509 (Level 1 is not minimized) then going to block 1503: minimizing Level 1 Storage using reduction rules and then returning to block 1505.

In the basic embodiment of the FCA shown in FIG. 1 and other embodiments, control of the Conveyance Devices and the different levels of Tote Storage (wherein this control is the result of a software program that simulates various possible Tote movements to optimize the arrival times of Totes at the Picker location) is driven by the need to ensure that those Totes (NextTotes) that will replace the completed Totes (DoneTotes) are in a position on the Vertical Elevators (VIC's in the case of the basic embodiment where the upgoing Vertical Elevator will be denoted as the "VICU" and the down-going Vertical Elevator will be denoted as the "VICD") so the replacement can be achieved in the shortest possible time. In addition, the controller is programmed to ensure all the other Totes that will be passing through (PassThrus) the same VIC during a particular Tote Cycle are also in the properly selected positions on that VIC. In some embodiments, that means the control algorithm controls up to five Totes (e.g., two NextTotes and three PassThrus) in any given Tote Cycle (a Tote Cycle is any single operation of one of the VICs).

In addition, a DoneTote might not leave Level-0 Tote Storage immediately after a Picker has placed one or more picked items into that Tote (when the Pick Action is "complete"). That DoneTote might need to be reused again shortly in Level-0 Tote Storage or to optimize timing, that DoneTote may need to be held in Level-0 Tote Storage until the other DoneTote on that particular VIC is also complete so two Totes can be swapped out at the same time to help ensure Tote timing is being optimized. In some embodiments, if only one Tote was being controlled every Tote Cycle, the VICs would not keep up and Picker delays would occur. This is why, in some embodiments, a maximum number of Totes need to be controlled each time a VIC moves or else Picker delays will occur. This is compared to a typical "real time" control scenario where a control algorithm would just decide which level of Tote Storage a DoneTote needs to be sent to following a completed Pick Action.

Given the fact the software control algorithm is controlling up to five Totes at a time in some embodiments, combined with the additional reasons shown below, it becomes apparent why the algorithm is so complex and cannot be performed "real time". Those additional reasons include the following:

There are timing interdependencies between the various Conveyance Devices that cannot be readily predicted.

The number of Totes in some of the levels of Tote Storage at any point in time is carefully controlled in some embodiments. In the case of Level-0 Tote Storage, there are only a finite number of available spaces. In the case of Level-1 Tote Storage, while Level-1 Tote Storage has the ability to be expanded in size, when that expansion happens arbitrarily, Level-1 Tote Storage may be become difficult or even impossible to Sequence the Totes as the Totes are required.

While the location of where a Tote is moved to and when can be dependent on previous system actions on other Totes, that specific system action will also generally have a significant impact on the future states of Totes waiting to be moved.

Because of these factors, in some embodiments simulation is used to predict the times any given Tote will be at a given location in the system, whether that time be on a Conveyance Device or stored in one of the Levels of Tote Storage. That simulation is part of the method shown in the flow chart in FIG. 15 that utilizes four different sets of heuristic rules (Blocks 1501, 1502, 1503, and 1504) to help determine the specific locations and the corresponding timing for every Tote that is utilized to complete all the Pick Actions identified in a specific Pick List, all without incurring any Picker delays. Those four sets of heuristic rules are:

Initial Placement Rules 1501—These determine which Totes need to be in which position on the Picker Platform at what times and which Totes need to be held on the Picker Platform, sent to Level-1 Tote Storage, or sent to Level-2 Tote Storage following the completion of a Pick Action;

NextTote and PassThru Timing Rules 1502—These determine when the NextTotes need to arrive for any Tote Cycle and what PassThrus need to accompany them for that specific Tote Cycle;

Timing Adjustment Rules 1504—These rules adjust the timing of NextTotes, the timing of PassThrus, and/or which Totes are on the Picker Platform at any given time to eliminate any Picker delays; and Storage Reduction Rules 1503—These rules reduce the number of Totes in Level-1 Tote Storage (and handle any ensuing Picker delays incurred in the process) since if that number gets too large the Level-1 Tote Storage likely becomes impossible to operate with existing technology.

The Multi-Level Tote Storage Simulation control algorithm is essentially a complex optimization problem where the location assignments (in a specific Level of Tote Storage or on a Conveyance Device) and the associated timing for all the Totes utilized to complete all the Pick Actions in a Pick List, are made to minimize the number of Totes in Level-0 and Level-1 Tote Storage and deliver any Tote to Level-0 Tote Storage at the earliest time possible that ensures its availability for the associated Pick Action. This prevents any potential Picker delay. Since the complexity of optimization problems increase almost exponentially with the number of variables and generally requires a time-consuming iterative solution, simpler and faster heuristics (heuristic algorithms, heuristic rules, etc.) are used to find an approximate solution. In this case, if the required Storage capacity of Level-0 or Level-1 Tote Storage does not get excessive and there are no Picker delays, an approximate solution is sufficient even though it might night be optimal.

In some embodiments, this means allocating as many Level-0 and Level-1 Tote Storage sites as practically possible and then solving the optimization problem for Tote location and timing assignment to ensure no Picker delays and to keep the Totes Storage requirements lower or equal to the available Tote Storage capacity. This is how the Multi-Level Tote Storage Simulation control algorithm and its associated heuristic rules work. As an example, as part of the heuristic Initial Placement Rules, all the Tote assignments and their timing need to be made for the Tote Storage locations in Level-0 Tote Storage to ensure any specific Tote is available when the Picker requires it for an associated Pick Action. At the same time, it is desirable (and often necessary) to have as much time as possible to utilize the Conveyance Devices for other required Tote movements. This means it is generally best to alternate Level-0 Tote Storage location assignments between locations on the two different Vertical Elevators that service Level-0 Tote Storage in the basic embodiment and to maximize the time between a given Storage location being reused. This type of an approach maximizes the availability of either Vertical Elevator for alternate use as compared to a worst-case scenario where the Vertical Elevator would need to use the same Level-0 Tote Storage location for two consecutive Pick Actions. In that case, at a minimum, the Picker would need to wait for the Tote whose Pick Action was just complete to be extracted and then replaced by the Tote to be used for the next Pick Action. Ideally, it is desired to have all those extractions and replacements occur while the Picker is using a different Tote in Level-0 Tote Storage. Even if the two Level-0 Tote Storage locations on the same Vertical Elevator are used for consecutive Pick Actions, it leaves precious little time for that Vertical Elevator to perform all the necessary Tote movement actions to prevent Picker delays.

To achieve this type of solution, the heuristic rules are then to alternate between Level-0 Tote Storage locations on alternating Vertical Elevators and to maximize the time between the reuse of any specific Level-0 Tote Storage location. Since there are four Level-0 Tote Storage locations in the basic embodiment of the invention, that means two locations (1 and 3) are assigned to upgoing Vertical Elevator and the other two (2 and 4) assigned to the down-going Vertical Elevator. In the simplest sense, it would be possible to assign a continuous 1-2-3-4 sequence which satisfies both rules. However other requirements supersede to prevent this, the most prevalent one being that a Tote must be reused in a time that does not allow the Tote to leave Level-0 Tote Storage and must be "held". That means there are now only 3 available locations left for assignment and the sequencing becomes more difficult to maximize Vertical Elevator time for other actions. Sometimes, there are 2 or even 3 Totes that need to remain in Level-0 Tote Storage at any one time, in which case the assignment problem is even more dire. From a conceptual perspective, the way the heuristic algorithm works to implement the heuristic Initial Placement Rules is to use a FIFO stack storing available Level-0 Tote Storage locations which alternate between the two Vertical Elevators (e.g., 1-4-3-2). That means when the next available location is "popped" off the stack, it will be followed by a location on the other Vertical Elevator and when a Tote's Pick Action is complete and it leaves Level-0 Tote Storage, its location is pushed back on to the stack to maximize the time between its reuse given a FIFO configuration. If any location needs to be "held", it is then removed from the stack. This means that on occasion, two locations (e.g., 1 and 3) on the same Vertical Elevator would follow one another, thus causing a potential timing concern. While there are a number of rules to account for all scenarios, in the simplest case if this were to occur, the second value (3) would be pushed back onto the stack and the location following it (generally an even number) would be used to help abide by the rule to alternate locations between the two Vertical Elevators.

As seen in FIG. 15, the Multi-Level Tote Storage Simulation control method or algorithm 1500 initiates by using the heuristic Initial Placement Rules 1501 to identify which Totes need to be in Level-0 Tote Storage at which times such that the Picker can perform any Pick Action associated with the Pick List. The Initial Placement Rules 1501 then determine which Totes need to remain in Level-0 Tote Storage following the completion of a Pick Action or need to be sent to either Level-1 Tote Storage, Level-2 Tote Storage, or exit the system dependent on when that specific Tote will need to be reused for its next Pick Action. If a Tote needs to depart Level-0 Tote Storage, it is initially assumed that is done immediately following the completion of the associated Pick Action. These actions then formulate the initial placement plan for Level-0 Tote Storage except for the Replenishment Totes.

Following the initial placement of all the Totes identified in the Pick List, the Multi-Level Tote Storage Simulation control algorithm 1500 then identifies when all the Totes used for Replenishment also need to be in Level-0 Tote Storage and modifies the initial placement plan accordingly (block 1502). With the initial placement plan complete, the Multi-Level Tote Storage Simulation control algorithm then uses the heuristics in the NextTote and PassThru Timing Rules 1502 to determine the specific location (in Tote Storage or on a Conveyance Device) and associated timing for any given Tote within the system over the duration specified in the Pick List all to minimize any potential Picker delays that might occur due to a Tote not being located in Level-0 Tote Storage when the Picker requires the Tote. With the current heuristics however, Picker delays still occur following the initial placement algorithm.

These Picker delays can result from a number of different possible sources which include the following:

- The need to minimize the number of Totes in Level-1 Tote Storage;
- The need for a Replenishment Tote for a given SKU to be present at the same time a receiving Tote is having that same SKU placed in it. This need to have two specific Totes in place at the same time complicates control significantly;
- The need to maximize the number of Totes on any given VIC during the ensuing Tote Cycle;
- When there are insufficient picks per Tote and/or insufficient Totes used per Pick Window (which occurs outside the prime center of the Pick Face) the time between swapping Totes in Level-0 Tote Storage can get less than the time it takes for a Tote Cycle to complete which then causes cascading delays on that VIC (i.e., it cannot keep up); and
- Insufficient time to bring a Tote back to Level-0 Tote Storage when it will need to be used again shortly but there is not sufficient space in Level-0 Tote Storage to hold it (this is essentially a form of feedback, thus complicating the algorithm).

Following the use of these first two sets of heuristic rules, the Multi-Level Tote Storage Simulation control algorithm then utilizes simulation 1505 to determine what Picker delays still remain. Once the algorithm determines where and when Picker delays will occur based on the simulation, the algorithm then uses the additional heuristics of the Timing Adjustment Rules 1503 to determine which Totes' placement and/or timing need to be modified to eliminate the Picker delays. The Multi-Level Tote Storage Simulation control algorithm then iterates until no Picker delays remain. The final step then becomes an additional heuristic algorithm using the Storage Reduction Rules 1504 to minimize the number of Totes located on any of the Level-1 Tote Storage platforms at any point in time. Since these actions generally result in creating new delays for the Picker, further iteration is done to minimize the required Level-1 Tote Storage capacity without causing Picker delay. In essence, this iteration becomes a series of optimization problems used to identify when the system needs to execute an action pertaining to any Tote.

In some embodiments, it is believed the real-time control of Tote movement based mainly on sensed conditions such as Tote locations and/or Picker location on a Pick Face, as would be typical in most applications, is exceedingly difficult, if not impossible. Accordingly, in some embodiments, method 1500 (or method 2100) is iteratively performed ahead of time to output parameters to control the plurality of Conveyance Devices to move Totes between the various levels of Tote Storage.

The main obstacle to real-time control are the Picker delays that cannot be initially accounted for and must be eliminated using the Timing Adjustment Rules 1503. In some embodiments, the function of the Multi-Level Tote Storage Simulation control algorithm then includes controlling Tote movement between the various levels of Tote Storage utilizing the critical relationships that exist between those various levels of Tote Storage and the Conveyance Devices connecting them, and are demonstrated by using the data that exists in the tables in FIGS. 16A-16D and 17A-17D. The data also demonstrates the required performance levels and functionality of the respective levels of Tote Storage to ensure no delays occur for the Picker in the system.

It should be noted that the data in both sets of tables in FIGS. 16A-16D and 17A-17D is only partial data utilized by the Multi-Level Tote Storage Simulation control algorithm. It is considered sufficient to only demonstrate the desired functionality. Each row in the four tables constitutes a data record, with each record indicating a Pick Cycle, essentially the information characterizing the execution of a single Pick Request on the Pick List. Any time there are Tote Numbers identified in the VUTime field, it indicates a Tote Cycle for the upgoing Vertical Elevator on the Shuttle Cart is also occurring. In other words, the Vertical Elevator is executing a series of operations associated with that Pick Cycle. The same is true for the VDTime field relative to the down-going Vertical Elevator on the Shuttle Cart. Otherwise, the remaining fields (columns) used in the tables are:

- #Field—This is the record number and is the first column in each table on FIGS. 16A-16D and 171-17D. The four tables when combined constitute a single larger table such that the record number identifies the same continuous record on each Figure.
- PW Field—This is the Pick Window identifier indicating where the Picker Platform is located on the Pick Face. The first letter identifies the column with Column A being the first column in the Aisle and the second number identifies the row with Row 5 being the top row on the Pick Face.
- Tote Field—This is the Tote number that is active which the Picker will be utilizing for the associated Pick Request.
- Elapsed Field—This is the elapsed time in seconds when the Pick Cycle identified in the associated record is completed. The elapsed time is also the time the Tote Cycle starts if there is a Tote Cycle associated with that Pick Cycle. Any one Pick Cycle is part of the Pick List that is the basis for the Multi-Level Tote Storage Simulation.
- UTRdy Field—A value indicates there is a Tote Cycle for the upgoing Vertical Elevator on the Shuttle Cart associated with the corresponding Pick Cycle. The value is in seconds and indicates the elapsed time when all the Totes required to perform the Tote Cycle are in their necessary locations either in some level of Tote Storage or on a Conveyance Device. If the seconds identified in this field exceed the Elapsed time, it indicates the Totes are not where the Totes need to be when required and may or may not lead to a Picker Delay.
- DTRdy Field—This is the same information as that in the UTRdy field except for the down-going Vertical Elevator on the Shuttle Cart.
- UDif Field—A value indicates the amount of delay in seconds for the Tote Cycle for the upgoing Vertical Elevator on the Shuttle Cart associated with the Pick Cycle.
- Ddif Field—A value indicates the amount of delay in seconds for the Tote Cycle for the down-going Vertical Elevator on the Shuttle Cart associated with the Pick Cycle.
- Move Field—A value indicates the amount of time in seconds required to move the Picker Platform for that Pick Cycle.
- Pick Field—A value indicates the amount of time in seconds required for the Picker to pick the SKU for that Pick Cycle. A shorter time is indicative of a Chain Pick.
- Rep Field—A value indicates the amount of additional time in seconds required to do an associated Replenishment action for that Pick Cycle.

ToteCyc Field—This is the amount of time in seconds the Tote indicated in the Tote field remains being the active Tote on the Picker Platform.

NextUse Field—This is the amount of time in seconds before the Tote indicated in the Tote field is used again. A "0" indicates the Tote is active and a "Done" indicates the Tote is available to exit the system.

Ucrit Field—A value is only identified when there is a Tote Cycle for the upgoing Vertical Elevator on the Shuttle Cart in the associated Pick Cycle. The value is the Tote number utilized in that Tote Cycle which will be required first by the Picker for that Tote's associated Pick Request.

Dcrit Field—This is the same information as that in the Ucrit field except for the down-going Vertical Elevator on the Shuttle Cart.

VUTime Field—A value indicates the amount of time in seconds required to execute the Tote Cycle for the upgoing Vertical Elevator on the Shuttle Cart in the associated Pick Cycle.

VUBuf Field—A value indicates the amount of time in seconds before the Tote identified in the corresponding Ucrit field is used by the Picker for the Tote's associated Pick Request. The VUBuf value is the buffer time for the upgoing Vertical Elevator on the Shuttle Cart.

VDTime Field—A value indicates the amount of time in seconds required to execute the Tote Cycle for the down-going Vertical Elevator on the Shuttle Cart in the associated Pick Cycle.

VDBuf Field—A value indicates the amount of time in seconds before the Tote identified in the corresponding Dcrit field is used by the Picker for the Tote's associated Pick Request. The VDBuf value is the buffer time for the down-going Vertical Elevator on the Shuttle Cart Tote1 Field—This is the number of the Tote occupying the #1 Tote position of the Level-0 Tote Storage on the Picker Platform for the respective Pick and Tote Cycles.

Tote2 Field—This is the number of the Tote occupying the #2 Tote position of the Level-0 Tote Storage on the Picker Platform for the respective Pick and Tote Cycles.

Tote3 Field—This is the number of the Tote occupying the #3 Tote position of the Level-0 Tote Storage on the Picker Platform for the respective Pick and Tote Cycles.

Tote4 Field—This is the number of the Tote occupying the #4 Tote position of the Level-0 Tote Storage on the Picker Platform for the respective Pick and Tote Cycles.

TopPlat Field—This identifies the Tote numbers of all the Totes that are either on or pass through the top Level-1 Tote Storage platform sometime during the associated Pick Cycle and/or Tote Cycle.

BotPlat Field—This identifies the Tote numbers of all the Totes that are either on or pass through the bottom Level-1 Tote Storage platform sometime during the associated Pick Cycle and/or Tote Cycle.

ConIn Field—A value indicates the Tote numbers of the Totes that are available on the incoming Conveyor for the upgoing Vertical Elevator on the Shuttle Cart to be used on the next Tote Cycle for that Vertical Elevator.

VICU NT Field—A value identifies the Tote numbers of the Totes that are scheduled to be stored in Level-0 Tote Storage by the upgoing Vertical Elevator during the associated Tote Cycle. The Totes can originate from the incoming Conveyor or from the bottom Level-1 Tote Storage platform.

VICU Pas Field—A value identifies the Tote numbers of the Totes that are scheduled to be stored in the top Level-1 Tote Storage platform by the upgoing Vertical Elevator during the associated Tote Cycle. The Totes can originate from the incoming Conveyor or from the bottom Level-1 Tote Storage platform.

VICD NT Field—A value identifies the Tote numbers of the Totes that are scheduled to be stored in Level-0 Tote Storage by the down-going Vertical Elevator during the associated Tote Cycle. The Totes originate from the top Level-1 Tote Storage platform.

VICD Pas—A value identifies the Tote numbers of the Totes that are scheduled to be stored in the top Level-1 Tote Storage platform or be sent to the outgoing Conveyor by the down-going Vertical Elevator during the associated Tote Cycle. The Totes originate from the top Level-1 Tote Storage platform.

ConOut Field—A value indicates the Tote numbers of the Totes that are sent to the outgoing Conveyor by the down-going Vertical Elevator on the Shuttle Cart during the immediately preceding Tote Cycle.

The data tables in FIGS. 16A-16D hold the necessary information to indicate the results of the heuristic Initial Placement Rules 1501 and the NextTote and PassThru Timing Rules 1502 of the overall Multi-Level Tote Storage Simulation control algorithm 1500 for a sampling of the Pick Cycles from a representative Pick List. In this case, the data tables show 41 Pick Cycles out of the 838 in the Pick List. The associated data tables in FIGS. 17A-17D then hold the necessary information to indicate the results of the second phase of the Multi-Level Tote Storage Simulation control algorithm where the Multi-Level Tote Storage Simulation uses the heuristic Timing Adjustment Rules to eliminate the Picker delays in the same 41 Pick Cycles identified in the initial placement algorithm.

To demonstrate the critical relationships that exist between the different levels of Tote Storage and the Conveyance Devices that connect the different levels of Tote Storage and to also demonstrate the required performance levels and functionality of the respective levels of Tote Storage to ensure no Picker delays, some examples will be cited in the tables. These examples will also demonstrate some of the Timing Adjustment Rules used to eliminate Picker delays. To identify a particular unit of data a referencing convention will be employed where the data will be pointed to with three pieces of information. The first is the Data Table #, the second is the Record #, and the third is the Field. As an illustration, to refer to the Elapsed time of the 20$^{th}$ Record in Table 16A, the data will be cited as "16A-20-Elapsed". Using these conventions, the examples to be cited are:

Example 1—The data at 17C-2-VICD_NT and 17C-2-VICD_Pas indicate four Totes the VICD delivers to Level-0 Tote Storage, the bottom Level-1 Tote Storage platform, and the outgoing Conveyor. All these Totes originate at the top Level-1 Tote Storage platform. The data at 17B-2-VDBuf indicates there is only 0.2 seconds of buffer time. Therefore, if the top Level-1 Tote Storage platform did not have the ability to load Totes onto the VICD at that Conveyance Device's maximum rate, there would be a Picker delay. The ability of Level-1 Tote Storage to load/unload Totes at a maximum rate is a clear indicator why Level-1 Tote Storage has that capability in some embodiments and what differentiates Level-1 Tote Storage from Level-2 Tote Storage.

Example 2—The data at 17C-1-TopPlat identifies all the Totes that are either on or pass through the top Level-1 Tote Storage platform sometime during the associated Pick Cycle and/or Tote Cycle. There are 11 different Totes. If eleven Totes were actually on the top Level-1 Tote Storage platform at one time, it would be very difficult if not impossible to sequence the Totes in the correct order cited in Example 1. This data fortunately has not had the final step of the overall Multi-Level Tote Storage Simulation control algorithm applied, which reduces the number of Totes on a Level-1 Tote Storage platform in those cases where the Totes are excessive by rearranging the location and timing of the associated Totes. This example is thus intended to show the necessity of the Multi-Level Tote Storage Simulation control algorithm to manage the capacity of Level-1 Tote Storage at any given time and the specific need for Level-1 Tote Storage to have a relatively small finite capacity.

Example 3—The data at 17A-9-Tote identifies Tote 11.2 as the active Tote. Tote 11.2 is again identified as the active Tote in the data at 17A-20-Tote which is 53.7 seconds later as identified by the data at 17B-9-NextUse. Likewise, between the two occurrences, there are 5 other Totes that use Level-O Tote Storage. Having five other Totes and only four Level-O Tote Storage locations means Tote 11.2 cannot stay in Level-O Tote Storage until Tote 11.2 is needed again, but rather must leave Level-O Tote Storage. However, 53.7 seconds is not sufficient time for the Tote to be sent to Level-2 Tote Storage and return. While Tote 11.2 was initially at the Tote4 location (17C-10-Tote4), when Tote 11.2 is reused, Tote 11.2 is at the Tote2 location (17C-17-Tote2). The Tote2 and Tote4 Level-O Tote Storage locations are both serviced by the VICD, while the VICU services the Tote1 and Tote3 positions. The Level-O Tote Storage locations mean Tote 11.2 moves from the Tote4 location (17C-10-Tote2) to the bottom Level-1 Tote Storage platform (17C-11-BotPlat to 17C-13-BotPlat) to the VICU (17D-14-VICU_Pas) to the top Level-1 Tote Storage platform (17C-15-TopPlat) to the VICD (17D-16-VICD_NT) before Tote 11.2 returns to the Tote2 location (17C-17-Tote2). The system only has 53.7 seconds to perform these actions before a Picker delay occurs and further demonstrates the requirement for Level-1 Tote Storage to rapidly load/unload Totes, the need for Level-1 Tote Storage to be as close to Level-O Tote Storage as practically possible and the need for there to be a plurality of Level-O Tote Storage locations in most embodiments.

Example 4—The data at 17A-4-Tote identifies Tote 13.3 as the active Tote. Tote 13.3 is then identified to be used again 265.3 seconds later as identified by the data at 17B-4-NextUse. The 265.3 seconds mean the Tote has more than sufficient time to be returned to Level-2 Tote Storage at the end of the Aisle in this basic embodiment of the FCA. Tote 13.3 can be seen being sent to the outgoing Conveyor for return to Level-2 Tote Storage at 17D-17-ConOut and returning on the incoming Conveyor at 17D-33-ConIn. The 265.3 seconds also explains why Level-2 Tote Storage is allowed to only store and retrieve Totes one at a time. In the data, it can also be seen how Tote 13.3 spends considerable time on the top Level-1 Tote Storage platform (17C-5-TopPlat to 17C-15-TopPlat) before Tote 13.3 is sent to the outgoing Conveyor (17D-17-ConOut). The delay on the top Level-1 Tote Storage platform is done to initially eliminate potential timing interdependencies between the two Level-1 Tote Storage platforms that might cause Picker delay. However, when the final step of the Multi-Level Tote Storage Simulation control algorithm is performed (which has not been done on the data in the tables) which attempts to minimize the number of Totes on each Level-1 Tote Storage platform, it is likely Tote 13.3 will be sent to the outgoing Conveyor in an earlier Tote Cycle such as the one in Record #10.

Example 5—The remaining examples will demonstrate how the Multi-Level Tote Storage Simulation control algorithm utilizes the characteristics and locations of the different levels of Tote Storage combined with the associated Conveyance Devices to eliminate Picker Delays resulting from the initial placement algorithm by modifying the load/unload times of affected Totes. The data at 16C-22-Tote2 indicates Tote 11.2 is in the Tote 2 location in Level-0 Tote Storage during the Tote Cycle that occurs as part of the Pick Cycle in Record #22. That Tote Cycle starts at 3741.4 seconds (16A-22-Elapsed) and runs for 22.8 seconds (16B-22-VD-Time) while only 3 seconds expires in the next Tote Cycle (16A-23-Pick) before Tote 11.2 is required to be on the VICU (16D-24-VICU_Pas). That dependency of the VICU on the VICD results in the potential 4.4 second Picker delay (16B-24-VUBuf). The resolution to the issue merely relies on keeping Tote 11.2 on the bottom Level-1 Tote Storage platform a longer time (17C-23-BotPlat to 17C-26-BotPlat) before Tote 11.2 is released to the VICU (17D-27-VICU_Pas).

Example 6—The data at 16C-39-Tote1 indicates Tote 1.3 is in the Tote 1 location in Level-0 Tote Storage during the Tote Cycle that occurs as part of the Pick Cycle in Record #39. That Tote Cycle starts at 3823.6 seconds (16A-39-Elapsed) and runs for 16.6 seconds (16B-39-VUTime) while Tote 1.3 is required to be on the VICD (16D-40-VICD_NT) the very next Pick/Tote Cycle. That dependency of the VICD rather on the VICU results in the potential 10.1 second Picker delay (16B-40-VDBuf). The resolution to the issue relies on releasing Tote 1.3 to the top Level-1 Tote Storage platform first (17C-38-TopPlat to 17C-39-TopPlat) and moving Tote 13.3 to the VICU (17D-37-VICU_Pas) from the incoming Conveyor earlier.

Example 7—The data at 16C-13-Tote3 indicates Tote 12.3 is in the Tote 3 location in Level-0 Tote Storage during the Tote Cycle that occurs as part of the Pick Cycle in Record #13. That Tote Cycle starts at 3685.8 seconds (16A-13-Elapsed) and runs for 15.5 seconds (16B-13-VUTime) while only 6 seconds expires in the next Tote Cycle (16A-14-Pick) before Tote 12.3 is required to be on the VICD (16D-15-VICD_Pas). That dependency of the VICD on the VICU in part results in the potential 13.1 second Picker delay (16B-15-VD-Buf). As part of the resolution to this issue, Tote 12.3 was moved to the top Level-1 Tote Storage platform at an earlier time (17C-9-TopPlat to 17C-13-TopPlat). In addition, Totes 11.2, 7.2, and 13.3 (17D-16-VICD_NT and 17D-16-VICD_Pas) were move to later times and Totes 2.3 and 5.3 were moved to earlier times (17D-8-VICU_NT and 17D-13-VICU_NT). These changes demonstrate the associated corrective heuristics can sometimes be complex.

The pick times indicated in the examples and within the data tables of FIGS. 16A-16D and 17A-17D are indicative of the pick times required to be commercially competitive. The information in the preceding examples confirms the requirement for a system with Multi-Level Tote Storage to satisfactorily fulfill all the Pick Requests contained in a Pick List without experiencing Picker delay, regardless of the origin of that Pick List. The examples also confirm the required functionality of the different levels of Tote Storage and their interconnections using a Conveyance Device(s).

Figure 18A:
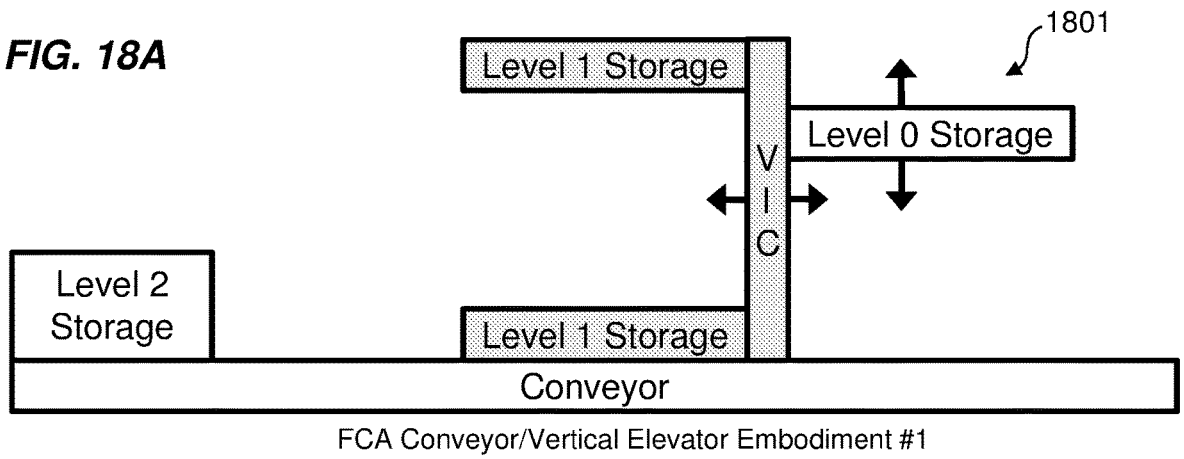
FIG. 18A-18C are block diagrams 1801, 1802, and 1803, respectively, of different embodiments for the solution, indicating the use of the Shuttle Cart would not be mandatory. The first one shown, 1801, is the block diagram for the most basic embodiment of the FCA.
Figure 18B:
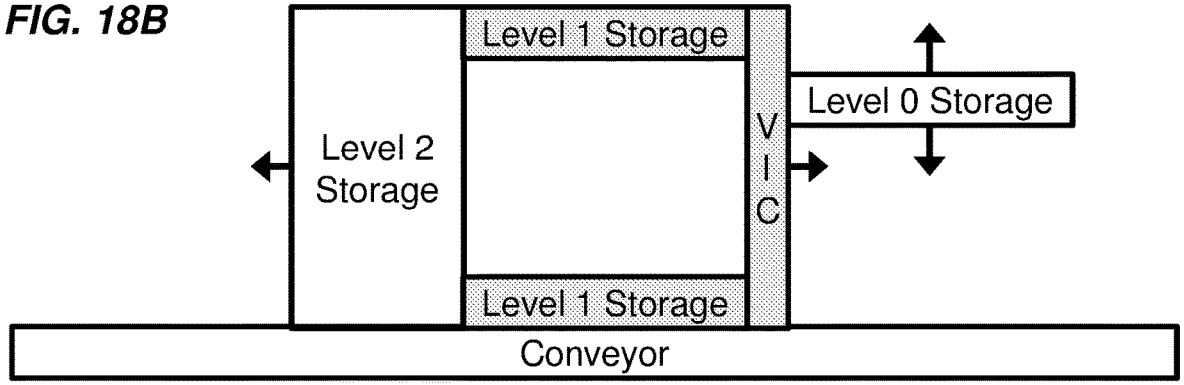
Figure 18C:
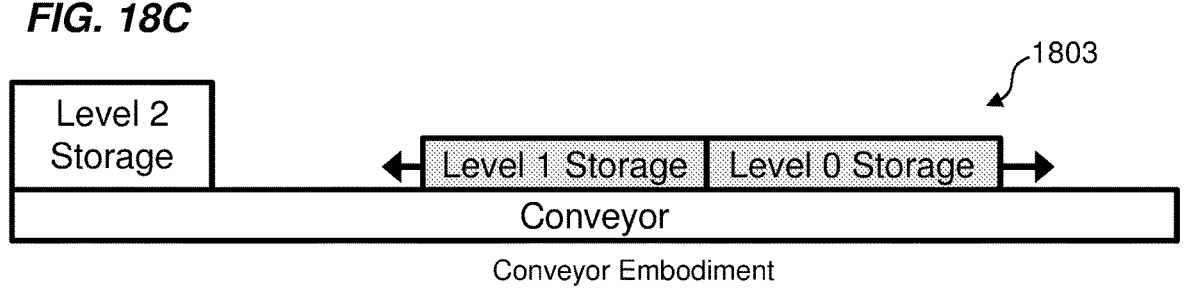

While the preferred and/or basic embodiments provide the overall best performance combined with cost, there are several other possibilities for embodiments other than the ones illustrated so far. Assuming the Vertical Elevators are implemented with VICs (Vertical Index Conveyors), FIGS. 18A-18C show block diagrams for the basic embodiment ("FCA Conveyor/Vertical Elevator Embodiment #1" in FIG. 18A) and for the embodiment where the Level-2 Tote Storage was moved on to the Shuttle Cart ("FCA Conveyor/Vertical Elevator Embodiment #2" in FIG. 18B). Also shown is a block diagram where there are not Vertical Elevators and Level-0 Tote Storage and Level-1 Tote Storage are mounted on a horizontally movable cart within an Aisle ("Conveyor Embodiment" in FIG. 18C).

Figure 19:
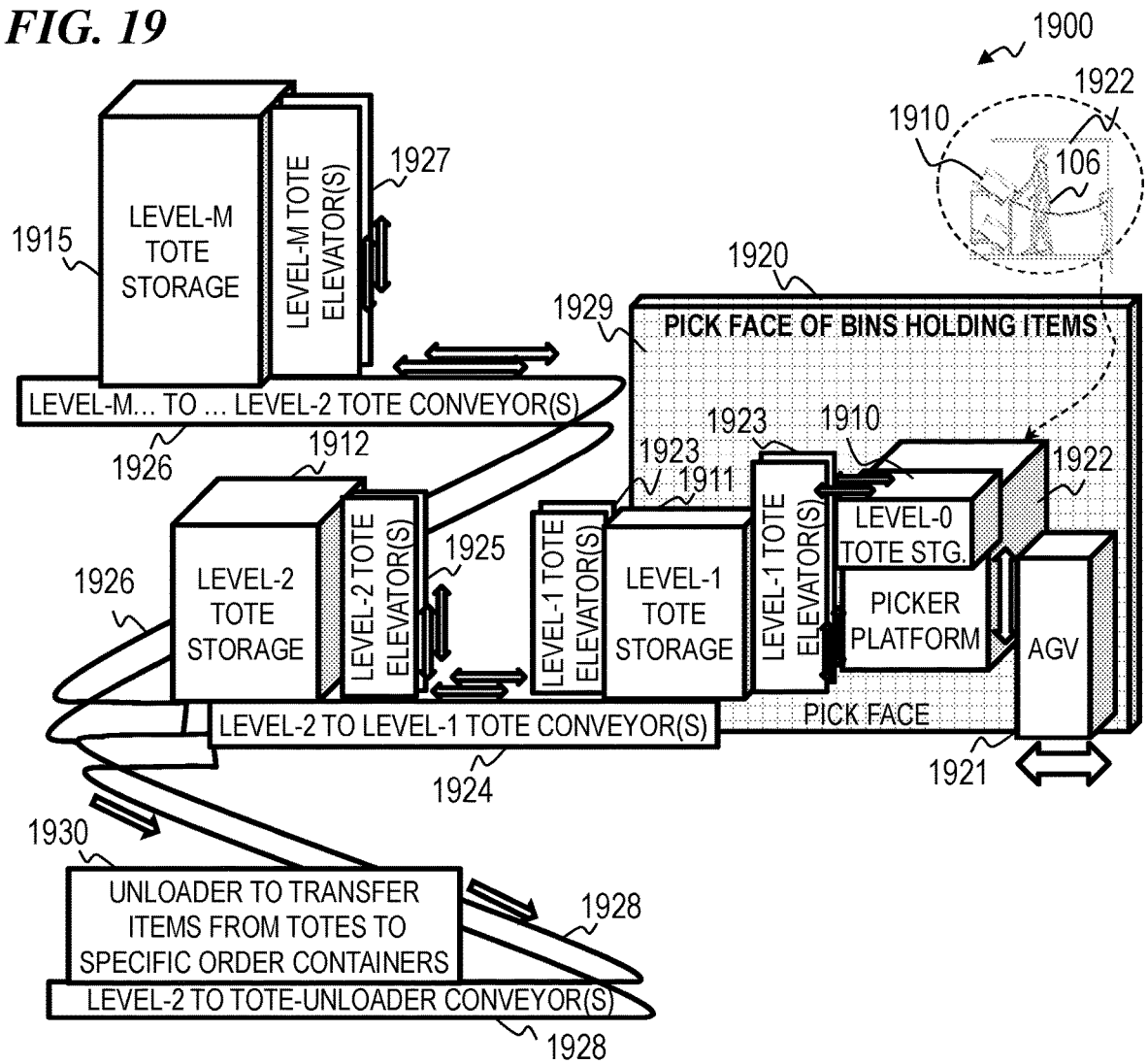
FIG. 19 is a block diagram of a system 1900 having a plurality of levels of Tote Storage and a plurality of Conveyance Devices 1921-1928 (that move horizontally and/or vertically) that move Totes between the various levels of Tote Storage 1910-1915 and a Picker Platform 1922 that moves horizontally and vertically across a Pick Face 1929 of an Aisle wall 1920.

FIG. 19 is a block diagram of a system 1900 having a plurality of levels of Tote Storage and a plurality of Conveyance Devices 1923-1928 (that move horizontally and/or vertically) that move Totes between the various levels of Tote Storage 1910-1915 and a Picker Platform 1922 that moves horizontally and vertically (i.e., with two degrees of freedom) across a Pick Face 1929 of an Aisle wall 1920, according to some embodiments of the present invention. In some embodiments, system 1900 includes Picker Platform 1922 mounted to an Automated Guided Vehicle (AGV) 1921, which moves horizontally (i.e., with one degree of freedom) across Pick Face 1929 of Aisle wall 1920, and which also moves the Picker Platform 1922 vertically across Pick Face 1929 of Aisle wall 1920 such that a Picker (either a human or an automatic mechanical device) picks Items from the Bins of the Aisle wall 1920 and places the picked Items into selected Totes presented to the Picker in the Level-0 Tote Storage 1910. In some embodiments, system 1900 moves "receiving" Totes that receive picked Items to Level-0 Tote Storage 1910 such that the receiving Totes are presented at Level-0 Tote Storage 1910 at times and locations relative to the Pick Face 1929 such that the Picker has little or no delay caused by Totes not being in place when a Pick Action needs to occur. In some embodiments, system 1900 also moves "Replenishment" Totes (to Level-0 Tote Storage 1910) that each present a plurality of Items for the Picker to place back into the Bins to replenish Items to be later picked into receiving Totes. In some embodiments, system 1900 includes a plurality of Conveyance Devices (such as a plurality of Vertical Elevators 1923 that move Totes from Level-1 Tote Storage 1911 (and/or directly from horizontal conveyor(s) 1924) to Level-0 Tote Storage 1910 in time to be available to immediately receive picked Items as the Items are picked. Because of the limited space for Totes in Level-0 Tote Storage 1910 for immediate use, a larger number of Totes are stored in Level-1 Tote Storage 1911 located immediately next to the Picker Platform 1922 such that the time needed to move Totes from Level-1 Tote Storage 1911 to Level-0 Tote Storage 1910 is minimized. In some embodiments, Totes are moved from Level-0 Tote Storage 1910 for short-term storage in Level-1 Tote Storage 1911, and then are moved back to Level-0 Tote Storage 1910 once other Totes, with freshly picked Items, are moved from Level-0 Tote Storage 1910 to Level-1 Tote Storage 1911, wherein the Totes are recirculated between Level-0 Tote Storage 1910 and Level-1 Tote Storage 1911 as long as those Totes are again needed for additional picks. As soon as those Totes are not scheduled to receive more picks for a larger amount of time, the Totes are temporarily moved to Level-2 Tote Storage 1912 (which, in some embodiments, is at a fixed location within the aisle (i.e., with zero degrees of freedom)) to later be recirculated between Level-2 Tote Storage 1912 and Level-1 Tote Storage 1911 when those Totes are again soon to be needed at Level-0 Tote Storage 1910. In some embodiments, a plurality of vertical elevators 1925 is used to move Totes between horizontal conveyor 1924 (and/or horizontal conveyor 1926 and/or horizontal conveyor 1928) and Level-2 Tote Storage 1912. When each given Tote has that Tote's complete inventory of Items for that given Tote (now a "completed" pick Tote), then that completed pick Tote is moved from Level-2 Tote Storage 1912 (and/or directly from horizontal conveyor(s) 1924) via Conveyance Device 1928 (e.g., in some embodiments, a horizontal conveyor) to an unloader location at which Items for each selected Order are removed (e.g., in some embodiments, by an Order-completion Picker person or machine) from one or more completed pick Totes and placed into a specific Order container for that selected Order. In some embodiments, one or more additional high-numbered level of Tote Storage (e.g., Level-M Tote Storage 1915) are provided to provide storage for a larger number of Totes than held by Level-2 Tote Storage 1912, and Totes are moved to and from Level-M Tote Storage Tote Storage 1915 from and to Level-2 Tote Storage 1912 by one or more Conveyance Devices (such as Level-M Tote Storage Tote elevators 1927, horizontal conveyor(s) 1926, and Level-2 Tote Storage Tote elevators 1925) so that additional Totes are available at a somewhat longer distance and time from the Picker 106 who is picking Items and placing those picked Items into Totes at Level-0 Tote Storage 1910 located on or at Picker Platform 1922. Note, FIG. 19 is somewhat folded due to space limitations, and the diagonal connections represent a perspective view of horizontal conveyors of some embodiments.

Figure 20:
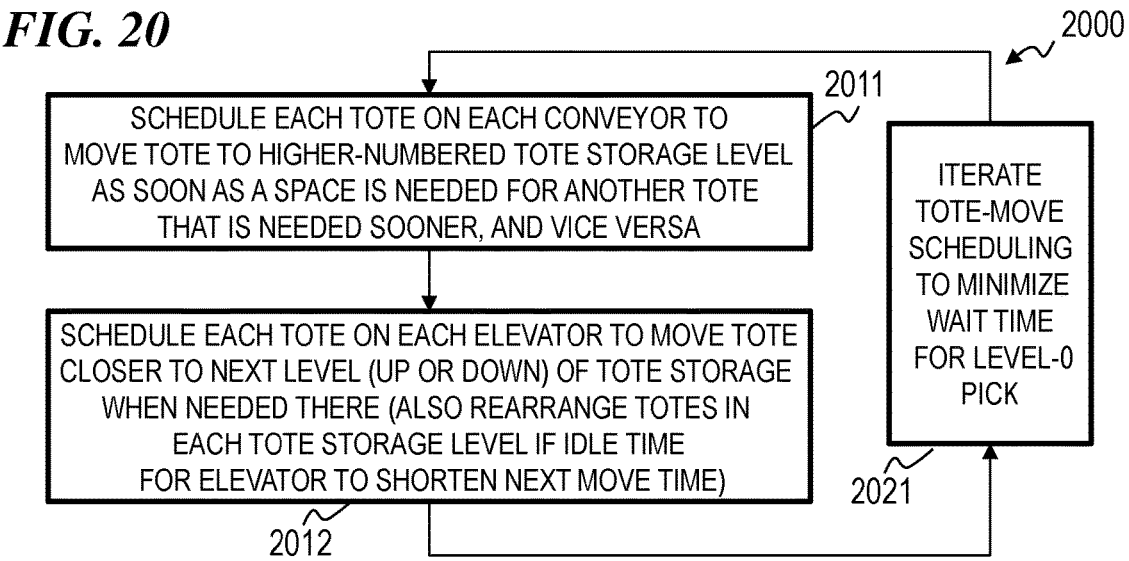
FIG. 20 is a flowchart of a method 2000 for moving Totes between the various levels of Tote Storage and a Picker Platform that moves horizontally and vertically across a Pick Face.

FIG. 20 is a flowchart of a method 2000 for moving Totes between the various levels of Tote Storage and a Picker Platform that moves horizontally and vertically across a Pick Face of an Aisle wall, according to some embodiments of the present invention. In some embodiments, method 2000 includes software 2011 that schedules each respective Tote to move on one of the various Conveyance Devices (elevators and/or conveyors) such that Totes that have received picked Items are conveyed to higher-numbered levels of Tote Storage when space at a lower-numbered level of Tote Storage is needed for a different Tote that is needed sooner for receiving additional picked Items than the Totes being moved to higher-numbered levels of Tote Storage. Similarly, in some embodiments, method 2000 includes software 2012 that schedules each respective Tote to move on one of the various Conveyance Devices such that Totes that have received picked Items are conveyed to higher-numbered levels of Tote Storage (or further away and placed again on the same level of storage) when space at a lower-numbered level of Tote Storage is needed for a different Tote that is needed sooner for receiving additional picked Items than the Totes being moved to higher-numbered levels of Tote Storage. In some embodiments, software 2021 iterates through various different possible Tote movements of software 2011 and/or 2012 in order to iteratively improve performance (e.g., by minimizing time delays observed by Picker 106 who might be waiting for the Tote needed to receive each pick.

Figure 21:
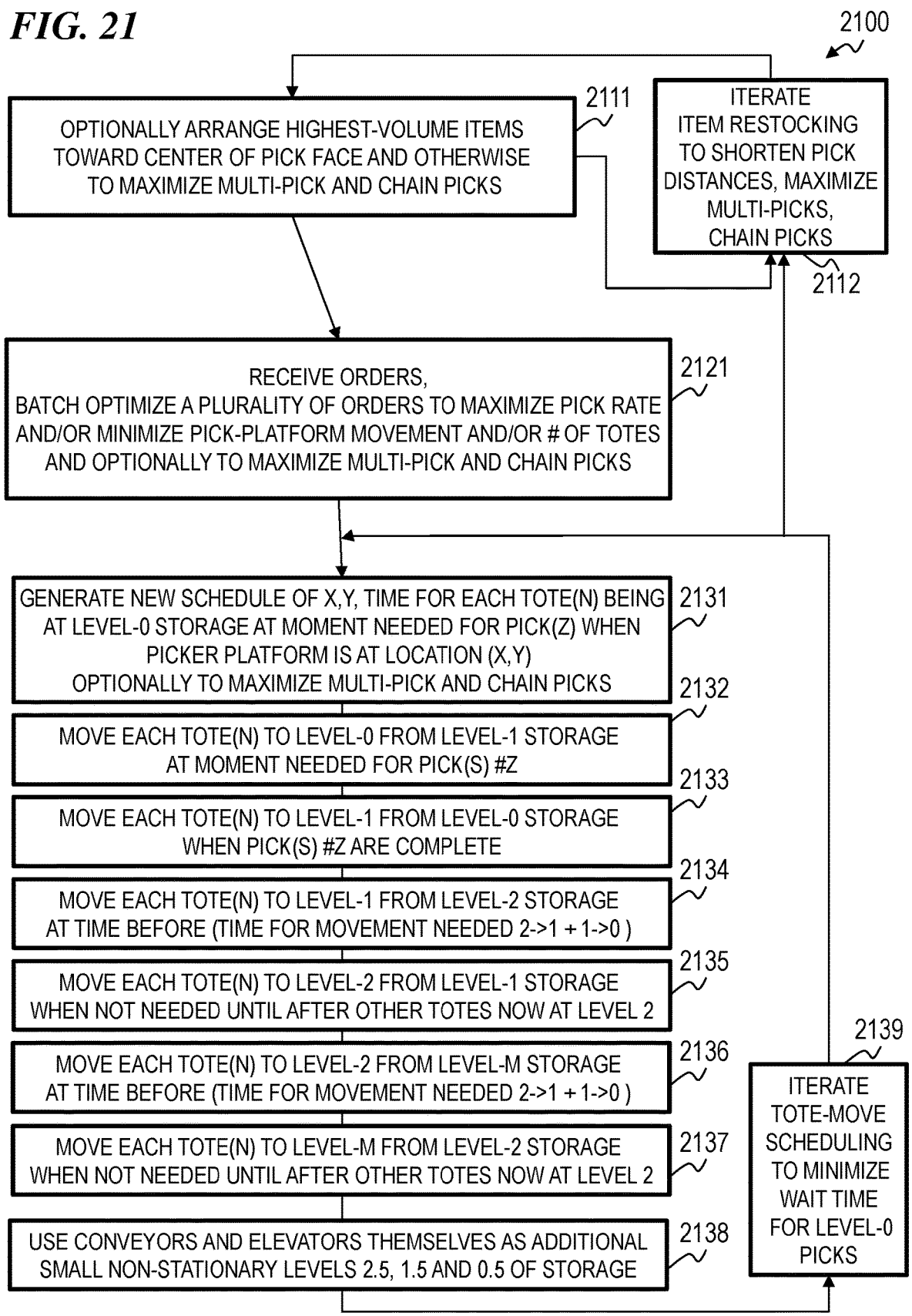
FIG. 21 is a flowchart of a method 2100 for moving Totes between the various levels of Tote Storage and a Picker Platform that moves horizontally and vertically across a Pick Face.

FIG. 21 is a flowchart of a method 2100 (used in addition to, or in place of, method 2000) for moving Totes between the various levels of Tote Storage and a Picker Platform that moves horizontally and vertically across a Pick Face of an Aisle, according to some embodiments of the present invention. In some embodiments, software at block 2112 and block 2111 is occasionally re-executed in an iterative fashion using Item Velocity information (which may change over a period of time) and optionally other information in order to re-arrange Bins of Items on the Pick Face of an Aisle Wall in order to shorten the route (i.e., the series of X, Y positions taken by the Picker Platform) and/or to optimize Pick Rate. In some embodiments, method 2100 includes software 2121 that receives a plurality of Orders for Items to be picked and delivered to customers, wherein software 2121 groups subsets of those Orders into Batches that optimize the Sequence of picks in order to maximize Pick Rates (the number of picks per unit time) and/or minimize Picker Platform movement and/or the number of Totes and optionally to maximize Multi-Picks and Chain Picks. In some embodiments, a plurality of pieces of software (e.g., in some embodiments, subroutines) 2131-2139 are iteratively executed to determine Tote movements between the various levels of Tote Storage in order to minimize any wait time for the Picker 106 when a pick is made and a Tote is needed to receive the picked Item. In some embodiments, block 2131 represents software that generates a new schedule of X,Y,T where T is a different time (i.e., (X,Y,T1), (X,Y,T2) . . . (X,Y,Tn)) for each Tote(N) being at Level-0 Tote Storage at the moment when Tote(N) is needed for pick(Z) while the Picker Platform is at location (X,Y), all to optionally maximize Multi-Picks (wherein a plurality of Items having the same Stock-Keeping-Unit (SKU) identifier are picked from a single Bin simultaneously (or nearly so) and placed into one Tote) and Chain Picks (wherein a plurality of Items having the different Stock-Keeping-Unit (SKU) identifiers are picked nearly simultaneously from adjacent (or nearly adjacent) Bins and placed into one Tote). In some embodiments, block 2132 represents software that moves each Tote(N) to Level-0 Tote Storage from Level-1 Tote Storage (or directly from a horizontal conveyor 1924—see FIG. 19) at the moment in time needed for pick(s) #Z (the number-Z pick(s) that go into a given Tote). In some embodiments, block 2133 represents software that moves each Tote(N) to Level-1 Tote Storage from Level-0 Tote Storage when pick(s) #Z are complete (or directly to horizontal conveyor 1924—see FIG. 19) at the moment in time when pick(s) #Z are complete for a given Tote). In some embodiments, block 2134 represents software that moves each Tote(N) to Level-1 Tote Storage from Level-2 Tote Storage at time before the time for movement needed for moving Tote from Level-2 Tote Storage to Level-1 Tote Storage, plus time for moving Tote from Level-1 Tote Storage to Level-0 Tote Storage. In some embodiments, block 2135 represents software that moves each Tote(N) to Level-2 Tote Storage from Level-1 Tote Storage when that respective Tote is not needed until after other Totes now at Level-2 Tote Storage that are needed to be moved to Level-1 Tote Storage. In some embodiments, block 2136 represents software that moves each Tote(N) to Level-2 Tote Storage from Level-M Tote Storage at time before the time for movement needed for moving Tote 107 from Level-M Tote Storage (possibly temporarily stored at Level-2 Tote Storage on the way) to Level-1 Tote Storage, plus time for moving Tote from Level-1 Tote Storage to Level-0 Tote Storage. In some embodiments, block 2137 represents software that moves each Tote(N) to Level-M Tote Storage from Level-2 Tote Storage when that respective Tote is not needed until after other Totes now at Level-M Tote Storage Tote Storage that are needed to be moved to Level-1 Tote Storage. In some embodiments, block 2138 represents software that uses the Conveyance Devices (conveyors and/or elevators) themselves as temporary Storage holding Totes at moving locations between the various other levels of Tote Storage in which Totes are recirculating between the levels (i.e., Level-0 Tote Storage, Level-1 Tote Storage, Level-2 Tote Storage and/or Level-M Tote Storage) and/or within the other levels of Tote Storage.

Other embodiments include the option of Multi-Level Tote Storage where the Conveyance Device is only a Vertical Elevator. Depending on the Pick Rate/Performance required, other embodiments might include only two different Levels of Tote Storage, or four or more levels, as opposed to the three levels discussed in the previous embodiments. Having only two different levels of Tote Storage in any given embodiment, it would then be possible to take any two-value permutations of the three levels as other possibilities for embodiments. Other embodiments include more than two types of Conveyance Devices. It would also be possible for embodiments to include yet another different level of Tote Storage based on the selected types of Conveyance Devices.

In some embodiments it is not necessary to have a Conveyance Device between all the different levels of Tote Storage. As an example, if the Level-1 Tote Storage mechanisms have the ability to store and manipulate (i.e., move, Sequence, etc.) a sufficient number of Totes and at the same time have the ability to transfer Totes to and from any of the possible Level-0 Tote Storage vertical positions, the Conveyance Device between Level-0 Tote Storage and Level-1 Tote Storage can be eliminated. In effect, the ability to transport Totes vertically becomes embedded within the Level-1 Tote Storage.

In some embodiments, each level of Tote Storage is configured to hold, in temporary stationary positions, a plurality of Totes, each of which can then be moved to an adjacent position on a Conveyance Device (e.g., in some embodiments, a Vertical Elevator or conveyer) that then moves the Tote to a different position on the same Tote Storage device (the same level of Tote Storage) or to a different Tote Storage device (a higher-level or lower-level Tote Storage device).

In some embodiments, each Conveyance Device is configured to hold a plurality of Totes that are in moving positions of the Conveyance Device (e.g., a horizontal conveyer or a Vertical Elevator), wherein the totes can be re-sequenced on the conveyer by moving a Tote across to another position on the same or another Conveyance Device, or temporarily side-tracked to a Tote-Storage device such that a later-sequenced Tote can be moved ahead of the side-tracked Tote which is then re-loaded onto the Conveyance Device in a later-sequenced position.

In the following descriptions of exemplary system and method embodiments, the terms "first," "second," and "third," etc., are used merely as labels, and are not intended to impose numerical requirements on their objects.

In some embodiments, the present invention provides a first system for fulfillment of a plurality of orders including a first order and a second order, the first order specifying a plurality of items including a first item and a second item, the second order specifying a plurality of items including a third item and a fourth item. This system includes: a plurality of tote-storage-level devices in a first warehouse aisle of a warehouse that includes one or more additional warehouse aisles; a plurality of tote-conveyance devices operatively coupled to the plurality of tote-storage-level devices to provide movement of a plurality of totes between the plurality of tote-storage-level devices, wherein at least a first tote-conveyance device of the plurality of tote-conveyance devices is configured to move the plurality of totes vertically; and a controller operatively coupled to the plurality of tote-storage-level devices and the plurality of tote-conveyance devices, wherein the controller is configured to control the movement of the plurality of totes between the plurality of tote-storage-level devices to sequence totes into subsets of two or more of the plurality of totes that are presented simultaneously to a picker that aggregates items of at least the first order into at least a first tote of the plurality of totes, whereby tote-wait times are reduced for the picker.

In some embodiments of the first system, the plurality of tote-conveyance devices is configured to move the plurality of totes between the plurality of tote-storage-level devices while the picker aggregates the plurality of items of the first order into the first tote of the plurality of totes.

Some embodiments of the first system further include a picker automated vehicle (PAV) that includes a picker platform and its associated drive mechanism configured to transport and position the picker horizontally and vertically within the first warehouse aisle, wherein the plurality of tote-storage-level devices includes a first tote-storage-level device that presents, to the picker, a plurality of the plurality of totes spaced vertically and horizontally from one another, a second tote-storage-level device that moves totes horizontally on each of a plurality of vertically spaced platforms, wherein the first tote-storage-level device and the second tote-storage-level device are connected to the PAV, and a third tote-storage-level device spaced horizontally from the PAV, and wherein the plurality of tote-conveyance devices includes at least one horizontal conveyor that moves totes between the third tote-storage-level device and the PAV, and at least one vertical elevator located on the PAV.

Some embodiments of the first system further include a picker automated vehicle (PAV) that includes a picker platform and its associated drive mechanism configured to transport and position the picker horizontally and vertically within the first warehouse aisle, wherein the plurality of tote-storage-level devices includes a first tote-storage-level device, a second tote-storage-level device, and a third tote-storage-level device, wherein the plurality of tote-conveyance devices includes a horizontal conveyor and a vertical elevator, wherein the first tote-storage-level device and the second tote-storage-level device are each located on the PAV and coupled to the vertical elevator, and wherein the third tote-storage-level device is located on the horizontal conveyor, and wherein the PAV moves horizontally to a plurality of locations over the horizontal conveyor.

In some embodiments of the first system, the plurality of tote-storage-level devices includes a first tote-storage-level device, and the first tote-storage-level device includes a plurality of tote-storage locations spaced vertically and horizontally relative to one another and facing the picker.

In some embodiments of the first system, each of the plurality of tote-storage-level devices is configured to store at one time or another a first plurality of the plurality of totes, and wherein each of the plurality of tote-storage-level devices and the plurality of tote-conveyance devices is further configured to sequence the first plurality of the plurality of totes in a defined order based on control signals received from the controller.

In some embodiments of the first system, the plurality of tote-storage-level devices includes a first tote-storage-level device, a second tote-storage-level device, and a third tote-storage-level device, and wherein the plurality of tote-conveyance devices includes a first horizontal conveyor and a first vertical elevator, and the first system further includes: a movable picker platform coupled to the first vertical elevator, wherein the movable picker platform contains the first tote-storage-level device, and wherein the first vertical elevator is coupled to the second tote-storage-level device.

In some embodiments of the first system, the plurality of tote-storage-level devices includes a first tote-storage-level device, a second tote-storage-level device, and a third tote-storage-level device, and wherein the plurality of tote-conveyance devices includes a first horizontal conveyor and a first vertical elevator, and the first system further includes: the plurality of totes; an aisle wall of the first warehouse aisle, wherein the aisle wall includes a plurality of bins defining a pick face, wherein each of the plurality of bins contains a plurality of items to be picked and placed into at least the first tote of the plurality of totes; a picker platform, wherein the picker platform is coupled to the first vertical elevator and contains the first tote-storage-level device, wherein the first vertical elevator is coupled to the second tote-storage-level device, wherein the first vertical elevator includes a plurality of tote movers configured to independently move the plurality of totes in vertical directions; and an automated guided vehicle (AGV) operatively coupled to the picker platform, wherein the AGV is configured to move the picker platform to a plurality of horizontal and vertical positions along the aisle wall, wherein the first horizontal conveyor is configured to move totes back and forth between the AGV and the third tote-storage-level device.

Some embodiments of the first system further include an order-consolidation system configured to receive completed totes of the plurality of totes, wherein the order-consolidation system is further configured to remove selected items from the completed totes for each respective order of the plurality of orders and place the selected items into a respective order tote associated with the respective order.

Some embodiments of the first system further include the plurality of totes.

In some embodiments of the first system, each of the plurality of tote-conveyance devices is configured for continued container-movement operation while the picker is performing pick requests, and the plurality of conveyance devices then recirculates the containers between the different levels of the plurality of container storage levels.

Some embodiments of the first system further include a picker automated vehicle (PAV) that includes a picker platform and its associated drive mechanism configured to transport and position the picker horizontally and vertically within an aisle, wherein the plurality of tote-storage-level devices includes a first tote-storage-level device that presents, to the picker, a plurality of the plurality of totes spaced vertically and horizontally from one another, a second tote-storage-level device that moves totes horizontally on each of a plurality of vertically spaced platforms, wherein the first tote-storage-level device and the second tote-storage-level device are connected to the PAV, and a third tote-storage-level device spaced horizontally from the PAV, and wherein the plurality of tote-conveyance devices includes at least one horizontal conveyor that moves totes between the third tote-storage-level device and the PAV, a plurality of vertical elevators located on the PAV, and at least one vertical elevator located on the third tote-storage-level device.

Some embodiments of the first system further include a computer system configured (as shown in FIG. 15) to execute instructions to: (a) in the computer system, assign picker-position locations using placement rules and determine storage level requirements after use; (b) in the computer system, assign representative totes to the picker-position locations; (c) in the computer system, develop NextTote and PassThru assignments using timing rules; (d) in the computer system, iteratively simulate system timing; (e) in the computer system, determine whether there are picker delays based on the simulated system timing, and if there are picker delays then go to (f); (f) in the computer system, determining whether there is a timeout and if there is a timeout then go to (g); (g) in the computer system, control the plurality of conveyance devices using the simulated system timing; else if there is no timeout then go to (h); (h) in the computer system, resolve picker delays using timing adjustment rules and then iteratively return to (d); else if there are no picker delays then go to (i); (i) in the computer system, determine whether Level 1 is minimized and if Level 1 is minimized then go to (g); else if Level 1 is not minimized then going to (j); (j) in the computer system, minimize Level 1 Storage using reduction rules and return to (d).

In some embodiments of the first system, the plurality of tote-storage-level devices includes a first tote-storage-level device, a second tote-storage-level device, and a third tote-storage-level device, and wherein the plurality of tote-conveyance devices includes a first horizontal conveyor and a first vertical elevator, and the first system further includes: the plurality of totes; an aisle wall of the first warehouse aisle, wherein the aisle wall includes a plurality of bins facing a pick face, wherein each of the plurality of bins contains a plurality of items to be picked and placed into at least the first tote of the plurality of totes; a picker platform, wherein the picker platform is coupled to the first vertical elevator, wherein the picker platform contains the first tote-storage-level device that remains in a fixed spatial relationship relative to the picker platform, wherein the first vertical elevator is coupled to the second tote-storage-level device, wherein the first vertical elevator includes a plurality of tote movers configured to independently move the plurality of totes in vertical directions and to transfer totes between the first tote-storage-level device and the second tote-storage-level device; and an automated guided vehicle (AGV) operatively coupled to the picker platform, wherein the picker platform is configured to move to a plurality of vertical positions relative to the AGV, wherein the AGV operatively coupled to the second tote-storage-level device; wherein the AGV is configured to move to a plurality of horizontal positions along the first warehouse aisle, wherein the first horizontal conveyor is configured to move totes back and forth between the AGV and the third tote-storage-level device while the third tote-storage-level device remains in a fixed location in the first warehouse aisle.

In some embodiments of the first system, the plurality of tote-storage-level devices includes: a first tote-storage-level device, a second tote-storage-level device, and a third tote-storage-level device, and the plurality of tote-conveyance devices includes: a first horizontal conveyor and a second horizontal conveyor that together are configured to move totes back and forth between the second tote-storage-level device and the third tote-storage-level device; and a first vertical elevator and a second vertical elevator that together are configured to move totes back and forth between the first tote-storage-level device and the second tote-storage-level device, and the first tote-storage-level device is configured to present at least four totes of the plurality of totes simultaneously facing the picker and spaced both horizontally and vertically from one another.

In some embodiments of the first system, the plurality of tote-storage-level devices includes: a first tote-storage-level device, a second tote-storage-level device, wherein the second tote-storage-level device includes a first intra-tote-storage-level horizontal conveyor and a second intra-tote-storage-level horizontal conveyor that together are configured to move and re-sequence totes within the second tote-storage-level device, and a third tote-storage-level device; and the plurality of tote-conveyance devices includes a first inter-tote-storage-level horizontal conveyor and a second inter-tote-storage-level horizontal conveyor that together are configured to move totes back and forth between the second tote-storage-level device and the third tote-storage-level device, and a first inter-tote-storage-level vertical elevator and a second inter-tote-storage-level vertical elevator that together are configured to move totes back and forth between the first tote-storage-level device and the second tote-storage-level device.

In some embodiments of the first system, the plurality of tote-storage-level devices includes: a first tote-storage-level device, a second tote-storage-level device, and a third tote-storage-level device, wherein the third tote-storage-level device includes a first intra-tote-storage-level vertical elevator configured to move and re-sequence totes within the third tote-storage-level device, wherein the plurality of tote-conveyance devices includes a first inter-tote-storage-level horizontal conveyor and a second inter-tote-storage-level horizontal conveyor that together are configured to move totes back and forth between the second tote-storage-level device and the third tote-storage-level device, and a first inter-tote-storage-level vertical elevator and a second inter-tote-storage-level vertical elevator that together are configured to move totes back and forth between the first tote-storage-level device and the second tote-storage-level device.

In some embodiments of the first system, the plurality of tote-storage-level devices includes: a first tote-storage-level device, a second tote-storage-level device, wherein the second tote-storage-level device includes a first intra-tote-storage-level horizontal conveyor and a second intra-tote-storage-level horizontal conveyor that together are configured to move and re-sequence totes within the second tote-storage-level device, and a third tote-storage-level device, wherein the third tote-storage-level device includes a first intra-tote-storage-level vertical elevator configured to move and re-sequence totes within the third tote-storage-level device, wherein the plurality of tote-conveyance devices includes: a first inter-tote-storage-level horizontal conveyor and a second inter-tote-storage-level horizontal conveyor that together are configured to move totes back and forth between the second tote-storage-level device and the third tote-storage-level device, and a first inter-tote-storage-level vertical elevator and a second inter-tote-storage-level vertical elevator that together are configured to move totes back and forth between the first tote-storage-level device and the second tote-storage-level device.

In some embodiments of the first system, the plurality of tote-storage-level devices includes: a first tote-storage-level device, a second tote-storage-level device, wherein the second tote-storage-level device includes a first intra-tote-storage-level horizontal conveyor and a second intra-tote-storage-level horizontal conveyor both at a first vertical height that together are configured to move and re-sequence totes within the second tote-storage-level device, and a third intra-tote-storage-level horizontal conveyor and a fourth intra-tote-storage-level horizontal conveyor both at a second vertical height that together are also configured to move and re-sequence totes within the second tote-storage-level device, and wherein the plurality of tote-conveyance devices includes: a first inter-tote-storage-level horizontal conveyor and a second inter-tote-storage-level horizontal conveyor that together are configured to move totes back and forth between the second tote-storage-level device and the third tote-storage-level device; and a first inter-tote-storage-level vertical elevator and a second inter-tote-storage-level vertical elevator that together are configured to move totes back and forth between the first tote-storage-level device and the second tote-storage-level device.

In some embodiments of the first system, the plurality of tote-storage-level devices includes: a first tote-storage-level device, a second tote-storage-level device, wherein the second tote-storage-level device includes a first intra-tote-storage-level horizontal conveyor and a second intra-tote-storage-level horizontal conveyor both at a first vertical height that together are configured to move and re-sequence totes within the second tote-storage-level device, and a third intra-tote-storage-level horizontal conveyor and a fourth intra-tote-storage-level horizontal conveyor both at a second vertical height that together are also configured to move and re-sequence totes within the second tote-storage-level device, and a third tote-storage-level device, wherein the third tote-storage-level device includes a first intra-tote-storage-level vertical elevator configured to move and re-sequence totes within the third tote-storage-level device, and wherein the plurality of tote-conveyance devices includes: a first inter-tote-storage-level horizontal conveyor and a second inter-tote-storage-level horizontal conveyor that together are configured to move totes back and forth between the second tote-storage-level device and the third tote-storage-level device; and a first inter-tote-storage-level vertical elevator and a second inter-tote-storage-level vertical elevator that together are configured to move totes back and forth between the first tote-storage-level device and the second tote-storage-level device.

In some embodiments, the present invention provides a second system that includes a plurality of container-Storage levels (in some embodiments, these are Tote-storage devices) interconnected by and separate from a plurality of Conveyance Devices, at least one of which moves containers vertically, wherein the containers are then used to aggregate all the Items contained in an Order by a Picker and where the Conveyance Devices have the ability for continued Tote-movement operation while the Picker is performing Pick Requests, wherein the plurality of Conveyance Devices then recirculates containers between the different levels of container Storage, and wherein each Tote movement is performed at a specific time and to a specific location based on a computer-controlled algorithm that iteratively simulates different Tote movements and storage locations to which minimizes Tote-wait times incurred when picks are being performed.

In some embodiments of the second system, there are three levels of container Storage interconnected and/or intraconnected by Conveyance Devices that move containers, such as one or more horizontal Conveyer and one or more Vertical Elevators. In some embodiments, the containers are item holders other than totes. In some embodiments, the containers are Totes that are moved by one or more interconnection conveyance device between one Level of Tote Storage and another Level of Tote Storage in order to re-sequence the positions and thus the relative distances (i.e., how far in space and time to the (X,Y,T) coordinate of the Picker Platform's Level-0 Tote Storage at which a particular Tote will be needed) of each Tote from where that Tote currently is to the Level 0 (X,Y,T) coordinate within reach of the Picker when that Totes is needed. In some embodiments, Totes are moved by one or more intraconnection conveyance device from one position to another position within a particular Level of Tote Storage (i.e., intraconnected movement) in order to obtain an improved sequence and timing of Tote delivery to Level-0 Tote Storage with reach of the Picker.

In some embodiments of the second system, Level-0 and Level-1 container Storage are connected to one another by the Vertical Conveyor/Elevator and the Level-2 container Storage is connected to the Level-0 and Level-1 container Storage by the horizontal Conveyor. In some such embodiments, Level-0 container Storage contains a plurality of container Storage locations connected to each Conveyance Device (e.g., in some embodiments, to one or more Vertical Elevators) to which the Level-0 container Storage is connected. In other such embodiments, the apparatus contains a plurality of Level-1 container Storage units where each Level-1 container Storage is configured to store a plurality of containers and Sequence the containers in a predefined order selected by or based on the computer-controlled algorithm. In other embodiments, the Level-2 container Storage is configured to store a plurality of containers and Sequence the containers in a predefined order based on the computer-controlled algorithm.

Some embodiments of the second system further include a movable Picker Platform that contains Level-0 container Storage and that is connected to the Vertical Elevator, wherein the Vertical Elevator is connected to Level 1 container Storage.

Some embodiments of the second system further include: an Automated Guided Vehicle (AGV) connected to a Picker Platform that contains the Level-0 container Storage and that is connected to the Vertical Elevator, wherein the Vertical Elevator is connected to Level-1 container Storage, wherein the Vertical Elevator includes a plurality of Tote movers that independently move Totes in vertical directions, and wherein the AGV moves the Picker Platform to a plurality of horizontal positions and vertical positions along an Aisle wall having a plurality of Bins each containing a plurality of Items to be picked and placed into the plurality of containers.

Some embodiments of the second system further include an order-consolidation apparatus configured to receive completed containers and for an order consolidator to remove selected Items for each respective ones of the plurality of orders from the completed containers and place the selected items into a respective container associated with the respective order.

In some embodiments of the second system, the containers are Totes.

In some embodiments, the present invention provides a first method for picking Items for each of a plurality of Orders. This method includes: providing a plurality of levels of container Storage interconnected by and separate from a plurality of Conveyance Devices; using the containers to aggregate all the Items contained in an Order by a Picker; continuing container-movement operation of the Conveyance Devices while the Picker is performing Pick Requests; and recirculating containers between the plurality of levels of container Storage at specific times and to specific Storage and pick locations based on a computer-controlled algorithm that iteratively simulates different Tote movements and Storage locations to minimize Tote-wait times incurred when picks are being performed.

In some embodiments of the first method, the plurality of levels of container Storage include a Level-0 container storage, a Level-1 container storage, and a Level-2 container storage interconnected by one or more horizontal conveyers and one or more Vertical Elevators.

In some embodiments of the first method, the Level-0 container Storage and the Level-1 container Storage are each connected to a Vertical Elevator and the Level-2 container Storage is connected to a horizontal conveyor that connects the Level-1 container Storage to the Level-2 container Storage. These embodiments of the first method further includes: vertically moving a respective container to the Level-0 container Storage from the Level-1 container Storage at a time needed for picking to the respective container; vertically moving the respective container to the horizontal conveyor from Level-0 container Storage at a time after a required number of Items has been for picked and placed to the respective container; and horizontally moving the respective container on the horizontal conveyor from the Vertical Elevator after a required number of Items has been for picked and placed to the respective container.

In some embodiments of the first method, Level-0 container Storage contains a plurality of container Storage locations connected to each Vertical Elevator to which the Level-0 container Storage is connected.

In some embodiments of the first method, the providing includes providing a plurality of Level-1 container Storage units where each Level-1 container Storage unit is configured to store a plurality of containers and Sequence the containers in a predefined order based on the computer-controlled algorithm.

In some embodiments of the first method, the Level-2 container Storage is configured to store a plurality of containers and Sequence the containers in a predefined order based on the computer-controlled algorithm.

Some embodiments of the first method further include providing a movable Picker Platform that contains Level-0 storage and that is connected to the Vertical Elevator, wherein the Vertical Elevator is connected to Level-1 container storage; automatically moving the Picker Platform to a sequential plurality of vertical and horizontal locations; and automatically moving a sequence of Totes to the sequential plurality of vertical and horizontal locations at times scheduled to make each respective Tote available at a moment when the respective Tote is needed in order to receive a picked Item.

In some embodiments of the first method, the containers are Totes, and the method further includes: providing an Automated Guided Vehicle (AGV); connecting the AGV to a Picker Platform that contains the Level-0 storage; connecting the Level-0 storage to the Vertical Elevator; connecting the Vertical Elevator to Level-1 container Storage; using the Vertical Elevator to independently move Totes in vertical directions; moving the Picker Platform, by the AGV, to a plurality of horizontal positions and vertical positions along an Aisle wall having a plurality of Bins each containing a plurality of Items to be picked and placed into the plurality of containers.

Some embodiments of the first method further include receiving completed containers at an order-consolidation area having an order consolidator; removing, by the order consolidator, selected Items for each respective ones of the plurality of orders from the completed containers; and placing the selected items into a respective container associated with the respective order In some embodiments of the first method, the containers are Totes.

In some embodiments, the present invention provides a third system that includes: a Picker Platform configured to accommodate a Picker that picks Items from a Pick Face having a plurality of Bins each containing a plurality of Items to place the picked Items into selected ones of a plurality of containers, wherein each of the plurality of containers is used to aggregate a subset of all Items specified in a plurality of Orders by the Picker; a plurality of container-storage devices including: a Level-0 container-storage device located at the Picker Platform, the Level-0 container-storage device having a first number of container locations configured to present to the Picker, at selected times and locations, selected ones of a plurality of containers so that the Picker places picked Items from the Bins of the Pick Face into the selected ones of the plurality of containers, a Level-1 container-storage device that remains located adjacent to the Picker Platform as the Picker Platform moves, the Level-1 container-storage device having a second number of container locations, the second number being larger than the first number, and a Level-2 container-storage device located at a variable distance from the Picker Platform, the Level-2 container-storage device having a third number of container locations, the third second number being larger than the second number; a plurality of Conveyance Devices configured to autonomously move containers between ones of the plurality of container-storage devices; and a controller operatively coupled to the Picker Platform and the plurality of Conveyance Devices and configured to control horizontal and vertical movement of the Picker Platform to selected horizontal and vertical positions relative to the Pick Face, and to control the plurality of Conveyance Devices to move of selected ones of the plurality of containers into and out of selected ones of the plurality of container-storage devices while the Picker is performing Pick Requests in order to minimize wait time incurred by the Picker for any respective selected container to arrive to receive picked Items specified by the controller to be picked and placed into the respective selected container, and wherein one or more of the plurality of Conveyance Devices then recirculates at least some of the plurality of containers between different levels of the plurality of container-storage devices. In some embodiments, each of the plurality of containers is a Tote.

In some embodiments of the third system, each of the pick Aisles is narrow to obtain more items in a warehouse, thus the Level-0 tote storage on the Picker Platform is constrained to be narrow (to fit in the Aisle) and relatively short (to be in reach of the Picker on the Picker Platform), wherein the Picker Platform moves horizontally along the Aisle and vertically up and down the two Pick Faces of bins on both sides of its Aisle, the Level-1 storage is narrow and tall (up to the height of the Pick Face, so it holds more Totes than Level-0 storage), and Level-1 storage moves in one dimension (horizontal only) along with the Picker Platform that moves horizontally along the Aisle (and vertically along the Pick Face, and thus also vertically relative to various locations on Level-1 storage, and Level-2 storage, which is in a fixed location (optionally outside the Aisle at an end of the Aisle(s)) holds even more Totes. In some embodiments, the number and dimensions of horizontal conveyors that convey Totes between the Level-1 storage and the Level-2 storage are also constrained by the narrow aisles.

In some embodiments, the present invention provides a fourth system that includes a plurality of container Storage levels interconnected by and separate from a plurality of Conveyance Devices, at least one of which moves containers vertically, where the containers are then used to aggregate all the Items contained in an Order by a Picker and where the Conveyance Device(s) have the ability for continued container-movement operation while the Picker is performing Pick Requests, wherein the plurality of Conveyance Devices then recirculates the containers between the different levels of container Storage, and wherein each container movement is performed at a specific time and to a specific location based on a computer-controlled algorithm which minimizes container-wait times incurred when picks are being performed.

In some embodiments of the fourth system, there are three levels of container Storage interconnected by a horizontal Conveyer and a Vertical Elevator. In some embodiments, Level-0 and Level-1 container Storage are on the Vertical Conveyor/Elevator and the Level-2 container Storage is on the horizontal Conveyor. In some embodiments, Level-0 container Storage contains a plurality of container Storage locations connected to each Conveyance Device to which the Level-0 container Storage is connected. In some embodiments, the apparatus contains a plurality of Level-1 container Storage units where the Level-1 container Storage can store a plurality of containers and Sequence the containers in a predefined order based on the computer-controlled algorithm. In some embodiments, the Level-2 container Storage is configured to store a plurality of containers and Sequence the containers in a predefined order based on the computer-controlled algorithm.

In some embodiments, the fourth system further includes a movable Picker Platform that contains Level-0 Storage and that is connected to the Vertical Elevator, wherein the Vertical Elevator is connected to Level-1 container Storage.

In some embodiments, the fourth system further includes an Automated Guided Vehicle (AGV) operatively connected to a Picker Platform, wherein the picker platform contains the Level-0 container Storage and is connected to the Vertical Elevator, wherein the Vertical Elevator is connected to Level-1 container Storage, wherein the Vertical Elevator includes a plurality of container movers that independently move containers in vertical directions, and wherein the AGV moves the Picker Platform to a plurality of horizontal positions and vertical positions along an Aisle wall having a plurality of Bins each containing a plurality of Items to be picked and placed into the plurality of containers.

In some embodiments, the fourth system further includes an order-consolidation apparatus configured to receive completed containers and for an order consolidator to remove selected Items for each respective ones of the plurality of orders from the completed containers and place the selected items into a respective container associated with the respective order. In some embodiments, the containers are Totes.

In some embodiments, the present invention provides a second method for picking Items for each of a plurality of Orders, the method including providing a plurality of levels of container Storage interconnected by and separate from a plurality of Conveyance Devices; using the containers to aggregate all the Items contained in an Order by a Picker; continuing container-movement operation of the Conveyance Devices while the Picker is performing Pick Requests; and recirculating containers between the plurality of levels of container Storage at specific times and to specific Storage and pick locations based on a computer-controlled algorithm that iteratively simulates different container movements and Storage locations to minimize container-wait times incurred when picks are being performed.

In some embodiments of the second method, the plurality of levels of container Storage include a Level-0 container storage, a Level-1 container storage, and a Level-2 container storage interconnected by one or more horizontal conveyers and one or more Vertical Elevators. In some embodiments, the Level-0 container Storage and the Level-1 container Storage are each connected to a Vertical Elevator and the Level-2 container Storage is connected to a horizontal conveyor that connects the Level-1 container Storage to the Level-2 container Storage, the method further including: vertically moving a respective container to the Level-0 container Storage from the Level-1 container Storage at a time needed for picking to the respective container; vertically moving the respective container to the horizontal conveyor from Level-0 container Storage at a time after a required number of Items has been for picked and placed to the respective container; and horizontally moving the respective container on the horizontal conveyor from the Vertical Elevator after a required number of Items has been for picked and placed to the respective container. In some embodiments, Level-0 container Storage contains a plurality of container Storage locations connected to each Vertical Elevator to which the Level-0 container Storage is connected. In some embodiments, the providing includes providing a plurality of Level-1 container Storage units where each Level-1 container Storage unit is configured to store a plurality of containers and Sequence the containers in a predefined order based on the computer-controlled algorithm. In some embodiments, the Level-2 container Storage is configured to store a plurality of containers and Sequence the containers in a predefined order based on the computer-controlled algorithm.

In some embodiments of the second method, the containers are Totes, the method further including: providing a movable Picker Platform that contains Level-0 storage and that is connected to the Vertical Elevator, wherein the Vertical Elevator is connected to Level-1 container storage; automatically moving the Picker Platform to a sequential plurality of vertical and horizontal locations; and automatically moving a sequence of Totes to the sequential plurality of vertical and horizontal locations at times scheduled to make each respective Tote available at a moment when the respective Tote is needed in order to receive a picked Item.

In some embodiments of the second method, the containers are Totes, the method further including: providing an Automated Guided Vehicle (AGV); connecting the AGV to a Picker Platform that contains the Level-0 storage; connecting the Level-0 storage to the Vertical Elevator; connecting the Vertical Elevator to Level-1 container Storage; using the Vertical Elevator to independently move Totes in vertical directions; moving the Picker Platform, by the AGV, to a plurality of horizontal positions and vertical positions along an Aisle wall having a plurality of Bins each containing a plurality of Items to be picked and placed into the plurality of containers.

In some embodiments, the second method further includes: receiving completed containers at an order-consolidation area having an order consolidator; removing, by the order consolidator, selected Items for each respective ones of the plurality of orders from the completed containers; and placing the selected items into a respective container associated with the respective order. In some embodiments, the containers are Totes.

In some embodiments, the present invention provides a fifth system that includes a Picker Platform configured to accommodate a Picker that picks Items from a Pick Face having a plurality of Bins each containing a plurality of Items to place the picked Items into selected ones of a plurality of containers, wherein each of the plurality of containers is used to aggregate a subset of all Items specified in a plurality of Orders by the Picker; a plurality of container-storage devices including: a Level-0 container-storage location located at the Picker Platform, the Level-0 container-storage location having a first number of container positions configured to present to the Picker, at selected times and locations, selected ones of a plurality of containers so that the Picker places picked Items from the Bins of the Pick Face into the selected ones of the plurality of containers, a Level-1 container-storage device that remains located adjacent to the Picker Platform as the Picker Platform moves, the Level-1 container-storage device having a second number of container locations, the second number being larger than the first number, and a Level-2 container-storage device located at a variable distance from the Picker Platform, the Level-2 container-storage device having a third number of container locations, the third second number being larger than the second number; a plurality of Conveyance Devices configured to autonomously move containers between ones of the plurality of container-storage devices; and a controller operatively coupled to the Picker Platform and the plurality of Conveyance Devices and configured to control horizontal and vertical movement of the Picker Platform to selected horizontal and vertical positions relative to the Pick Face, and to control the plurality of Conveyance Devices to move of selected ones of the plurality of containers into and out of selected ones of the plurality of container-storage devices while the Picker is performing Pick Requests in order to minimize wait time incurred by the Picker for any respective selected container to arrive to receive picked Items specified by the controller to be picked and placed into the respective selected container, and wherein one or more of the plurality of Conveyance Devices then recirculates at least some of the plurality of containers between different levels of the plurality of container-storage devices.

In some embodiments of the fifth system, each of the plurality of containers is a Tote. In some embodiments, each of the plurality of containers is a Tote, wherein the plurality of Conveyance Devices include: a plurality of Horizontal Conveyor configured to move each respective Tote of the plurality of Totes, in a sequence selected by the controller, to the Level-1 container-storage device from the Level-2 container-storage device at a first selected time interval before each respective Tote is needed to receive a plurality of picked items; and a plurality of Vertical Elevators configured to move each respective Tote of the plurality of Totes, in a sequence selected by the controller, to the Level-0 container-storage device from the Level-1 container-storage device to arrive in the Level-0 container-storage device just before each respective Tote is needed to receive a selected plurality of picked items and to move each respective Tote of the plurality of Totes to the Level-1 container-storage device or to the Level-2 container-storage device from the Level-0 container-storage device just after each respective Tote received the selected plurality of picked items.

In some embodiments, the present invention provides a sixth system for fulfillment of a plurality of orders including a first order, the first order specifying a plurality of items including a first item and a second item, the system including: a plurality of at least three tote-storage levels; a plurality of tote-conveyance devices operatively coupled to the plurality of tote-storage levels to provide movement of a plurality of totes between the plurality of tote-storage levels, wherein at least a first tote-conveyance device of the plurality of tote-conveyance devices is configured to move the plurality of totes vertically; and a controller operatively coupled to the plurality of tote-storage levels and the plurality of tote-conveyance devices, wherein the controller is configured to control the movement of the plurality of totes between the plurality of tote-storage levels whereby tote-wait times are reduced for a picker that aggregates items of at least the first order into at least a first tote of the plurality of totes.

In some embodiments of the sixth system, the plurality of tote-conveyance devices is configured to move the plurality of totes between the plurality of tote-storage levels while the picker aggregates the items of the at least first order into the at least first tote of the plurality of totes.

Some embodiments of the sixth system further include a picker automated vehicle (PAV) that includes a picker platform and its associated drive mechanism configured to transport and position the picker horizontally and vertically within an aisle, wherein the plurality of tote-storage levels includes a first tote-storage level that presents, to the picker, a plurality of the plurality of totes spaced vertically and horizontally from one another, a second tote-storage level that moves totes horizontally on each of a plurality of vertically spaced platforms, wherein the first tote-storage level and the second tote-storage level are connected to the PAV, and a third tote-storage level spaced horizontally from the PAV, and wherein the plurality of tote-conveyance devices includes at least one horizontal conveyor that moves totes between the third tote-storage level and the PAV, at least one vertical elevator located on the PAV, and at least one vertical elevator located on the third tote-storage level.

Some embodiments of the sixth system further include a picker automated vehicle (PAV) that includes a picker platform and its associated drive mechanism configured to transport and position the picker horizontally and vertically within an aisle, wherein the plurality of tote-storage levels includes a first tote-storage level, a second tote-storage level, and a third tote-storage level, wherein the plurality of tote-conveyance devices includes a horizontal conveyor and a vertical elevator, wherein the first tote-storage level and the second tote-storage level are each located on the PAV and coupled to the vertical elevator, and wherein the third tote-storage level is located on the horizontal conveyor, and wherein the PAV moves horizontally to a plurality of locations over the horizontal conveyor.

In some embodiments of the sixth system, the plurality of tote-storage levels includes a first tote-storage level, and wherein the first tote-storage level includes a plurality of tote-storage locations spaced vertically and horizontally relative to one another and facing the picker.

In some embodiments of the sixth system, each of the plurality of tote-storage levels is configured to store at one time or another a first plurality of the plurality of totes, and wherein each of the plurality of tote-storage levels and the plurality of tote-conveyance devices is further configured to sequence the first plurality of the plurality of totes in a predefined order based on control signals received from the controller.

In some embodiments of the sixth system, the plurality of tote-storage levels includes a first tote-storage level, a second tote-storage level, and a third tote-storage level, and wherein the plurality of tote-conveyance devices includes a horizontal conveyor and a vertical elevator. This system further includes a movable picker platform coupled to the vertical elevator, wherein the movable picker platform contains the first tote-storage level, and wherein the vertical elevator is coupled to the second tote-storage level.

In some embodiments of the sixth system, the plurality of tote-storage levels includes a first tote-storage level, a second tote-storage level, and a third tote-storage level, and wherein the plurality of tote-conveyance devices includes a horizontal conveyor and a vertical elevator. This system further includes the plurality of totes; an aisle wall that includes a plurality of bins, wherein each of the plurality of bins contains a plurality of items to be picked and placed into the at least first tote of the plurality of totes; a picker platform, wherein the picker platform is coupled to the vertical elevator and contains the first tote-storage level, wherein the vertical elevator is coupled to the second tote-storage level, wherein the vertical elevator includes a plurality of tote movers configured to independently move the plurality of totes in vertical directions; and an automated guided vehicle (AGV) operatively coupled to the picker platform, wherein the AGV is configured to move the picker platform to a plurality of horizontal and vertical positions along the aisle wall.

Some embodiments of the sixth system further include an order-consolidation system configured to receive completed totes of the plurality of totes, wherein the order-consolidation system is further configured to remove selected items from the completed totes for each respective order of the plurality of orders and place the selected items into a respective order tote associated with the respective order. Some embodiments further include the plurality of totes.

In some embodiments, the present invention provides a third method for fulfilling a plurality of orders including a first order. The method includes: providing a plurality of container-storage levels; providing a plurality of container-conveyance devices; operatively coupling the plurality of container-conveyance devices to the plurality of container-storage levels to provide movement of a plurality of containers between the plurality of container-storage levels; aggregating, using a picker, items of at least the first order into at least a first container of the plurality of containers; and controlling the movement of the plurality of containers between the plurality of container-storage levels, wherein the controlling of the movement of the plurality of containers includes minimizing container-wait times for the picker.

In some embodiments of the third method, the controlling of the movement of the plurality of containers includes moving, using the plurality of container-conveyance devices, the plurality of containers between the plurality of container-storage levels during the aggregating.

In some embodiments of the third method, the plurality of container-storage levels includes a first container-storage level, a second container-storage level, and a third container-storage level, and wherein the plurality of container-conveyance devices includes a horizontal conveyor and a vertical elevator.

In some embodiments of the third method, the plurality of container-storage levels includes a first container-storage level, a second container-storage level, and a third container-storage level, wherein the plurality of container-conveyance devices includes a horizontal conveyor and a vertical elevator, wherein the first container-storage level and the second container-storage level are each located on the vertical elevator, wherein the third container-storage level is located on the horizontal conveyor. This method further includes: vertically moving, using the vertical elevator, a respective container of the plurality of containers from the second container-level storage to the first container-level storage when the respective container is needed for the aggregating; vertically moving, using the vertical elevator, the respective from the first container-level storage to the horizontal conveyor after a required number of items has been picked and placed to the respective container; and horizontally moving, using the horizontal conveyor, the respective container away from the vertical elevator.

In some embodiments of the third method, each container-storage level of the plurality of container-storage levels is configured to store a first plurality of the plurality of containers, and the method further includes sequencing the first plurality of containers in a predefined order.

In some embodiments of the third method, the plurality of container-storage levels includes a first container-storage level, a second container-storage level, and a third container-storage level, and wherein the plurality of container-conveyance devices includes a horizontal conveyor and a vertical elevator. The method further includes: providing a movable picker platform coupled to the vertical elevator, wherein the movable picker platform contains the first container-storage level, and wherein the vertical elevator is coupled to the second container-storage level; automatically moving the picker platform to a sequential plurality of vertical and horizontal locations, wherein the controlling of the movement of the plurality of containers includes: automatically moving a sequence of the plurality of containers to the sequential plurality of vertical and horizontal locations at times scheduled to make each respective container of the plurality of containers available at a moment when the respective container is needed in order to receive a picked item.

In some embodiments of the third method, the plurality of containers includes a plurality of totes, wherein the plurality of container-storage levels includes a first container-storage level, a second container-storage level, and a third container-storage level, and wherein the plurality of container-conveyance devices includes a horizontal conveyor and a vertical elevator. The method further includes: providing an aisle wall that includes a plurality of bins, wherein each of the plurality of bins contains a plurality of items to be picked and placed into the plurality of totes; providing a picker platform, wherein the picker platform includes the first container-storage level; providing an automated guided vehicle (AGV); coupling the AGV to the picker platform; coupling the first container-storage level to the vertical elevator; coupling the vertical elevator to the second container-storage level; independently moving, using the vertical elevator, the plurality of totes in vertical directions; and moving the picker platform, using the AGV, to a plurality of horizontal positions and vertical positions along the aisle wall.

Some embodiments of the third method further include: providing an order-consolidation area having an order consolidator; receiving completed containers at the order-consolidation area; removing, by the order consolidator, selected items for each respective one of a plurality of orders from the completed containers; and placing the selected items into a respective order container associated with the respective order.

In some embodiments, the present invention provides a seventh system for fulfillment of a plurality of orders including a first order, the system including: a plurality of container-storage levels; means for conveying a plurality of containers between the plurality of container-storage levels; means for aggregating items of at least the first order into at least a first container of the plurality of containers; and means for controlling the conveying of the plurality of containers between the plurality of container-storage levels. In some embodiments, each container-storage level of the plurality of container-storage levels includes one or more container-storage devices, and wherein the one or more container-storage devices each include a plurality of container locations.

In some embodiments, the present invention provides a system for fulfillment of a plurality of orders including a first order, the system including: a plurality of container storage levels interconnected by and separate from a plurality of conveyance devices, at least one of which moves containers vertically, wherein the containers are then used to aggregate all the items contained in an order by a picker and where the each of the plurality of conveyance devices is configured for continued container-movement operation while the picker is performing pick requests, wherein the plurality of conveyance devices then recirculates the containers between the different levels of the plurality of container storage levels, and a controller that controls a sequence of container movements such that each container movement is performed at a specific time and to a specific location based on a computer-controlled algorithm that minimizes container-wait times incurred when picks are being performed.

In some embodiments of this seventh system, the plurality of container storage levels includes three levels of container storage interconnected by a horizontal conveyer system and a vertical elevator system.

In some embodiments of this seventh system, the plurality of container storage levels include a level-0 container storage and a level-1 container storage are on the vertical elevator system and a level-2 container storage that is on the horizontal conveyor system, and the system further includes a mechanism configured to transfer containers between the vertical elevator system and the horizontal conveyor system. In some embodiments, the level-0 container storage includes a plurality of container storage locations in an array of locations spaced vertically and horizontally from one another and each connected to the vertical elevator system. In some embodiments, the level-1 container storage includes a plurality of level-1 container storage units each configured to store a plurality of containers and sequence the containers in a controller-defined order to and from the level-0 container storage. In some embodiments, the level-2 container storage is configured to store a plurality of containers and sequence the containers in a controller-defined order based on the computer-controlled algorithm. Some embodiments further include a movable picker platform that contains the level-0 storage and that is connected to the vertical elevator system, wherein the vertical elevator system is connected to the level-1 container storage. Some embodiments further include a picker platform; and an automated guided vehicle (AGV) operatively connected to the picker platform, wherein the picker platform contains the level-0 container storage and is connected to the vertical elevator system, wherein the vertical elevator system is connected to level-1 container storage, wherein the vertical elevator system includes a plurality of container elevators that independently move containers in vertical directions, and wherein the AGV moves the picker platform to a plurality of horizontal positions and vertical positions along an aisle wall having a plurality of bins each containing a plurality of items to be picked and placed into the plurality of containers. In some such embodiments, the system further includes an order-consolidation apparatus configured to receive completed containers and configured for an order consolidator to remove selected items for each respective ones of the plurality of orders from the completed containers and place the selected items into a respective container associated with the respective order. In some embodiments, the containers are totes.

In some embodiments of this seventh system, the plurality of container storage levels include three levels of container storage interconnected by a horizontal conveyer system and a vertical elevator system and wherein the plurality of container storage levels include a level-0 container storage and a level-1 container storage are on the vertical elevator system and a level-2 container storage that is on the horizontal conveyor system, and the system further includes: a mechanism configured to transfer containers between the vertical elevator system and the horizontal conveyor system; a picker platform; an automated guided vehicle (AGV) operatively connected to the picker platform, wherein the picker platform contains the level-0 container storage and is connected to the vertical elevator system, wherein the vertical elevator system is connected to level-1 container storage, wherein the vertical elevator system includes a plurality of container elevators that independently move containers in vertical directions, and wherein the AGV moves the picker platform to a plurality of horizontal positions and vertical positions along an aisle wall having a plurality of bins each containing a plurality of items to be picked and placed into the plurality of containers; and an order-consolidation apparatus configured to receive completed containers and configured for an order consolidator to remove selected items for each respective ones of the plurality of orders from the completed containers and place the selected items into a respective container associated with the respective order. In some embodiments, the containers are totes.

In some embodiments, the present invention provides a fourth method for fulfillment of a plurality of orders including a first order, the method including: providing a plurality of container storage levels interconnected by and separate from a plurality of conveyance devices, at least one of which moves containers vertically, wherein the containers are then used to aggregate all the items contained in an order by a picker and where the each of the plurality of conveyance devices is configured for continued container-movement operation while the picker is performing pick requests, wherein the plurality of conveyance devices then recirculates the containers between the different levels of the plurality of container storage levels, and controlling a sequence of container movements such that each container movement is performed at a specific time and to a specific location based on a computer-controlled algorithm that minimizes container-wait times incurred when picks are being performed.

In some embodiments of the fourth method, the plurality of container storage levels include three levels of container storage, and the method further includes interconnecting the three levels of container storage to one another by a horizontal conveyer system and a vertical elevator system.

In some embodiments of the fourth method, the plurality of container storage levels include a level-0 container storage and a level-1 container storage are on the vertical elevator system and a level-2 container storage that is on the horizontal conveyor system, and the method further includes transferring containers between the vertical elevator system and the horizontal conveyor system. In some such embodiments, the level-0 container storage includes a plurality of container storage locations in an array, and the method further includes spacing the array of locations vertically and horizontally from one another; and connecting each of the locations of the array of locations to the vertical elevator system. In some such embodiments, the level-1 container storage includes a plurality of level-1 container storage units, and the method further includes: storing a plurality of containers on the level-1 container storage units; and sequencing movement of the containers on the level-1 container storage units in a controller-defined order to and from the level-0 container storage. In some such embodiments, the level-2 container storage includes a plurality of level-2 container storage units, and the method further includes: storing a plurality of containers on each of the plurality of level-2 container storage units; and sequencing movement of the containers in a controller-defined order based on the computer-controlled algorithm. Some embodiments further include providing a movable picker platform that contains the level-0 storage; connecting the movable picker platform to the vertical elevator system; and connecting the vertical elevator system to the level-1 container storage. Some embodiments further include: providing a picker platform; providing an automated guided vehicle (AGV); operatively connecting the AGV to the picker platform, wherein the picker platform contains the level-0 container storage; operatively connecting the picker platform to the vertical elevator system; operatively connecting the vertical elevator system to level-1 container storage, wherein the vertical elevator system includes a plurality of container elevators that independently move containers in vertical directions, and wherein the AGV moves the picker platform to a plurality of horizontal positions and vertical positions along an aisle wall having a plurality of bins each containing a plurality of items to be picked and placed into the plurality of containers. In some such embodiments, the method further includes: receiving completed containers; removing selected items for each respective ones of the plurality of orders from the completed containers and placing the selected items into a respective container associated with the respective order. In some embodiments, the containers are totes.

In some embodiments of the fourth method, the plurality of container storage levels include three levels of container storage interconnected by a horizontal conveyer system and a vertical elevator system and wherein the plurality of container storage levels include a level-0 container storage and a level-1 container storage are on the vertical elevator system and a level-2 container storage that is on the horizontal conveyor system, and the method includes: transferring containers between the vertical elevator system and the horizontal conveyor system; providing a picker platform and an automated guided vehicle (AGV) operatively connected to the picker platform, wherein the picker platform contains the level-0 container storage; connecting the picker platform to the vertical elevator system; connecting the vertical elevator system to level-1 container storage, wherein the vertical elevator system includes a plurality of container elevators; independently moving containers in vertical directions with the vertical elevator system; moving the picker platform with the AGV to a plurality of horizontal positions and vertical positions along an aisle wall having a plurality of bins each containing a plurality of items to be picked and placed into the plurality of containers; and receiving completed containers and removing selected items for each respective ones of the plurality of orders from the completed containers and placing the selected items into a respective container associated with the respective order. In some embodiments, the plurality of containers includes totes.

In some embodiments, the present invention provides a fifth method that includes:

(a) in a computer, assigning picker-position locations (PP Locs) using placement rules and determining storage level requirements after use;

(b) in the computer, assigning representative totes (Rep Totes) to PP Locs;
(c) in the computer, developing NextTote and PassThru (NT and PT) assignments using timing rules;
(d) in the computer, iteratively simulating system timing;
(e) in the computer, determining whether there are picker delays based on the simulated system timing, and if there are picker delays then
(e) in the computer, determining whether there are picker delays based on the simulated system timing, and if there are picker delays then going to (f);
(f) in the computer, determining whether there is a timeout and if there is a timeout then going to (g);
(g) in the computer, controlling a plurality of conveyance devices using the simulated system timing; else if there is no timeout then going to (h);
(h) in the computer, resolving picker delays using timing adjustment rules and then iteratively returning to (d); else if there are no picker delays then going to (i);
(i) in the computer, determining whether Level-1 is minimized and if yes—Level-1 is minimized—then going to (g); else if Level-1 is not minimized then going to (j);
(j) in the computer, minimizing Level-1 Storage using reduction rules and returning to (d).

In some embodiments, the present invention provides an eighth system for fulfillment of a plurality of orders including a first order, the first order specifying a plurality of items including a first item and a second item that are picked from one or more pick faces in a first warehouse aisle in a warehouse that includes a plurality of warehouse aisles. This eighth system includes: a plurality of tote-storage levels in the first warehouse aisle; a plurality of tote-conveyance devices operatively coupled to the plurality of tote-storage levels to provide movement of a plurality of totes between the plurality of tote-storage levels, wherein at least a first tote-conveyance device of the plurality of tote-conveyance devices is configured to move the plurality of totes vertically; and a controller operatively coupled to the plurality of tote-storage levels and the plurality of tote-conveyance devices, wherein the controller is configured to control the movement of the plurality of totes between the plurality of tote-storage levels to sequence totes into subsets of two or more of the plurality of totes that are presented simultaneously to a picker that aggregates items of at least the first order into at least a first tote of the plurality of totes, in order to minimize tote-wait times for the picker. In some embodiments of the eighth system, the plurality of tote-storage levels in the first warehouse aisle includes a Level-0 tote-storage level and a Level-1 tote-storage level, wherein the Level-0 tote-storage level moves at least horizontally and at least vertically a first tote-storage level and a second tote-storage level, wherein the first tote-storage level is configured to move the plurality of totes in a plurality of spatial dimensions relative to the one or more pick faces in the warehouse aisle, and wherein the second tote-storage level is configured to move the plurality of totes in one or more spatial dimensions relative to the one or more pick faces in the warehouse aisle. Some embodiments of the eighth system further include a Level-2 tote-storage level located outside of the first warehouse aisle. In some embodiments of the eighth system, the plurality of tote-storage levels in the first warehouse aisle further includes: a Level-2 tote-storage level that remains at a fixed location in the first warehouse aisle during a time period the Level-0 tote-storage level and a Level-1 tote-storage level relative to the one or more pick faces of the first warehouse aisle. Some embodiments of the eighth system further include: a Level-2 tote-storage level outside of the warehouse aisle, wherein the Level-2 tote-storage level outside of the warehouse aisle does not move in any spatial dimension relative to one or more pick faces in the warehouse aisle, wherein the plurality of tote-storage levels in the warehouse aisle includes a first tote-storage level and a second tote-storage level, wherein the first tote-storage level is configured to move the plurality of totes in a plurality of spatial dimensions relative to the one or more pick faces in the warehouse aisle, and wherein the second tote-storage level is configured to move the plurality of totes in one or more spatial dimensions relative to the one or more pick faces in the warehouse aisle.

In some embodiments, the present invention provides a ninth system for fulfillment of a plurality of orders including a first order, the first order specifying a plurality of items including a first item and a second item. This ninth system includes: a plurality of tote-storage-level devices in a warehouse aisle; a plurality of tote-conveyance devices operatively coupled to the plurality of tote-storage-level devices to provide movement of a plurality of totes between the plurality of tote-storage-level devices, wherein at least a first tote-conveyance device of the plurality of tote-conveyance devices is configured to move the plurality of totes vertically; and a controller operatively coupled to the plurality of tote-storage-level devices and the plurality of tote-conveyance devices, wherein the controller is configured to control the recirculation movement of the plurality of totes between the plurality of tote-storage-level devices to sequence totes such that two or more of the plurality of totes are presented simultaneously to a picker that aggregates items of at least the first order into at least a first tote of the plurality of totes, whereby tote-wait times are reduced for the picker. In some embodiments, the plurality of tote-conveyance devices is configured to move the plurality of totes between the plurality of tote-storage-level devices while the picker aggregates the items of at least first order into at least the first tote of the plurality of totes.

In some embodiments, the present invention is embodied as a non-volatile computer-readable medium having stored thereon instructions that, when executed by a suitable computer system, perform one or more of the methods described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A system for fulfillment of a plurality of orders including a first order and a second order, the first order specifying a plurality of items including a first item and a second item, the second order specifying a plurality of items including a third item and a fourth item, the system comprising:
   a picker platform and an associated drive mechanism of the picker platform configured to transport and position a picker vertically;
   a plurality of tote-storage-level devices in a first warehouse aisle of a warehouse that includes one or more additional warehouse aisles wherein the plurality of tote-storage-level devices includes a first tote-storage-level device, and wherein the first tote-storage-level device includes a plurality of tote-storage locations spaced vertically and horizontally relative to one another and facing the picker;
   a plurality of tote-conveyance devices operatively coupled to the plurality of tote-storage-level devices to provide movement of a plurality of totes between the plurality of tote-storage-level devices, wherein at least a first tote-conveyance device of the plurality of tote-conveyance devices is configured to move the plurality of totes vertically; and
   a controller operatively coupled to the plurality of tote-storage-level devices and the plurality of tote-conveyance devices, wherein the controller is configured to control a recirculating movement of the plurality of totes between the plurality of tote-storage-level devices to sequence the plurality of totes into subsets of two or more of the plurality of totes that are presented simultaneously to the picker that aggregates one or more items of at least the first order into at least a first tote of the plurality of totes, whereby tote-wait times are reduced for the picker.

2. The system of claim 1, wherein the plurality of tote-conveyance devices is configured to move the plurality of totes between the plurality of tote-storage-level devices while the picker aggregates the plurality of items of the first order into the first tote of the plurality of totes.

3. The system of claim 1, further comprising:
   a picker automated vehicle (PAV) that includes the picker platform and the associated drive mechanism configured to transport and position the picker horizontally and vertically within the first warehouse aisle, wherein the plurality of tote-storage-level devices includes the first tote-storage-level device that presents, to the picker, a plurality of the plurality of totes spaced vertically and horizontally from one another, a second tote-storage-level device that moves the plurality of totes horizontally on each of a plurality of vertically spaced platforms, wherein the first tote-storage-level device and the second tote-storage-level device are connected to the PAV, and a third tote-storage-level device spaced horizontally from the PAV, and wherein the plurality of tote-conveyance devices includes at least one horizontal conveyor that moves the plurality of totes between the third tote-storage-level device and the PAV, and at least one vertical elevator located on the PAV.

4. The system of claim 1, further comprising:
   a picker automated vehicle (PAV) that includes the picker platform and the associated drive mechanism configured to transport and position the picker horizontally and vertically within the first warehouse aisle, wherein the plurality of tote-storage-level devices includes the first tote-storage-level device, a second tote-storage-level device, and a third tote-storage-level device, wherein the plurality of tote-conveyance devices includes a horizontal conveyor and a vertical elevator, wherein the first tote-storage-level device and the second tote-storage-level device are each located on the PAV and coupled to the vertical elevator, and wherein the third tote-storage-level device is located on the horizontal conveyor, and wherein the PAV moves horizontally to a plurality of locations over the horizontal conveyor.

5. The system of claim 1, wherein each of the plurality of tote-storage-level devices is configured to store at one time or another a first plurality of the plurality of totes, and wherein each of the plurality of tote-storage-level devices and the plurality of tote-conveyance devices is further configured to sequence the first plurality of the plurality of totes in a defined order based on control signals received from the controller.

6. The system of claim 1, wherein the plurality of tote-storage-level devices includes the first tote-storage-level device, a second tote-storage-level device, and a third tote-storage-level device, and wherein the plurality of tote-conveyance devices includes a first horizontal conveyor and a first vertical elevator, the system further comprising:
the picker platform coupled to the first vertical elevator, wherein the picker platform contains the first tote-storage-level device, and wherein the first vertical elevator is coupled to the second tote-storage-level device.

7. The system of claim 1, wherein the plurality of tote-storage-level devices includes the first tote-storage-level device, a second tote-storage-level device, and a third tote-storage-level device, and wherein the plurality of tote-conveyance devices includes a first horizontal conveyor and a first vertical elevator, the system further comprising:
the plurality of totes;
an aisle wall of the first warehouse aisle, wherein the aisle wall includes a plurality of bins defining a pick face, wherein each of the plurality of bins contains a plurality of items to be picked and placed into at least the first tote of the plurality of totes;
the picker platform is coupled to the first vertical elevator and contains the first tote-storage-level device, wherein the first vertical elevator is coupled to the second tote-storage-level device, wherein the first vertical elevator includes a plurality of tote movers configured to independently move the plurality of totes in vertical directions; and
an automated guided vehicle (AGV) operatively coupled to the picker platform, wherein the AGV is configured to move the picker platform to a plurality of horizontal and vertical positions along the aisle wall, wherein the first horizontal conveyor is configured to move the plurality of totes back and forth between the AGV and the third tote-storage-level device.

8. The system of claim 1, further comprising:
an order-consolidation system configured to receive completed totes of the plurality of totes, wherein the order-consolidation system is further configured to remove selected items from the completed totes for each respective order of the plurality of orders and place the selected items into a respective order tote associated with the respective order.

9. The system of claim 1, further comprising:
a picker automated vehicle (PAV) that includes the picker platform and the associated drive mechanism configured to transport and position the picker horizontally and vertically within the first warehouse aisle, wherein the plurality of tote-storage-level devices includes the first tote-storage-level device that presents, to the picker, a plurality of the plurality of totes spaced vertically and horizontally from one another, a second tote-storage-level device that moves the plurality of totes horizontally on each of a plurality of vertically spaced platforms, wherein the first tote-storage-level device and the second tote-storage-level device are connected to the PAV, and a third tote-storage-level device spaced horizontally from the PAV, and wherein the plurality of tote-conveyance devices includes at least one horizontal conveyor that moves the plurality of totes between the third tote-storage-level device and the PAV, a plurality of vertical elevators located on the PAV, and at least one vertical elevator located on the third tote-storage-level device.

10. The system of claim 1, further comprising:
a computer system configured to execute instructions to:
(a) in the computer system, assign picker-position locations using placement rules and determine storage level requirements after use;
(b) in the computer system, assign representative totes of the plurality of totes to the picker-position locations;
(c) in the computer system, develop NextTote and PassThru assignments using timing rules;
(d) in the computer system, iteratively simulate system timing;
(e) in the computer system, determine whether there are picker delays based on the simulated system timing, and if there are picker delays then go to (f);
(f) in the computer system, determining whether there is a timeout and if there is a timeout then go to ($g$);
($g$) in the computer system, control the plurality of conveyance devices using the simulated system timing; else if there is no timeout then go to ($h$);
($h$) in the computer system, resolve picker delays using timing adjustment rules and then iteratively return to (d); else if there are no picker delays then go to (i);
(i) in the computer system, determine whether Level 1 is minimized and if Level 1 is minimized then go to ($g$); else if Level 1 is not minimized then going to (j);
(j) in the computer system, minimize Level 1 Storage using reduction rules and return to (d).

11. The system of claim 1, wherein the plurality of tote-storage-level devices includes the first tote-storage-level device, and a second tote-storage-level device, and wherein the plurality of tote-conveyance devices includes a first horizontal conveyor and a first vertical elevator, the system further comprising:
the plurality of totes;
an aisle wall of the first warehouse aisle, wherein the aisle wall includes a plurality of bins facing a pick face, wherein each of the plurality of bins contains a plurality of items to be picked and placed into at least the first tote of the plurality of totes;
the picker platform is coupled to the first vertical elevator, wherein the picker platform contains the first tote-storage-level device that remains in a fixed spatial relationship relative to the picker platform, wherein the first vertical elevator is coupled to the second tote-storage-level device, wherein the first vertical elevator includes a plurality of tote movers configured to independently move the plurality of totes in vertical directions and to transfer the plurality of totes between the first tote-storage-level device and the second tote-storage-level device; and
an automated guided vehicle (AGV) operatively coupled to the picker platform, wherein the picker platform is configured to move to a plurality of vertical positions relative to the AGV, wherein the AGV operatively coupled to the second tote-storage-level device;

wherein the AGV is configured to move to a plurality of horizontal positions along the first warehouse aisle, wherein the first horizontal conveyor is configured to move the plurality of totes back to and from the AGV.

12. The system of claim 1, wherein the plurality of tote-storage-level devices includes:
the first tote-storage-level device;
a second tote-storage-level device, wherein the second tote-storage-level device includes a first intra-tote-storage-level horizontal conveyor and a second intra-tote-storage-level horizontal conveyor that together are configured to move and re-sequence the plurality of totes within the second tote-storage-level device; and
a third tote-storage-level device; and
wherein the plurality of tote-conveyance devices includes:
a first inter-tote-storage-level horizontal conveyor and a second inter-tote-storage-level horizontal conveyor that together are configured to move the plurality of totes back and forth between the second tote-storage-level device and the third tote-storage-level device; and
a first inter-tote-storage-level vertical elevator and a second inter-tote-storage-level vertical elevator that together are configured to move the plurality of totes back and forth between the first tote-storage-level device and the second tote-storage-level device.

13. The system of claim 1, wherein the plurality of tote-storage-level devices includes:
the first tote-storage-level device,
a second tote-storage-level device, wherein the second tote-storage-level device includes a first intra-tote-storage-level horizontal conveyor and a second intra-tote-storage-level horizontal conveyor both at a first vertical height that together are configured to move and re-sequence the plurality of totes within the second tote-storage-level device, and a third intra-tote-storage-level horizontal conveyor and a fourth intra-tote-storage-level horizontal conveyor both at a second vertical height that together are also configured to move and re-sequence the plurality of totes within the second tote-storage-level device, and
wherein the plurality of tote-conveyance devices includes:
a first horizontal conveyor and a second inter tote storage level horizontal conveyor that together are configured to move the plurality of totes to and from the second tote-storage-level device; and
a first inter-tote-storage-level vertical elevator and a second inter-tote-storage-level vertical elevator that together are configured to move the plurality of totes back and forth between the first tote-storage-level device and the second tote-storage-level device.

14. The system of claim 1, wherein a plurality of tote storage levels include a level-0 tote storage and a level-1 tote storage operatively coupled to are a vertical elevator system and a level-2 tote storage that is operatively coupled to a horizontal conveyor system, the system further comprising:
a mechanism configured to transfer the plurality of totes between the vertical elevator system and the horizontal conveyor system;
the level-0 tote storage includes a plurality of tote storage locations in an array of locations spaced vertically and horizontally from one another and each operatively coupled to the vertical elevator system;
the level-1 tote storage includes a plurality of level-1 tote storage units each configured to store the plurality of totes and sequence the plurality of totes in a controller-defined order to and from the level-0 tote storage;
the level-2 tote storage is configured to store the plurality of totes and sequence the plurality of totes in a controller-defined order based on a computer-controlled algorithm; and
the picker platform contains the level-0 tote storage and that is operatively coupled to the vertical elevator system, wherein the vertical elevator system is operatively coupled to the level-1 tote storage.

15. The system of claim 1, further comprising:
a picker automated vehicle (PAV) that includes the picker platform and the associated drive mechanism configured to transport and position the picker horizontally and vertically within the first warehouse aisle, wherein the plurality of tote-storage-level devices includes the first tote-storage-level device that presents, to the picker, a plurality of the plurality of totes spaced vertically and horizontally from one another, a second tote-storage-level device that is operatively coupled to the first tote-storage-level device through a conveyance device to provide movement of the plurality of totes between the plurality of tote-storage-level devices, wherein the first tote-storage-level device and the second tote-storage-level device are operatively coupled to the PAV.

16. A method for fulfillment of a plurality of orders including a first order, the method comprising:
providing a picker platform and an associated drive mechanism of the picker platform configured to transport and position the picker vertically;
providing a plurality of tote-storage-level devices in a first warehouse aisle of a warehouse that includes one or more additional warehouse aisles wherein the plurality of tote-storage-level devices includes a first tote-storage-level device, and
wherein the first tote-storage-level device includes a plurality of tote-storage locations spaced vertically and horizontally relative to one another and facing the picker;
providing a plurality of tote-conveyance devices operatively coupled to the plurality of tote-storage-level devices to provide movement of a plurality of totes between the plurality of tote-storage-level devices, wherein at least a first tote-conveyance device of the plurality of tote-conveyance devices is configured to move the plurality of totes vertically; and
providing a controller operatively coupled to the plurality of tote-storage-level devices and the plurality of tote-conveyance devices,
wherein the controller is configured to control a recirculating movement of the plurality of totes between the plurality of tote-storage-level devices to sequence the plurality of totes into subsets of two or more of the plurality of totes that are presented simultaneously to the picker that aggregates one or more items of at least the first order into at least a first tote of the plurality of totes, whereby tote-wait times are reduced for the picker.

17. The method of claim 16, wherein the plurality of tote storage levels includes a level-0 tote storage level and a level-1 tote storage level that are on a vertical elevator system that is operatively coupled to a horizontal conveyor system, the method further comprising:
transferring the plurality of totes between the vertical elevator system and the horizontal conveyor system.

18. The method of claim 17, wherein the level-1 tote storage level includes a plurality of level-1 tote storage devices, the method further comprising:
- storing the plurality of totes on the level-1 tote storage level; and
- sequencing movement of the plurality of totes on the level-1 tote storage level in a controller-defined order to and from the level-0 tote storage level.

19. A system for fulfillment of a plurality of orders including a first order, the system comprising:
- a picker platform and an associated drive mechanism of the picker platform configured to transport and position a picker vertically; and
- a plurality of tote storage levels wherein a level-0 tote storage level includes a plurality of tote-storage locations spaced vertically and horizontally relative to one another and facing the picker, wherein the plurality of tote storage levels are interconnected by and separate from a plurality of conveyance devices, at least one of which moves a plurality of totes vertically, wherein the plurality of totes are then used to aggregate all the items contained in the first order by the picker and where each of the plurality of conveyance devices is configured for continued tote-movement operation while the picker is performing pick requests, wherein the plurality of conveyance devices then recirculates the plurality of totes between different levels of the plurality of tote storage levels; and
- a controller that controls a sequence of tote movements such that each tote movement is performed at a specific time and to a specific location based on a computer-controlled algorithm that minimizes tote-wait times incurred when picks are being performed.

20. The system of claim 19, wherein the plurality of tote storage levels includes a level-0 tote storage and a level-1 tote storage that are operatively coupled to a vertical elevator system and a level-2 tote storage that is operatively coupled to a horizontal conveyor system, the system further comprising:
- a mechanism configured to transfer the plurality of totes between the vertical elevator system and the horizontal conveyor system;
- the level-0 tote storage includes a plurality of tote storage locations in an array of locations spaced vertically and horizontally from one another and each operatively coupled to the vertical elevator system;
- the level-1 tote storage includes a plurality of level-1 tote storage devices each configured to store the plurality of totes and sequence the plurality of totes in a controller-defined order to and from the level-0 tote storage;
- the level-2 tote storage is configured to store the plurality of totes and sequence the plurality of totes in a controller-defined order based on the computer-controlled algorithm; and
- the picker platform contains the level-0 tote storage that is operatively coupled to the vertical elevator system, wherein the vertical elevator system is operatively coupled to the level-1 tote storage.

21. The system of claim 19, wherein the level-0 tote storage and a level-1 tote storage are operatively coupled to a vertical elevator system, the system further comprising:
- a mechanism configured to transfer the plurality of totes between the vertical elevator system and a horizontal conveyor system;
- the level-0 tote storage includes a plurality of tote storage locations in an array of locations spaced vertically and horizontally from one another and each operatively coupled to the vertical elevator system;
- the level-1 tote storage includes a plurality of level-1 tote storage devices each configured to store the plurality of totes and sequence the plurality of totes in a controller-defined order to and from the level-0 tote storage; and
- the picker platform contains the level-0 tote storage that is operatively coupled to the vertical elevator system, wherein the vertical elevator system is operatively coupled to the level-1 tote storage.

22. The system of claim 19, wherein the plurality of tote storage levels in a warehouse aisle includes a level-0 tote storage and a level-1 tote storage, wherein the level-0 tote storage is configured to move the plurality of totes in a plurality of spatial dimensions relative to the one or more pick faces in the warehouse aisle, and wherein the level-1 tote storage is configured to move the plurality of totes in one or more spatial dimensions relative to the one or more pick faces in the warehouse aisle.

23. The system of claim 22, further including:
- a level-2 tote storage located outside of the warehouse aisle.

* * * * *